United States Patent
Sakaki et al.

(10) Patent No.: US 7,176,791 B2
(45) Date of Patent: Feb. 13, 2007

(54) SECURITY VERIFICATION METHOD AND DEVICE

(75) Inventors: Hiroshi Sakaki, Tokyo (JP); Yasunori Ishihara, Osaka (JP); Toru Fujiwara, Osaka (JP); Maki Yoshida, Osaka (JP)

(73) Assignee: NEC Corporation, Tokyo (JP)

( * ) Notice: Subject to any disclaimer, the term of this patent is extended or adjusted under 35 U.S.C. 154(b) by 225 days.

(21) Appl. No.: 11/009,297

(22) Filed: Dec. 10, 2004

(65) Prior Publication Data

US 2005/0144475 A1 Jun. 30, 2005

(30) Foreign Application Priority Data

Dec. 11, 2003 (JP) .............................. 2003-413017
Mar. 30, 2004 (JP) .............................. 2004-099083

(51) Int. Cl.
*G08B 23/00* (2006.01)
(52) U.S. Cl. ................... 340/502; 340/500; 726/26; 380/216; 380/229
(58) Field of Classification Search ................ 340/500, 340/502, 506; 380/216, 229; 710/11, 14; 711/161, 162; 726/26
See application file for complete search history.

(56) References Cited

U.S. PATENT DOCUMENTS 5,875,172 A * 2/1999 Tabata ........................ 370/228
6,922,762 B2 * 7/2005 Hirakawa et al. ............ 711/162
6,957,349 B1 * 10/2005 Yasukura ..................... 726/26

FOREIGN PATENT DOCUMENTS

| JP | 09-293052 | | 11/1997 |
|---|---|---|---|
| JP | 10051513 | * | 2/1998 |
| JP | 2002-229946 | | 8/2002 |
| JP | P2002-229946 A | | 8/2002 |
| JP | 2002-288405 | | 10/2002 |
| JP | 2003-167739 | | 6/2003 |

OTHER PUBLICATIONS

Ritchey, R.W. et al., "Using Model Checking to Analyze Network Vulnerabilities", *IEEE Symposium on Security and* Privacy, pp. 156-165 (Mar. 2000).
Internet document "Internet Scanner", (http://www.isskk.co.ip/product/Internet_Scanner.html).
Internet document "System Scanner", (http://www.isskk.co.jp/product/System_Scanner.html).
Internet document "System Scanner", (http://www.iss.net/products_services/enterprise_pro...).

* cited by examiner

*Primary Examiner*—Van T. Trieu
(74) *Attorney, Agent, or Firm*—Scully, Scott, Murphy & Presser, P.C.

(57) ABSTRACT

A security verification method for verifying whether improper settings that indicate composite errors of security settings exist in an object system, which is an object of examination, includes steps of: reading data transfer paths that represent data movement in the object system and that are generated based on program operation information that describes operations of a program that is used in the object system, integrating the access rights of data transfer paths that have been read; and searching for improper paths among the data transfer paths for which access rights have been integrated based on security verification policies in which improper paths, which are paths of data movement that are improper from the standpoint of security, have been set in advance.

25 Claims, 46 Drawing Sheets

| Setting information ID | Security setting information |||
|---|---|---|---|
| | Object application | Setting information file name | Security unit information |
| C-1-1-1 | Web server | Server setting file | Network configulation information |
| C-1-1-2 | OS | User setting file | User information |
| ...... | ...... | ...... | ...... |

FIG. 3

| Security setting information ||| Type of node or arc created on model |
|---|---|---|---|
| Object application | Setting information file name | Security unit information | |
| OS | Internal information of OS | Information that OS is installed | Generate layer regarding OS |
| OS | File setting file | Information indicating file structure | Generate file node & generate arc indicating alias relations |
| OS | User setting file | Information indicating user | Generate user node |
| OS | Group setting file | Information indicating group | Group node |
| OS | Group setting file | Information specifying user belonging to group | Generate arc indicating affiliate relations between group node and user node belonging to group node |
| OS | File setting file | Information on file access right | Generate arc indicating data movement between file node and user (group) node |
| ...... | ...... | ...... | ...... |
| Web server | Internal information of OS | Information that web server is installed | Generate layer regarding web server |
| Web server | Server setting file | User information | User node |
| Web server | Server setting file | Information on network used by web server | Generate network node |
| Web server | Server setting file | Information on execution user of server | User node; arc indicating authority transfer |
| Web server | Server setting file | File information | File node; arc indicating alias definition |
| ...... | ...... | ...... | ...... |
| Web client | Client setting file | Information that web client is installed | Generate network node |
| Web client | Internal information of OS | Information that web server is installed | Generate arc indicating data transfer between network nodes of web server and web client |
| ...... | ...... | ...... | ...... |

FIG. 4

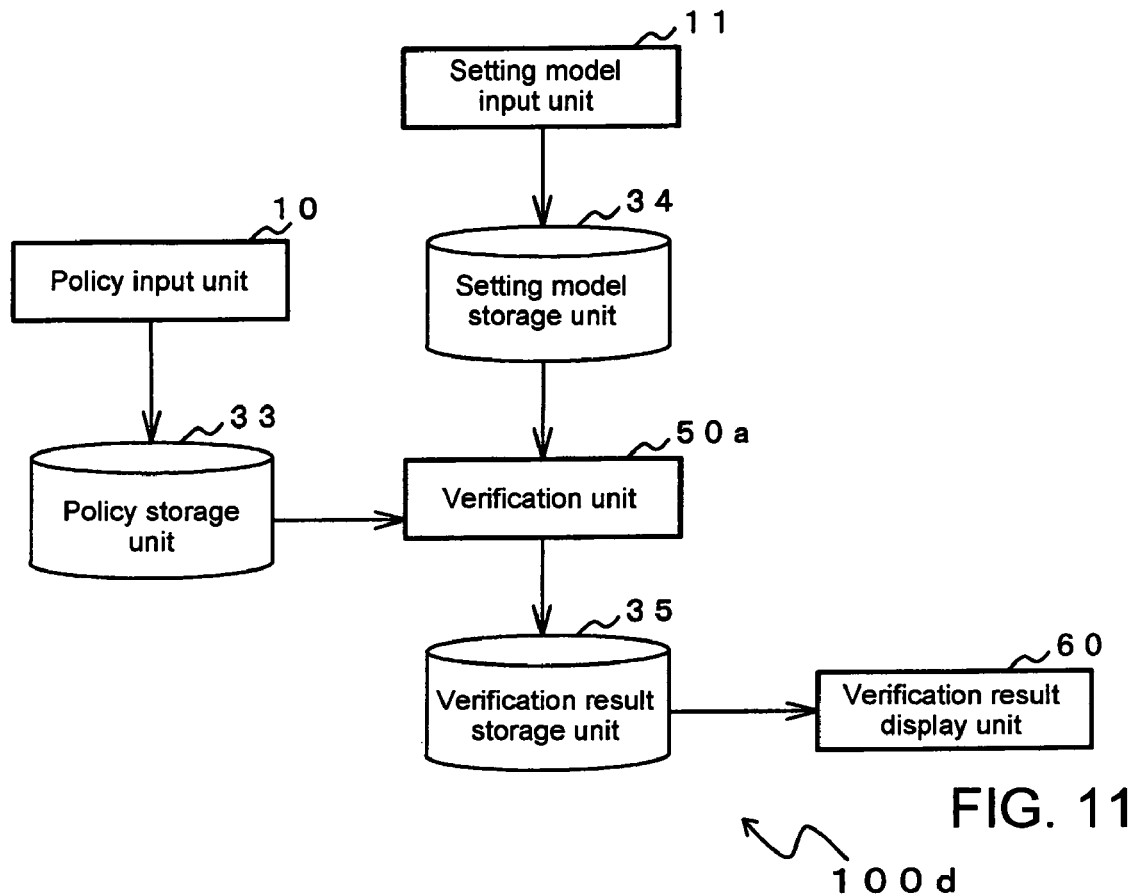

FIG. 11

```
<PolicySet>
  <Policy type="deny">
    <Rule>flow(fileA, fileB)</Rule>
    <Description> Not transfer content of file "fileA" to file "fileB"
</Description>
  </Policy>
  </Policy type="allow">
    <Rule>(b(U1)=h1) ∧ acc(u, read, f) ∧ auth(U1, ssh, u) ∧ acc(U1, write, f1)</Rule>
    <Description> User "u" on host "h" can acquire authority of any user on
      host "h1" to write content of file "f" to file "f1" through service "ssh"
    </Description>
  </Policy>
</PolicySet>
```

FIG. 12 flow(F1, F2) → flow(F1, F3) ∧ flow(F3, F2)

flow(F1, F2) → acc(U, read, F1) ∧ auth(U3, S1, U) ∧ auth(U3, S2, U2) ∧ acc(U2, write, F2)

```
apache:x:48:48:Apache:/var/www:/bin/false
a:x:501:501::/home/a:/bin/bash
b:x:502:501::/home/b:/bin/bash
```

FIG. 17A

```
apache:x:48:
a:x:501:
```

FIG. 17B

```
drwxr-x—x    b  a  /home/b/
drwxrwxr-x   b  a  /home/b/public/
-rw—xr—      b  a  /home/b/public/index.html
drwx—xrwx    b  a  /home/b/public/s/
drwx—x—x     a  a  /home/a/
-rw————      a  a  /home/a/notpublic.html
drwx—xrwx    a  a  /home/a/public/
```

FIG. 18

```
Port 80
User apache
Group apache
UserDir public_html

<Directory "/var/www/html/secret/">
        AuthUserFile /var/www/.htpasswd
        AuthGroupFile /dev/null
        AuthName "Test For Basic Auth"
        AuthType Basic
        require valid-user
</Directory>
...
```

```
user-g: passwd
```

◄----- : Affiliation relations

| Policy 1 | U<a>. *F</d/> |
|---|---|
| Policy 2 | F</c/>. * [NET]. *U<a> |
| Policy 3 | F</c/>. *^N<p443>. *U<b> |
| Policy 4 | ^U<b>. *F</b/public/> |
| Policy 5 | ^ (U<b>|U<g>). *F</b/public/s/> |

FIG. 31

```xml
<?Xml version="1.0" encoding="UTF-8"?>
<LayeredGraph name="test">
 <Host name="hostname" id="H-1">
  <Layer name="web-server" id="L-1-1">
   <Object name="localhost/80" type="network" id="O-1-1-1">
    <Connect>
     <To>A-1-1-1</To>
     <To>A-1-1-3</To>
     <From>A-1-1-4</From>
     <From>A-1-5-1</From>
    </Connect>
    <ConfigFiles>
     <Config>C-1-1-1</Config>
     <Config>C-1-1-3</Config>
    </ConfigFiles>
   </Object >
     •
     •
     •
  </Layer>
     •
     •
     •
  <Betweenlayers name="OS-Web-Server" id="L-1-4">
   <Dependlayers>
    <On>L-1-2</On>
    <On>L-1-1</On>
   </Dependlayers>
   </Arc type="commision" id="A-1-4-1">
    <Connect>
     <To>O-1-1-3</To>
     <From>O-1-2-8</From>
    </Connect>
    <ConfigFiles>
     <Config>C-1-4-6</Config>
     <Config>C-1-4-5</Config>
    </ConfigFiles>
   </Arc>
     •
     •
```

FIG. 40

| Setting information ID | Security unit information | Setting information file name |
|---|---|---|
| C-1-1-1 | <Directory"/home/b/public/s/"><br>AuthUserFile/ver/www/.htpasswd<br>AuthGroupFile/dev/null<br>AuthName"Test For Basic Auth"<br>AuthType Basic<br>Require valid-user<br></Directory> | httpd.conf |
| C-1-1-6 | User-g:passwd | .htpasswd |
| ....... | ....... | ....... |
| C-1-4-5 | a:x:501:501::/home/b:/bin/bash | /etc/passwd |
| C-1-4-6 | apache:x:48:48:Apache:/ver/www:bin/false | /etc/passwd |
| C-1-4-7 | apache:x:48 | /etc/group |
| C-1-4-8 | drwx—xrwx b a/home/b/public/s/ | Directory |
| ....... | ....... | ....... |

FIG. 41

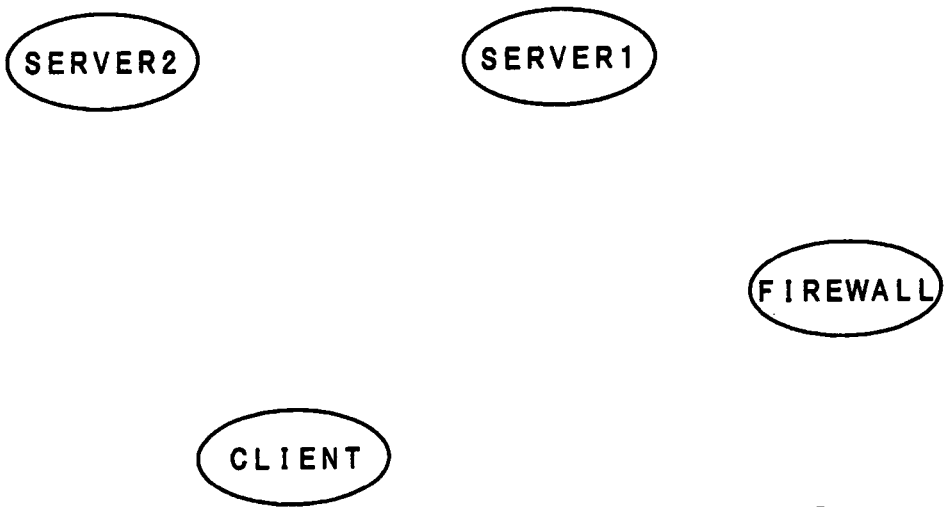
FIG. 53
```
<hosts>
 <host id="h1"name="CLIENT"/>
 <host id="h2"name="FIREWALL"/>
 <host id="h3"name="SERVER1"/>
 <host id="h1"name="SERVER2"/>
</hosts>
```
FIG. 54
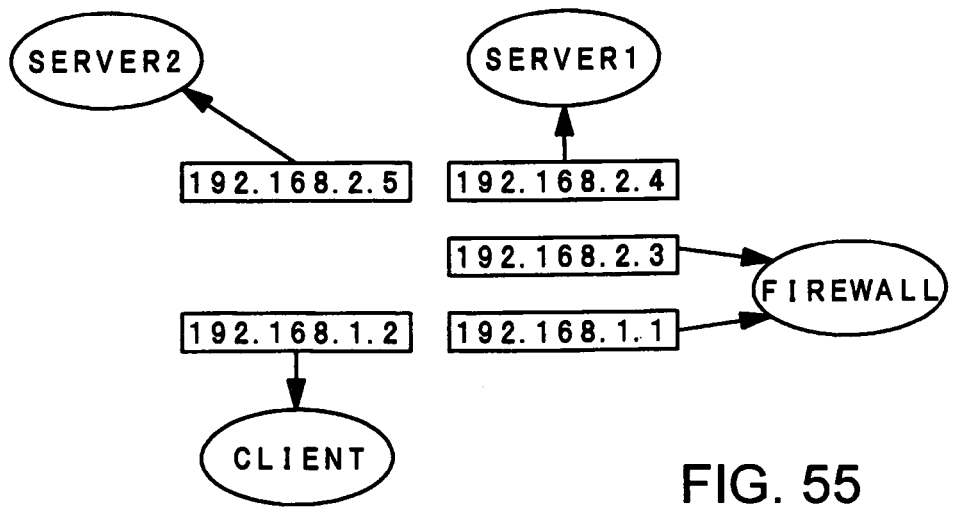
FIG. 55

```
DEVICE=eth0
BOOTPROTO=static
BROADCAST=192.168.2.255
IPADDR= 192.168.2.5  ──── IP address
NETMASK=255.255.255.0
NETWORK=192.168.2.0
ONBOOT=YES
```

FIG. 56

```
<host id="h1"name="C L I E N T">
 <ip id ="ip1"addr="192.168.1.2"/>
 <file id="f1"name="secret.txt"/>
 <user id="u1"name="taro"/>
</host>
<host id="h2"name="F I R E W A L L">
 <ip id ="ip2"addr="192.168.2.3"/>
 <ip id ="ip3"addr="192.168.1.1"/>
</host>
<host id ="h3"name="S E R V E R 1">
 <ip id ="ip4"addr="192.168.2.4"/>
 <user id ="u2"name="student"/>
 <user id ="u3"name="hanako"/>
</host>
<host id ="h4"name="S E R V E R 2"/>
 <ip id ="ip5"addr="192.168.2.5"/>
 <user id ="u4"name="ftp"/>
 <file id="f2"name="paper.txt"/>
</host>
```
── IP addresses

FIG. 57

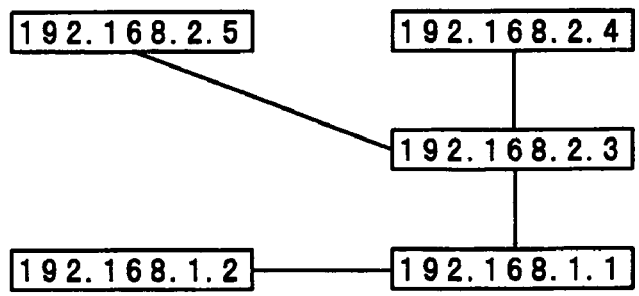

FIG. 58

```
<arcs>
 <g end1="ip1"end2="ip3"/>
 <g end1="ip2"end2="ip3"/>                                          a
 <g end1="ip2"end2="ip4"/>
 <g end1="ip2"end2="ip5"/>
 <g end1="ip4"end2="ip5"/>
 <n position="192.168.2.3"srcip="192.168.1.2" detip=192.168.2.4"detport="80"/>   b
 <auth user="u1"service="telnet"targetuser="u3"/>
 <auth user="u3"service="null"targetuser="u2"/>                     c
 <auth user="u2"service="ftp"targetuser="u4"/>
 <cas service="telnet"user="u3"targetservice="null"/>                d
 <cas service="null"user="u2"targetservice="ftp"/>
 <acc user="u4"service="read"file="f2"/>
 <acc user="u4"service="write"file="f2"/>                            e
 <acc user="u1"service="read"file="f1"/>
 <serviceport service="telnet"port="23"/>                            f
 <serviceport service="ftp"port="21"/>
</arcs>
```

FIG. 59

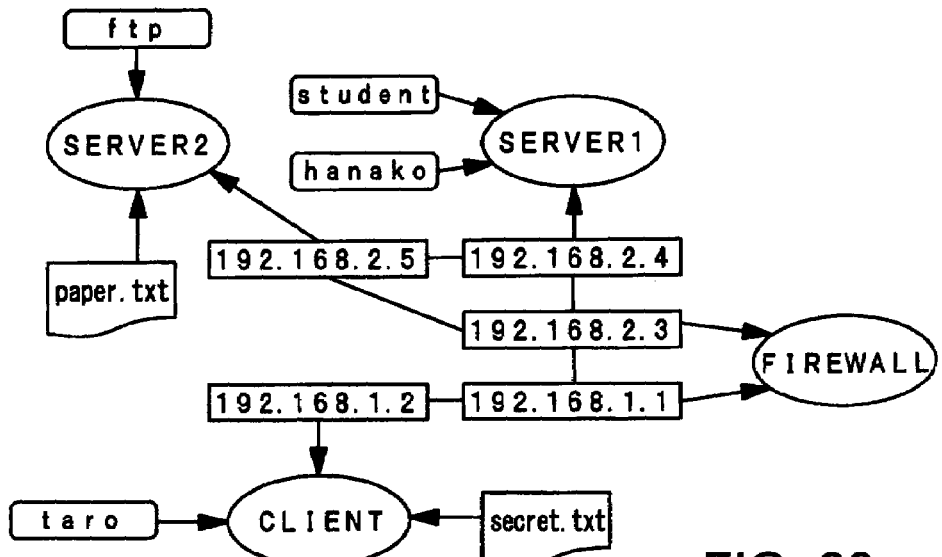

```
   student : x : 501
      |         |
    Group    Group ID
```

FIG. 62

```
<host id="h1"name="C L I E N T">
<ip id ="ip1"addr="192.168.1.2"/>
<file id="f1"name="secret.txt"/>
<user id="u1"name="taro"/>
</host>
<host id="h2"name="F I R E W A L L">
<ip id ="ip2"addr="192.168.2.3"/>
<ip id ="ip3"addr="192.168.1.1"/>
</host>
<host id ="h3"name="S E R V E R 1">
<ip id ="ip4"addr="192.168.2.4"/>
<user id ="u2"name="student"/>
<user id ="u3"name="hanako"/>
</host>
<host id ="h4"name="S E R V E R 2"/>
<ip id ="ip5"addr="192.168.2.5"/>
<user id ="u4"name="ftp"/>
<file id="f2"name="paper.txt"/>
</host>
```
→ User

FIG. 63

```
-rw-rw-r--  1 ftp  ftp  Mar 5 2003
-rw-rw-r--  1 ftp  ftp  Nov 5 2003
-rw-rw-r--  1 ftp  ftp  Mar 2 17:17 paper.txt
     |        |                        |
Access right  Owner                   File
```

FIG. 64

```
<host id="h1"name="C L I E N T">
<ip id ="ip1"addr="192.168.1.2"/>
<file id="f1"name="secret.txt"/>
<user id="u1"name="taro"/>
</host>
<host id="h2"name="F I R E W A L L">
<ip id ="ip2"addr="192.168.2.3"/>
<ip id ="ip3"addr="192.168.1.1"/>
</host>
<host id ="h3"name="S E R V E R 1">
<ip id ="ip4"addr="192.168.2.4"/>
<user id ="u2"name="student"/>
<user id ="u3"name="hanako"/>
</host>
<host id ="h4"name="S E R V E R 2"/>
<ip id ="ip5"addr="192.168.2.5"/>
<user id ="u4"name="ftp"/>
<file id="f2"name="paper.txt"/>
</host>
```

File

FIG. 65

| Verification Result | Verified policy | Type of policy (Deny or Allow) |
|---|---|---|
| Policy | flow(secret.txt.paper.txt) | Deny |
| Setting model | acc(taro.read.secret.txt) ∧auth(taro. telnet.hanako) ∧cas(telnet.hanako.student) ∧auth(hanako.null.student) ∧cas(null.student.ftp) ∧auth(student.ftp.ftp) ∧acc(ftp.write.paper.txt) | |

Setting model that matches policy

FIG. 66

SECURITY VERIFICATION METHOD AND DEVICE

BACKGROUND OF THE INVENTION

1. Field of the Invention

The present invention relates to the verification of the security settings of software, and more particularly to a security verification method and device that can detect and indicate the presence of composite errors in security settings that can become security holes in software.

2. Description of the Related Art

With the popularization of the Internet in recent years, the Internet is becoming a vital element of the social infrastructure that rivals the telephone network or the like. Users can receive a great variety of services on the Internet. Services that are offered on the Internet are typically realized by accepting a series of requests from a user, executing processing in accordance with the received requests that have been accepted, and then sending the results of this processing to the user. More specifically, services are widely disseminated by means of WWW (World Wide Web), and these serve as the infrastructure of various services such as electronic commerce.

The various services that are provided on the Internet are realized by systems known as servers that are connected to the Internet. In particular, servers that are open to the public on the Internet accept requests from users of the general public and are therefore prone to so-called "cyber-attacks," i.e., attacks on cyberspace, and this vulnerability poses a serious security problem.

In this type of cyber-attack on a public server, individuals take improper advantage of security holes such as vulnerable points and improper settings that exist in the server to submit malicious requests, activate illegal operations, and bring about malicious operations such as the misappropriation of confidential files. Examples that can be offered of vulnerable points that exist in a server include programming errors that cause faults in the server software, and examples that can be offered of improper settings include setting errors that occur when making security settings that cause faults in the server software.

Ideally, such cyber-attacks can be prevented in advance by eliminating server security holes. However, completely eliminating security holes in software is extremely difficult, and in practical terms, impossible. In addition, since software creators and server operators are not typically the same entity, the possibility cannot be excluded that a server operator will misunderstand the software specifications and thus make settings in the software that will jeopardize security.

As devices for verifying security, security examination devices have been proposed in, for example, Japanese Patent Laid-Open Publication No. 2002-229946 (JP P2002-229946 A) or in the Internet document "Internet Scanner" (http://www.isskk.co.jp/product/internet_Scanner.html) for checking for the existence of vulnerable points in, for example, servers and for determining the security strength of computer systems. Such a security examination device is specifically made up from vulnerability database 510, pseudo-attack unit 520, and response examination unit 530 as shown in FIG. 1.

In the following description, a computer or a computer system that is the object of examination or verification is referred to as an object system.

In the security examination device shown in FIG. 1, pseudo-attack unit 520 extracts from vulnerability database 510 an attack procedure that has been prepared beforehand in accordance with the configuration of the computer system that is the object system for delivering a pseudo-attack upon the object system. Pseudo-attack unit 520 uses the extracted attack procedure to deliver a pseudo-attack upon the object-system. Response examination unit 530 examines the object system that has been attacked, compares the response of the object system with responses that have been defined in advance in accordance with the attack procedure, and checks for the existence of vulnerabilities in the object system. The security examination device shown in FIG. 1 is a device for carrying out pseudo-attacks upon all objects of examination as described above and examining the security of the objects of examination based on the existence or absence of vulnerable points.

The Internet document "System Scanner" (http://www.isskk.co.jp/product/System_Scanner.html) discloses a device for examining the security of the object computer system by comparison with recommended settings that have been prepared in advance. In this device, recommended settings are registered in a database, and security is examined by comparing these recommended settings with the actual settings in the object system.

Finally, Ronald W. Ritchey and Paul Ammann, in the 2000 IEEE Symposium on Security and Privacy (pp. 156–165, March 2000) have proposed a security verification method in which the correlation between a plurality of vulnerabilities is represented by means of a graph to enable examination of cases in which the combination of vulnerabilities poses a greater threat. In this method, a plurality of vulnerabilities is detected in advance, and the correlation between these vulnerabilities then represented in a graph. For example, an object system is assumed to have two vulnerabilities. One is a vulnerability that allows user privileges to be misappropriated through the Internet; and the other is a vulnerability that allows any user to assume an administrators authority. Here, the second vulnerability, which allows "any user to assume an administrator's authority" is not a serious vulnerability because it cannot directly used by an outsider. Thus, in a device that investigates single vulnerabilities, the overall system will usually be determined to be free of problems despite the existence of a second vulnerability. Once the first vulnerability has been used, however, the second vulnerability can be used. In other words, only after these two vulnerabilities have been combined can the existence of a serious vulnerability be determined. To examine such combinations of vulnerabilities, vulnerabilities that can be used once a particular vulnerability has been used are comprehensively linked in a directed graph. The device of Ritchey et al. investigates the combination of a plurality of vulnerabilities in this way.

None of the above-described examples of the prior art takes the content of security settings as the object system, and these examples of the prior art therefore suffer from the problem of the inability to investigate whether the security settings are improper settings. In other words, in each of the above-described examples of the prior art, a pseudo-attack cannot be carried out for examining security settings. More specifically, examples such as the security examination device shown in FIG. 1 or a security verification device in which the correlation of a plurality of vulnerabilities is represented as a graph employ an investigation approach that is referred to as the "pseudo-attack method." In this type of investigation approach, the examination is realized by preparing attack procedures in advance that are matched to vulnerabilities and then actually delivering an attack. As a result, only vulnerabilities for which an attack procedure can be produced in advance are taken as the inspection items, and security settings for which a pseudo-attack cannot be prepared cannot be examined.

The method in which comparisons are made with recommended settings investigates the existence of setting errors in the security settings, but this method allows only the examination of obvious setting errors in the security settings. In other words, this method can take as inspection items only obvious setting errors that can be examined for individual settings, such as cases in which the password is vacant, and cannot examine the existence of improper settings that are based on composite setting errors that are difficult to determine as a setting error in isolation. On the other hand, most illegal access occurs due to setting errors, and a rigorous verification of the existence of setting errors that may result in problems is therefore preferable.

Each of the above-described examples of the prior art suffers from the problem of the inability to determine whether the combination of a plurality of security settings will result in an improper setting. None of the above-described examples of the prior art is capable of examining the existence of improper settings that result from composite setting errors. More specifically, the security examination device shown in FIG. 1 or the security examination device that is based on comparison with recommended settings takes as examination items only security holes in which a computer system becomes vulnerable due to only a single vulnerability or a single setting, and is incapable of taking as an examination item the combination of a plurality of security settings. These examination devices are therefore incapable of detecting a case in which each individual setting taken by itself cannot be viewed as an error and is thus determined not to constitute a security hole but in which the combination of these security settings results in a security hole of the computer system.

The device of Ritchey et al. investigates the presence of a combination of a plurality of vulnerabilities that may constitute a security hole but does not take as an examination item the setting errors themselves of the security settings.

Each of the above-described devices of the prior art further suffers from the problem of imposing a high burden upon the object system. More specifically, the security examination device shown in FIG. 1 employs an examination approach referred to as the pseudo-attack approach. In this method, an attack that uses a vulnerability is actually delivered, and the object system is therefore subjected to a load that is equivalent to an actual attack, and the object system may in some cases actually fail as a result. Accordingly, the security examination device shown in FIG. 1 may in some case not be applicable due to the state of the object system.

A security examination device therefore preferably allows the examination of the security of a computer or a system that is the object of examination regardless of the state of the computer or the system.

SUMMARY OF THE INVENTION

It is an object of the present invention to provide a verification method and device that are capable of solving the above-described problems and rigorously verifying security settings.

It is another object of the present invention to provide a method and device that are capable of examining the presence or absence of problems that are caused by the compound action of a plurality of security settings.

It is yet another object of the present invention to provide a method and device that are capable of reducing the load imposed upon the object system, i.e., the object of examination or verification, at the time of inspection.

According to the first aspect of the present invention, a method for verifying whether improper settings that indicate composite errors of security settings exist in an object system, which is the object of examination or verification, includes the steps of: reading data transfer paths that represent data movement in the object system and that have been generated based on program operation information that describes the operations of the program that is used in the object system; integrating access rights of data transfer paths that have been read; and, based on security verification policies in which improper paths, which are paths of data movement that are improper from the standpoint of security, have been set in advance, searching for improper paths among data transfer paths for which access rights have been integrated.

According to the second aspect of the present invention, a method for verifying whether improper settings that indicate composite errors of security settings exist in the object system includes the steps of: storing in a storage device operation models that represent the operation contents of the object system that have been generated based on program operation information that describes the operations of programs that are used in the object system; and verifying whether the data movement that is represented by security verification policies in which data movement that is proper or improper from the standpoint of security has been set in advance conforms with the operation contents of the object system that are represented by operation models that have been stored in the storage device.

According to the third aspect of the present invention, a security verification device for verifying whether improper settings that indicate composite errors of security settings exist in the object system is provided with: data transfer path storage means for storing data transfer paths that indicate the data movement in the object system and that have been generated based on program operation information that describes operations of programs that are used in the object system; access right integration means for integrating the access rights of the data transfer paths that represent data movement in the object system and that have been stored in the data transfer path storage means; and search means for, based on security verification policies in which improper paths, which are paths of data movement that is improper from the standpoint of security, have been set in advance, searching for improper paths among data transfer paths for which access rights have been integrated. In this device, the program operation information is stored in, for example, a program operation information storage means; and as the search means, a component such as a verification means is employed.

According to the fourth aspect of the present invention, a security verification device for verifying whether improper settings that indicate composite errors of security settings exist in the object system is provided with: setting information storage means for storing setting information; setting information collection means for collecting setting information that indicates the security settings in the object system and that are stored in the setting information storage means; program operation information storage means for storing program operation information that describes the operations of programs that are used in the object; and data transfer path generation means for generating data transfer paths based on the setting information that has been collected by the setting information collection means and the program operation information that is stored in the program operation information storage means.

According to the fifth aspect of the present invention, a security verification device for verifying whether improper settings that indicate composite errors of the security settings exist in the object system is provided with: operation model storage means for storing operation models that represent the operation contents of the object system and that are generated based on the program operation information that describes the operations of programs that are used in the object system; and verification means for verifying whether the operation contents of the object system that are represented by the operation models that have been stored in the operation model storage means conforms with relevant data movement that is represented by security verification policies in which data movement that is proper or improper from the standpoint of security has been set in advance.

According to the fifth aspect of the present invention, a security verification device for verifying whether improper settings that indicate composite errors of security settings exist in the object system and that is connected to a communication network is provided with: a search means for searching for improper paths among data transfer paths that represent data movement in the object system based on security verification policies in which improper paths, which are paths of data movement that are improper from the standpoint of security, have been set in advance; and security settings search means for, based on program operation information that describes operations of programs that are used in the object system, searching for composite security settings that allow data movement on improper paths that have been discovered by the search means. This type of security verification device is configured as, for example, an inspecting computer.

According to the present invention, data transfer paths that represent data movement in an object system, i.e., a computer that is the object of examination or verification, are compared with security verification policies in which the paths of data movement that is improper from the standpoint of security have been set, and the existence of improper settings, which are composite errors of the security settings in an object system, can therefore be easily verified. In addition, the inclusion of a configuration for searching for improper settings, which are composite errors, enables security settings that are the source of improper settings to be singled out, and further enables an acceleration of the correction of settings. Still further, the present invention is realized only as a configuration for collecting setting information that relate to security, i.e., security setting information, from the object system without resorting to measures that would increase load such as a pseudo-attack, and thus is capable of verification while imposing little load on the object system.

The above and other objects, features, and advantages of the present invention will become apparent from the following description with reference to the accompanying drawings, which illustrate examples of the present invention.

BRIEF DESCRIPTION OF THE DRAWINGS

FIG. 3 shows an example of the structure of data that are stored in the setting information storage unit;

FIG. 4 shows an example of the structure of data that are stored in the program operation information storage unit;

FIG. 11 is a block diagram showing the configuration of the security verification device according to the fifth embodiment of the present invention;

FIG. 12 shows an example of the structure of the policies that are stored in the policy storage unit;

FIGS. 17A and 17B show examples of the settings of OS (operating system) user accounts and groups in an object system, which is a computer that is the object of verification;

FIG. 18 shows an example of the settings of file access rights in the object system;

FIG. 31 shows an example of security verification policies that are applied as input by the policy input unit;

FIG. 40 shows the state in which the locations of improper settings are represented in data transfer path information;

FIG. 41 shows security setting information that has been extracted from the security settings storage unit;

FIG. 53 shows the host configuration that is the object of verification in Example 5 of the present invention;

FIG. 54 shows the host configuration that is stored in the setting model storage unit;

FIG. 55 is an explanatory view showing the relation between a host and the IP address structure in the object system;

FIG. 56 is an explanatory view showing the setting of an IP address in a host that makes up the object system;

FIG. 57 shows an IP address that is stored in the setting model storage unit;

FIG. 58 shows the network connections of the object system;

FIG. 59 shows the principal components of a setting model that is stored in the setting model storage unit;

FIG. 60 shows the system configuration of the object system;

FIG. 61 shows user settings of the object system;

FIG. 62 shows group settings of the object system;

FIG. 63 shows users that are stored in the setting model storage unit;

FIG. 64 shows the settings of file access rights in the object system;

FIG. 65 shows files that are stored in the setting model storage unit; and

FIG. 66 shows the display state of the verification results of the object system.

DETAILED DESCRIPTION OF THE PREFERRED EMBODIMENTS

First Embodiment

Figure 1:
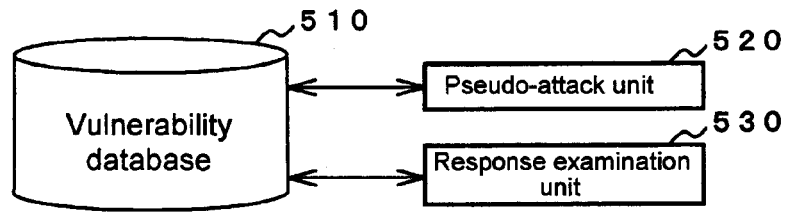
FIG. 1 is a block diagram showing the configuration of a security verification device of the prior art.
Figure 2:
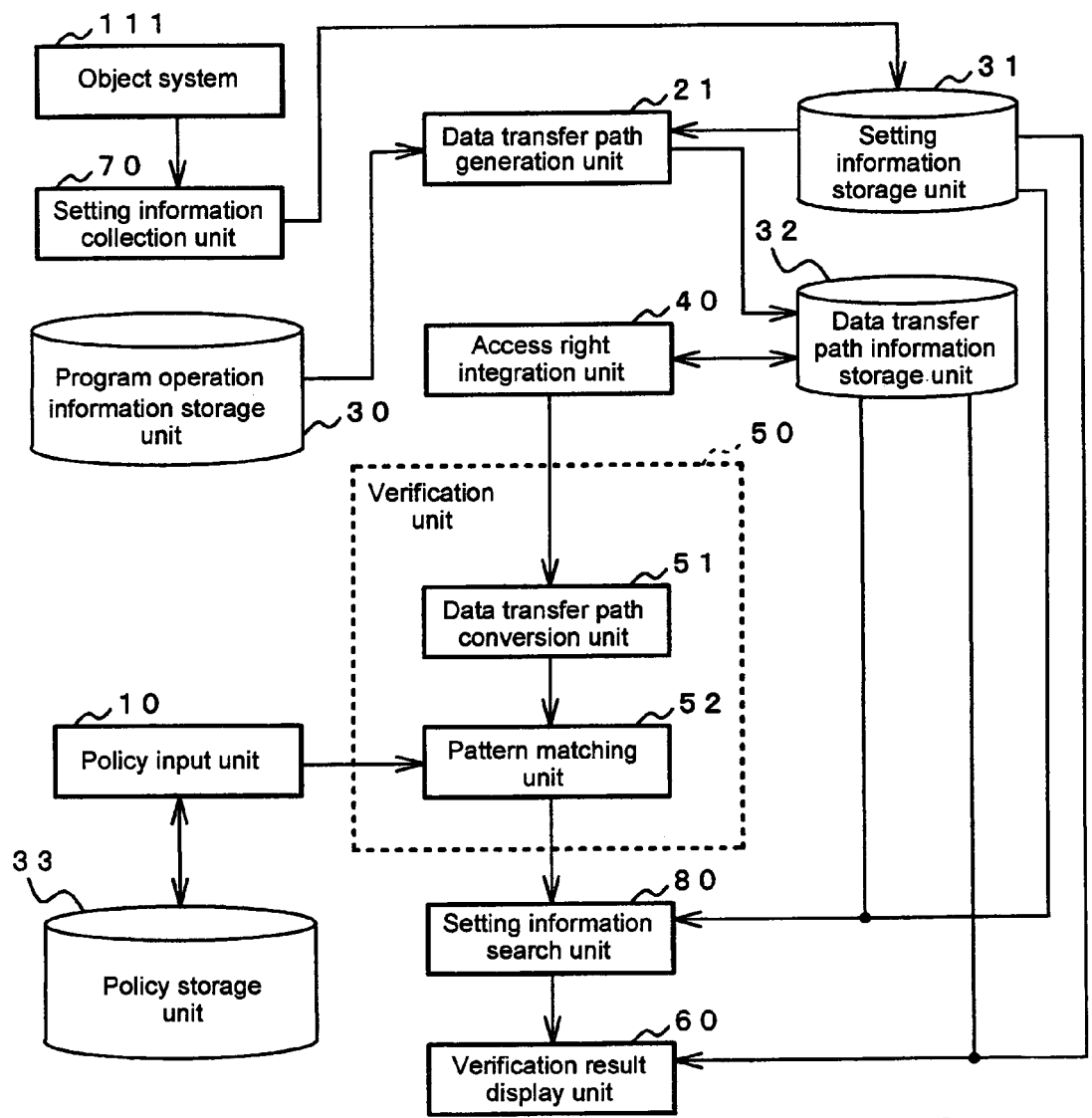
FIG. 2 is a block diagram showing the configuration of a security verification device according to the first embodiment of the present invention.

FIG. 2 shows the configuration of security verification device 100 according to the first embodiment of the present invention. As shown in FIG. 2, security verification device 100 verifies the security settings of object system 111 and is provided with: policy input unit 10, data transfer path generation unit 21, program operation information storage unit 30, setting information storage unit 31, data transfer path information storage unit 32, policy storage unit 33, access right integration unit 40, verification unit 50, verification results display unit 60, setting information collection unit 70, and setting information search unit 80.

Object system 111 is a computer that is the object of verification for errors in security settings by security verification device 100. More specifically, object system 111 corresponds to, for example, an OS (operating system), a web server application, or a web client application.

Setting information collection unit 70 collects from object system 111 security setting information that indicates the security settings in object system 111. In other words, setting information collection unit 70 collects setting information that relates to security from the computer system that is object system 111. In this case, "setting information that relates to security," i.e., security setting information, refers to information that includes object applications, security unit information, and setting information file names. The security unit information is in some cases referred to as "security setting information."

Setting information storage unit 31 is constituted by, for example, a database apparatus, and stores security setting information that has been collected by means of setting information collection unit 70 together with setting information IDs. FIG. 3 is an explanatory view showing an example of the state of data storage of setting information storage unit 31. Setting information IDs and security setting information are stored in setting information storage unit 31 as shown in, for example, FIG. 3.

"Setting information IDs" are identification codes or identification numbers that are uniquely determined for identifying security unit information and are conferred to correspond with each item of security unit information. In addition to security unit information, setting information file names and object applications are placed in correspondence with "setting information IDs."

"Object applications" refers to application programs that are the object of security verification. More specifically, of such entities as the OS, web server application, and web client application, that application in which security setting indicated by the corresponding security unit information have been made corresponds to the "object application."

"Security unit information" is information that indicates the minimum unit of security setting information that serves as the source for generating "arcs" and "nodes." More specifically, the security unit information that is stored in setting information storage unit 31 corresponds to, for example, the content of setting information files that has been set in an object application, the content of user management files of an object application, and the access rights to files or directories.

In this case, "setting information file name" indicates the name of each item of security unit information, and more specifically, is information that indicates the name of a file that contains security unit information, or the storage site in the computer system of the security unit information.

Security setting information includes, for example, at least one of: the name of the application program that is the object of security settings verification; the name of the storage site of setting information such as a file name; file information that indicates the composition of a file or directory; user information that represents information on users that are managed by the object application; access right information that represents access rights between a user and files or directories; the type of program; version information; network configuration information; setting information for access rights to a network; vulnerability correction program application information; setting information for network filtering; IP (Internet Protocol) addresses; and host names.

Program operation information storage unit 30 stores and holds, from the security setting information that has been collected by setting information collection unit 70, the program operation information that describes the operation specifications of the program that is used in object system 111. "Program operation information" is information that is necessary for generating nodes or arcs, and is information that includes security setting information and the types of nodes or arcs that are produced on a model. Program operation information storage unit 30 stores program operation information for each type and version of programs that are used in object system 111. Here, the "type of nodes or arcs that are produced on a model" means the type of program, version information, and the type of nodes or arcs that are produced on a model based on this version information.

"Program operation information" may also include vulnerability information. By including vulnerability information in program operation information, defects of the program, which are vulnerabilities, can also be reflected in a model as program operation information.

FIG. 4 shows an example of the state of data storage of program operation information storage unit 30. As shown in FIG. 4, program operation information storage unit 30 stores program operation information that is placed in correspondence with security setting information and information indicating the types of nodes or arcs that are produced on a model.

The security setting information that is contained in program operation information includes the object application that indicates object system 111, security unit information, and a setting information file name. As shown in FIG. 4, "security unit information" includes, for example, file information, user information, and group information. "Information indicating the types of nodes or arcs that are produced on models" is information that indicates the host layers, nodes, or arcs that are produced on models, such as the host layers, file nodes, user nodes, and group nodes that will be subsequently described and arcs that represent alias definitions.

Data transfer path generation unit 21 has the function of generating data transfer paths based on security setting information (see FIG. 3) and program operation information (see FIG. 4) of object system 111. In the example that is here described, data transfer path generation unit 21 generates data transfer paths in which the paths on which data are transferred in object system 111 have been modeled.

"Data transfer paths" model the paths of movement (transfer paths) of data within object system 111, are determined based on the security setting information and program operation information of object system 111, and represent these paths in a directed graph. Details regarding data transfer paths will be explained hereinbelow using FIG. 23, but data transfer paths are represented by a host layer that represents one computer and a program layer that represents one program.

In a data transfer path, the program layer is represented on the host layer. The program layer may be a plurality of program layers on a host layer. The program layer is represented by arcs and nodes that are managed by means of the program that is the object. When there is a plurality of program layers, there may be inter-program layers that contain the arcs that are managed by the plurality of programs. Alternatively, when there is a plurality of host layers, there may be inter-host layers that contain the arcs that are managed by the plurality of host layers. When all nodes are represented uniquely, a layer configuration is not necessary.

Host layers are produced for each network device such as a computer or router, and these host layers contain interprogram layers and program layers that represent the programs that are contained in these devices.

Program layers are created for each program that is contained in network devices such as computers or routers. Program layers contain nodes that are managed by each of the programs and arcs that represent the relation between nodes.

In other words, "data transfer paths" are expressed by nodes, arcs that represent the relations between nodes, and layers that represent the configuration of these nodes and arcs. Arcs that represent the relations of nodes, i.e., directed graph arcs, include at least one of a data movement relation that represents the movement of data; an affiliation relation that represents the affiliation between a user and a group; an alias definition relation that represents an alias definition of a file or directory and a user or group; and an authority transfer relation for the transfer of authority to another user. Examples of the movement of data include the writing and reading of data.

A "data movement relation" represents the right of a user or group to access files or directories and the ability of a user or group to transmit or receive data with respect to the network stream. More specifically, for example, the arc of a data movement relation from a user node or a group node toward a file node represents the ability for a user or group to write data to a file or directory. The arc of a data movement relation from a file node or group node to a user node represents the ability for the user or group to read the data of a file or directory. The arc of a data movement relation from a user node or group node to a network node represents the ability for the user or group to transmit data to the network stream. Alternatively, the arc of a data movement relation from a network node to a user node or group node represents the ability for the user or group to receive data from the network stream. The arc of a data movement relation between network nodes represents the ability to send and receive data between network streams.

An "affiliation relation" represents the affiliation of a user to a group. More specifically, for example, the arc of an affiliation relation from a user node to a group node represents the affiliation of the user to the group to which the user is linked by the arc.

An "alias definition relation" shows that a plurality of files are the same file. More specifically, for example, the arc of an alias definition relation from a file node to a file node indicates that although the names of files or the programs that manage the nodes at the two ends of an arc may differ, the two are in fact identical.

An "authority transfer relation" shows that a plurality of users or groups is the same user or group. Alternatively, an "authority transfer relation" shows that an operation performed by a particular user or group is realized under the authority of another user or group. More specifically, for example, the arc of an authority transfer relation from a first user or group to a second user or group shows that the first user or group is identical to the second user or group, or that the first user or group performs an operation under the authority of the second user or group.

The nodes of the graph include at least one of: file nodes that represent data, network nodes that represent a network stream that is used by a network service, user nodes that represent user accounts, and group nodes that represent groups of user accounts.

In security verification device 100 of the present embodiment, data transfer path generation unit 21, in accordance with security setting information that has been collected by setting information collection unit 70, submits an inquiry to program operation information storage unit 30 for the operation specifications of the program that is used in object system 111, and generates data transfer paths in the program based on program operation information that indicates the operations that can be executed in object system 111 and security setting information.

Data transfer path information storage unit 32 is constituted by, for example, a database apparatus, and stores data transfer path information that includes: the data transfer paths that have been generated by data transfer path generation unit 21; security setting information that is the cause for producing the arcs and nodes that are included in these data transfer paths, or information (setting information ID) that indicates the location at which this security setting information is saved. The data transfer path information that is stored in this case is information by which the connection relations of the nodes and arcs is understood and that allows modeled data transfer paths to be generated. Further, the data transfer path information that is saved in data transfer path information storage unit 32 may also be data transfer path information following integration of access rights by access right integration unit 40.

Figure 5:
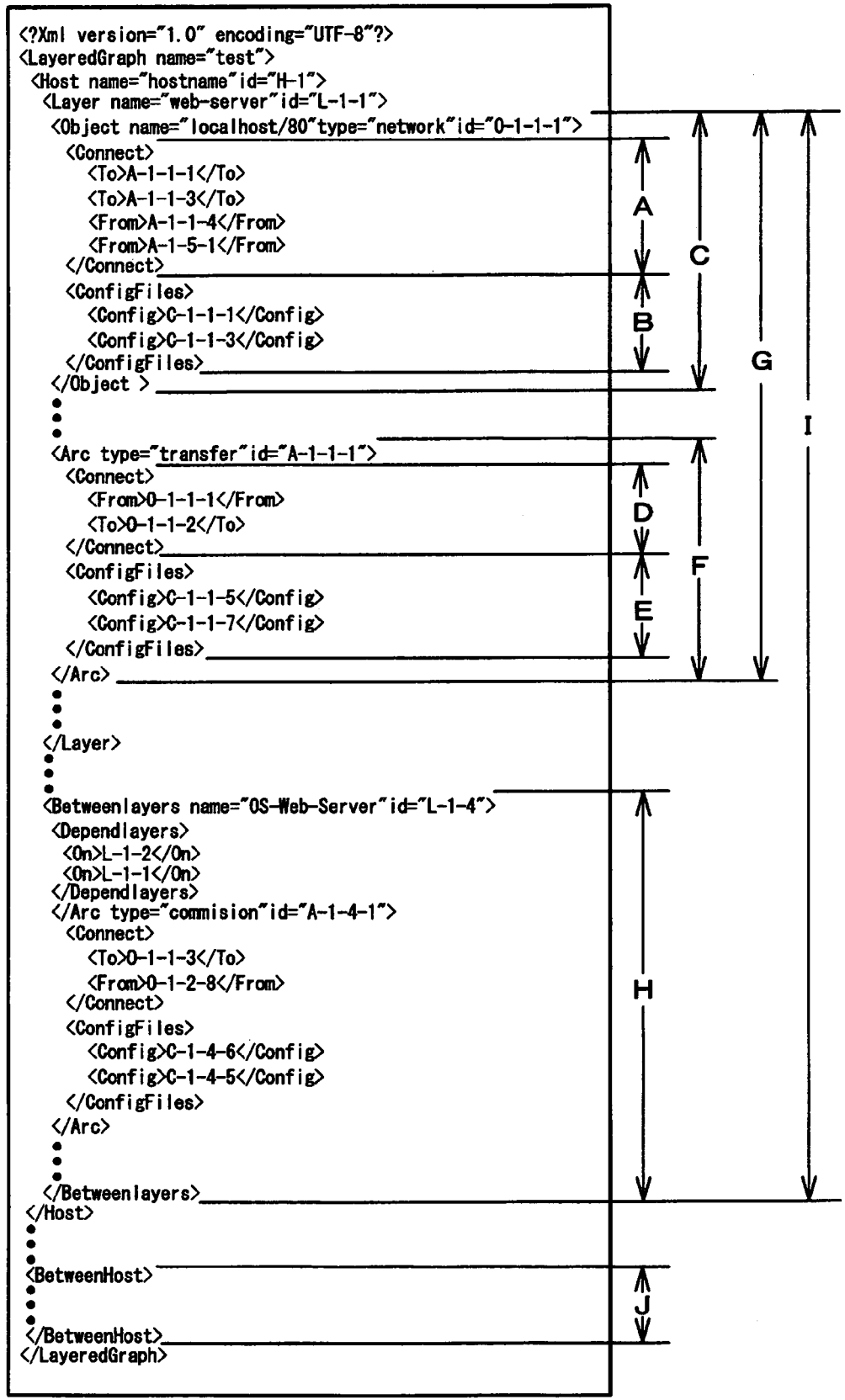
FIG. 5 shows an example of the structure of data that are stored in the data transfer path information storage unit.

FIG. 5 shows an example of the state of data storage of data transfer path information storage unit 32. Data transfer path information storage unit 32 stores a program for modeling and expressing data transfer paths.

As shown in FIG. 5, the data composition of the program that is stored in data transfer path information storage unit 32 includes: an area (i.e., area "I" in FIG. 5) for storing information relating to one computer; an area (i.e., area "G" in FIG. 5) for storing information relating to a program; an area (i.e., area "H" in FIG. 5) for storing information relating to a plurality of programs; an area (i.e., area "F" in FIG. 5) for storing information relating to arcs; an area (i.e., area "C" in FIG. 5) for storing information relating to nodes; areas (i.e., areas "B" and "E" in FIG. 5) for storing identification codes (setting information IDs) of the security setting information that was the cause for generating nodes or arcs, and areas (i.e., areas "A" and "D" in FIG. 5) for storing identification codes of arcs or nodes that are connected to nodes or arcs. Each of these areas may be a plurality of areas, and when a plurality of areas are provided for storing information relating to a computer, an area (i.e., area "J" in FIG. 5) may be provided for storing information relating to a plurality of computers.

In addition, in each of the areas shown in FIG. 5, a name is stored in the "name" attribute, an identification code is stored in the "ID" attribute, and the type of arc or node is stored in the "type" attribute. More specifically, the "type" attribute is, for example, "transfer" in the case of a data movement relation, "commission" in the case of an authority transfer relation, "alias" in the case of an alias definition relation, "attach" in the case of an affiliation relation, "user" in the case of a user node, "group" in the case of a group node, "file" in the case of a file node, and "network" in the case of a network node.

Access right integration unit 40 has the capability of executing processes for submitting an inquiry to program operation information storage unit 30 for the operations of a plurality of programs, and based on the program operation information, integrating, of the access rights of a plurality of programs, the plurality of access rights that can be integrated to a single access right. More specifically, access right integration unit 40 performs a process of integrating a maximum of 4 types of arcs (data movement relations, affiliation relations, alias definition relations, authority transfer relations) that represent the relations of nodes to arcs of two types (data movement relations, affiliation relations). By integrating access rights, access right integration unit 40 further converts data transfer path information to data that can be easily compared with security verification policies.

Policy input unit 10 has the functions of reading security verification policies that are stored in policy storage unit 33 and applying these policies as input to verification unit 50.

"Policies" show access by the paths of data movement and designate at least the initial point and the final point of the path of data movement. Of policies, those policies in particular that represent, by the path of movement of data, improper access for the purpose of security verification are called "security verification policies," as will subsequently be explained using FIG. 31. In other words, "security verification policy" means a policy in which improper data transfer paths are designated in object system ill. Improper data transfer paths include, for example, data transfer paths that must not exist and violation data transfer paths. "Security verification policies" are set in advance by, for example, a system administrator and are stored in policy storage unit 33.

"Policies" may designate not only the initial point and final point of data but also the intermediate path. If the intermediate path is designated, such risks as information leakage can be taken into consideration and a data transfer path that passes by way of a specific path can be designated.

In policies, the nodes that make up a computer system are designated in the initial point, final point, and intermediate path. Nodes include at least one of file nodes, network nodes, user nodes, and group nodes.

Verification unit 50 has the function of executing processing for searching for path that are described by security verification policies among data transfer paths in which access rights have been integrated by access right integration unit 40. Verification unit 50 includes data transfer path conversion unit 51 and pattern matching unit 52.

Data transfer path conversion unit 51 has the function of converting data transfer paths in which a plurality of access rights have been integrated by access right integration unit 40 to data that allows comparison with security verification policies that have been applied as input by policy input unit 10. In other words, data transfer path conversion unit 51 converts the form of expression of data transfer paths that have been generated by data transfer path generation unit 21. Data transfer paths in which a plurality of access rights have been integrated are later explained using FIG. 27, and data that can be compared with security verification policies are later explained using FIG. 29.

Pattern matching unit 52 has the function of searching, from among data transfer paths that have been converted by data transfer path conversion unit 51, for data transfer paths that conform with the security verification policies that have been applied as input by policy input unit 10. A data transfer path that conforms with a security verification policy is referred to as an improper path.

Setting information search unit 80 has the function of using information that indicates improper paths that have been discovered and supplied as output by pattern matching unit 52 and data transfer path information that has been stored in data transfer path information storage unit 32 to search for security setting information that is the cause for generating an improper path (i.e., improper setting information) from security setting information that has been stored in setting information storage unit 31.

In the present embodiment, setting information search unit 80 is configured to search for improper setting information from security setting information that has been stored in setting information storage unit 31, but if security setting information is stored in place of setting information ID in the data transfer path information (refer to FIG. 5), improper setting information can be searched without searching setting information storage unit 31. In such a case, setting information search unit 80 has the function of using improper path information that has been discovered and supplied as output by pattern matching unit 52 and data transfer path information that has been stored in data transfer path information storage unit 32 to search for all nodes and arcs that were the cause for generating improper paths (refer to Steps S291 to S294 that are described hereinbelow), and of searching for improper setting information by searching for security setting information that has been stored together with nodes and arcs that have been discovered using the above-described data transfer path information.

Verification results display unit 60 is composed of a display device such as a liquid crystal display, and has the function providing a screen display of improper settings that are shown by improper setting information that has been discovered by setting information search unit 80. This security verification device 100 is thus capable of pointing out the locations at which setting errors were made, i.e., the locations at which the security setting information was set, to the user of the object system. The improper paths that are indicated by the improper path information may also be displayed.

Explanation next regards the details of the operation of security verification device 100.

Figure 6:
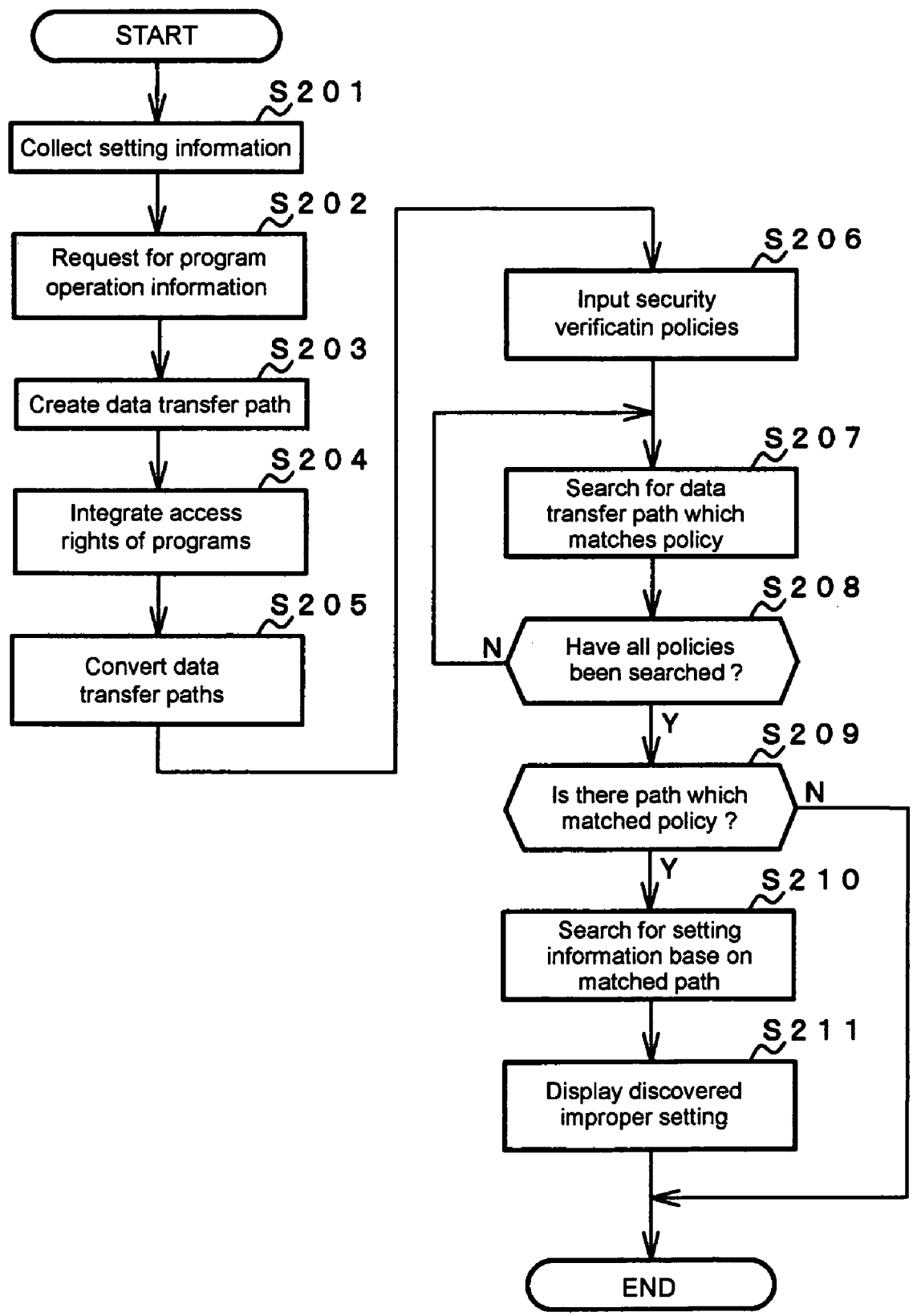
FIG. 6 is a flow chart showing the security verification process that is executed by the security verification device shown in FIG. 2.

FIG. 6 shows an example of the security verification process that is executed by security verification device 100 in the first embodiment.

In the security verification process, setting information collection unit 70 first collects security setting information of object system 111 and stores the collected security setting information in setting information storage unit 31 in Step S201. In Step S202, data transfer path generation unit 21 refers to the security setting information that has been collected and stored in setting information storage unit 31 by setting information collection unit 70 and submits a request to program operation information storage unit 30 for program operation information relating to object system 111. In other words, data transfer path generation unit 21, based on the program name of the object application, the setting information file name, and the security unit information that corresponds to the settings file that is indicated by the setting information file name that have been collected by setting information collection unit 70, submits a request to program operation information storage unit 30 for the type of nodes or arcs that are to be generated on a model.

Data transfer path generation unit 21 then uses the security setting information that has been collected and stored in setting information storage unit 31 by setting information collection unit 70 and the program operation information that has been read in accordance with the request of Step S202 to generate data transfer path information. Data transfer path generation unit 21, after having generated the data transfer path information, stores the generated data transfer path information in data transfer path information storage unit 32.

When producing the data transfer path information in Step S203, data transfer path generation unit 21 produces various types of nodes and arcs, and explanation next regards the production of these nodes and arcs.

Data transfer path generation unit 21 uses information that indicates the user that is contained in the security setting information to submit a request to program operation information storage unit 30 for the nodes to be produced and produces a user node that indicates the user that is contained in the user information. For example, if a user ID that is managed by a particular program is included, data transfer path generation unit 21 produces a user node.

Data transfer path generation unit 21 uses information that indicates a group that is included in the security setting information to submit a request to program operation information storage unit 30 for a node that is to be produced and then produces a group node that indicates the group that is included in the group information. For example, if a group ID that is managed by a particular program is included, data transfer path generation unit 21 produces a user node.

Data transfer path generation unit 21 uses network stream information that is used by a server that is included in the security setting information to submit a request to program operation information storage unit 30 for node that is to be produced and produces a group node that indicates the network stream. For example, if a network stream that is used by a particular program is written, data transfer path generation unit 21 produces a network node.

Data transfer path generation unit 21 uses information that indicates a file structure that is included in the security setting information to submit a request to program operation information storage unit 30 for a node that is to be produced and produces a file node that indicates a file or directory. For example, if file or directory structures that are managed by a particular program are included, data transfer path generation unit 21 produces a file node to correspond to each file or directory.

Data transfer path generation unit 21 uses a file structure, information indicating access rights, or information that a program is installed that is included in the security setting information to submit a request to program operation information storage unit 30 for arcs that are to be produced, and produces arcs that indicate the data movement relations. For example, if a user can read a file, data transfer path generation unit 21 produces an arc that indicates the data movement relation from the file node to the user node.

Similarly, if the user can write to the file, data transfer path generation unit 21 produces an arc that indicates the data movement relation from the user node to the file node. If the user can transmit data to the network stream, data transfer path generation unit 21 produces an arc that indicates a data movement relation from the user node to the network node. If the user can receive data from the network stream, data transfer path generation unit 21 produces an arc that indicates a data movement relation from the network node to the user node. If a group can read the file, data transfer path generation unit 21 produces an arc indicating a data movement relation from a file node to a group node.

Similarly, if a group can write to a file, data transfer path generation unit 21 produces an arc indicating a data movement relation from the group node to the file node. If a group can transmit data to a network stream, data transfer path generation unit 21 produces an arc indicating a data movement relation from the group node to a network node. If a group can receive data from a network stream, data transfer path generation unit 21 produces an arc indicating a data movement relation from a network node to the group node. If data can be transmitted and received between network streams, data transfer path generation unit 21 produces an arc of a data movement relation according to the direction of movement of data between the network streams.

Data transfer path generation unit 21 uses information that specifies users that belong to a group that is contained in the security setting information to submit requests to program operation information storage unit 30 for arcs that are to be produced, and thus produces arcs indicating affiliation relation. For example, if a user belongs to a group, data transfer path generation unit 21 produces an arc of an affiliation relation from the user to the group.

Data transfer path generation unit 21 uses information indicating users that execute programs that are contained in the security setting information to submit requests to program operation information storage unit 30 for arcs that are to be produced, and thus produces arcs indicating authority transfer relations. For example, if a user that is managed by a particular program executes a program by means of the settings of a program execution user as another user that is managed by another program, data transfer path generation unit 21 produces an arc of an authority transfer relation from the particular user node toward another user node.

Data transfer path generation unit 21 uses the file information or the file structure information of a server that is included in the security setting information to submit requests to program operation information storage unit 30 for arcs that are to be produced and thus produces arcs indicating alias definition relations. For example, if a file that is managed at a particular program is managed under an alias at another program, data transfer path generation unit 21 produces an arc of an alias definition relation from the file node that is managed at the particular program toward the file node that is managed at the other program.

In Step S204, access right integration unit 40 reads data transfer path information that has been generated by data transfer path generation unit 21 from data transfer path information storage unit 32, and if an arc indicating an alias definition relation and an arc indicating an authority transfer relation are included in the data transfer path that is indicated by the read data transfer path information, performs a process for integrating, in a data movement relation that exceeds a layer, the access rights between the nodes belonging to the same layer for the four nodes that are at both ends of these arcs. In other words, when the movement of data between the node at the initial point of an arc that indicates an alias definition relation and the node at the initial point of an arc that indicates an authority transfer relation is the same direction as the movement of data between nodes at the final points of the respective arcs, these integrated data movement relation arcs are produced anew and the arcs of the relevant alias definition relation and the authority transfer relation are deleted. Here, the direction of data movement is the direction of data movement from the user (group) nodes to the file nodes or the direction of data movement from the file nodes to the user (group) nodes.

Figure 29:
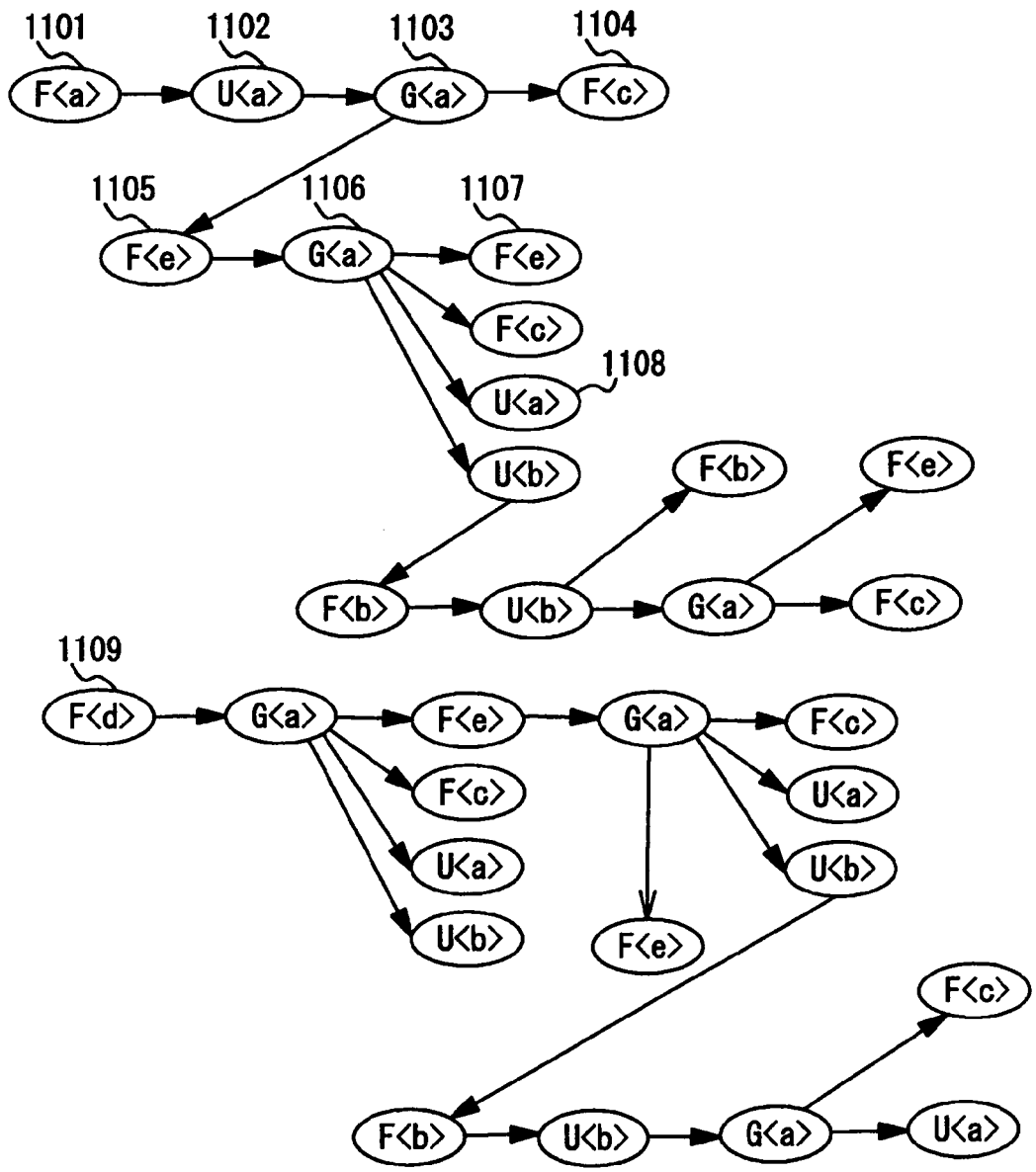
FIG. 29 shows the tree structure representing the converted data transfer paths that are supplied as output from the data transfer path conversion.

In Step S205, data transfer path conversion unit 51 accepts from access right integration unit 40 data transfer path information in which the access rights that are related to a plurality of programs have been integrated, and executes processing to convert the received data transfer path information to data transfer path information that indicates data transfer paths that allow searching for a data transfer path that conforms with the security verification policies. As will be subsequently explained, an example of this type of data transfer path is shown in FIG. 29.

In Step S206, policy input unit 10, in accordance with, for example, the instructions of an operator, reads security verification policies that indicate undesirable data movement paths from policy storage unit 33 and applies these policies as input to pattern matching unit 52.

In Step S207, pattern matching unit 52 compares the data transfer path information that has been converted by data transfer path conversion unit 51 with the security verification policies that have been applied as input by policy input unit 10, and searches to determine whether a data transfer path that agrees with the security verification policies exists within the data transfer paths indicated by the data transfer path information.

As shown in Step S208, the search process of Step S207 is repeatedly executed for each of the security verification policies that have been applied as input by policy input unit 10 and executed for all of the security verification policies that have been applied as input by policy input unit 10. When it is determined that the search process has been completed for all of the security verification policies in Step S208, pattern matching unit 52 supplies the result of the search process as output to setting information search unit 80.

Upon receiving the results of the search process, setting information search unit 80 checks in Step S209 whether an improper path has been discovered. If an improper path was not found, the process may simply end at this point, or the process may end after displaying that an improper path was not discovered.

If an improper path occurred in Step S209, setting information search unit 80 executes a process in Step S210 for searching among the security setting information that is stored in setting information storage unit 31 to find the improper settings that were the cause for generating the discovered improper path. Upon receiving the search results, verification results display unit 60 then performs a process in Step S211 for displaying the improper setting information that indicates the improper settings that have been discovered and then ends the series of processes.

As previously explained, this first embodiment is configured to compare data transfer paths that are based on the security setting information of programs that are used in object system 111 with security verification policies that indicate paths of undesirable movement of data to search for data transfer paths that include improper paths that are based on improper settings, and as a result, is capable of specifying that a setting is an improper setting and single out the setting to a user even when it is not possible to determine whether a setting is an improper setting by merely verifying each of the settings of the object system. In other words, the present embodiment enables the discovery of composite setting errors that have a potential for causing difficulties because they exist as a plurality even when each of the setting errors would not by itself cause a problem, enables the verification of the existence or absence of composite setting errors, and allows a rigorous verification of security settings.

The present embodiment adopts a configuration in which security setting information is collected from object system 111, data transfer path are modeled, and security verification policies are designated to verify the existence of improper settings, and thus is capable of specifying improper settings in accordance with the actual operating state of object system 111. Accordingly, object system 111 can actually be safely operated. In other words, verification can be realized before operation of object system 111 and the verification results then employed as a guide for security settings. In the present embodiment, moreover, the existence of composite setting errors is verified without adopting a method such as a pseudo-attack that would place a large burden on object system 111, and the load upon object system 111 during verification can therefore be reduced.

Second Embodiment

Figure 7:
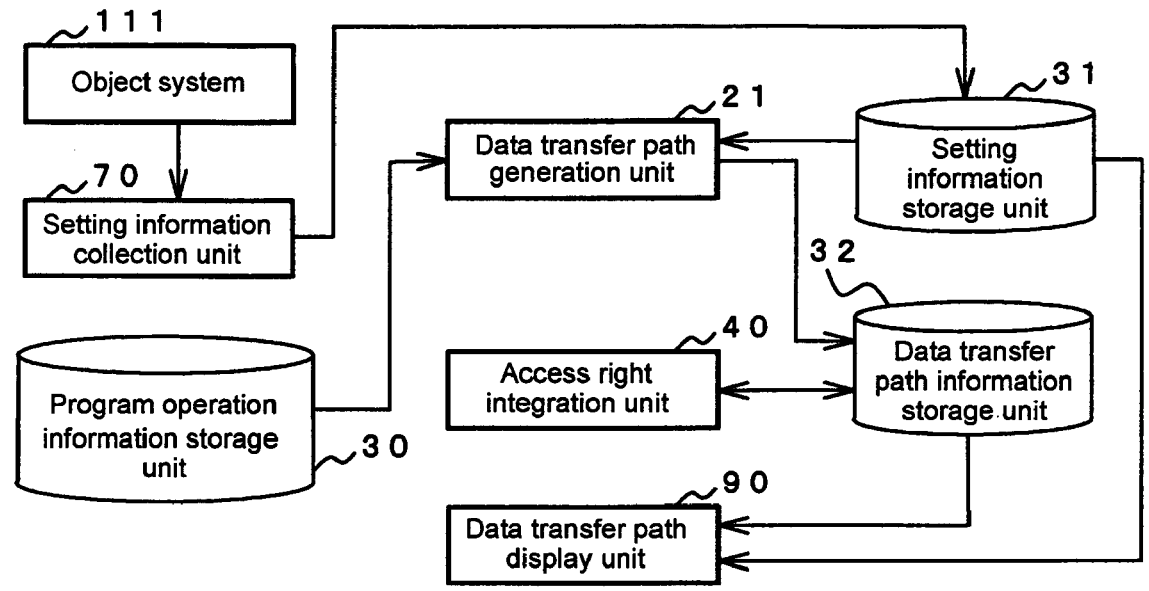
FIG. 7 is a block diagram showing the configuration of a security verification device according to the second embodiment of the present invention.

FIG. 7 shows an example of the configuration of security verification device 100*a* according to the second embodiment of the present invention. In the following explanation, parts that have the same composition and perform the same processes as in security verification device 100 in the above-described first embodiment are given the same reference numerals and detailed explanation of these portions is abbreviated.

As shown in FIG. 7, security verification device 100*a* according to the second embodiment verifies the security settings of object system 111, and includes: setting information collection unit 70, setting information storage unit 31, program operation information storage unit 30, data transfer path generation unit 21, data transfer path information storage unit 32, access right integration unit 40, and data transfer path display unit 90.

Data transfer path display unit 90 is constituted by a display device such as a liquid crystal display device and has the function of providing screen display of data transfer paths that are indicated by data transfer path information that is stored in data transfer path information storage unit 32 in association with the security setting information that is stored in setting information storage unit 31. More specifically, data transfer path display unit 90 effects screen display of data transfer paths that have been generated by data transfer path generation unit 21 and data transfer paths that have been generated by access right integration unit 40.

Figure 8:
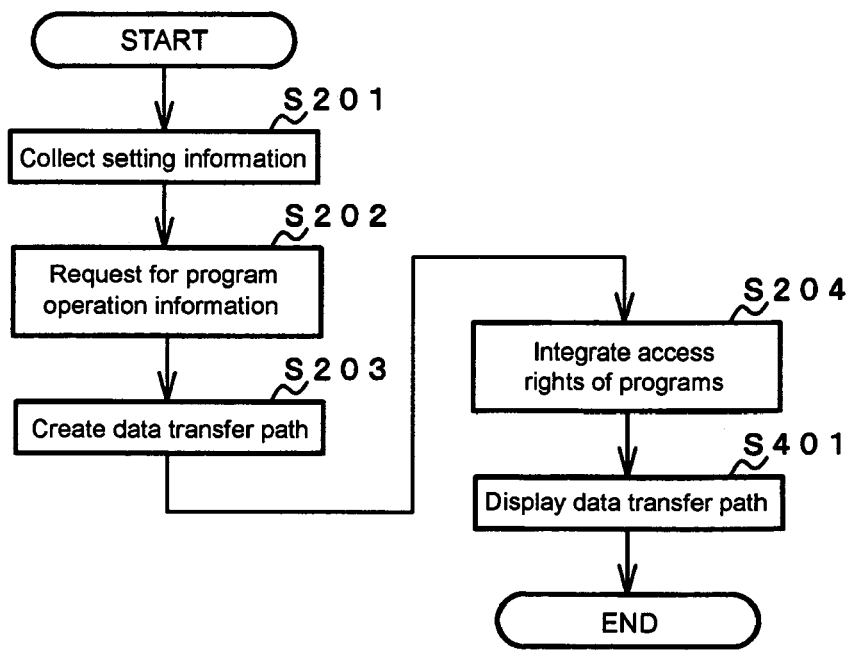
FIG. 8 is a flow chart showing the security verification process that is executed by the security verification device shown in FIG. 7.

Explanation next regards the operation of security verification device 100*a* in the present embodiment. FIG. 8 shows an example of the security verification process that is executed by security verification device 100*a*.

In the security verification process of the second embodiment, the processes of Steps S201 to S204 that were previously described in the first embodiment are first executed. Then, in Step S401, data transfer path display unit 90 provides screen display of the data transfer paths that are indicated by the data transfer path information that was generated by access right integration unit 40 and that is stored in data transfer path information storage unit 32 in association with the security setting information that is stored in setting information storage unit 31. In other words, data transfer path display unit 90 displays the data transfer path represented by the data transfer path information that was generated by access right integration unit 40 in association with security setting information that includes the security unit information that corresponds to the setting information ID that is contained in this data transfer path information.

In the above-described example, data transfer path display unit 90 is configured to search setting information storage unit 31 for security setting information that corresponds to setting information IDs that are contained in data transfer path information that was generated by access right integration unit 40 and then read this information, but when security setting information is stored in place of setting information IDs in data transfer path information that has been generated by access right integration unit 40, security setting information can be specified without searching setting information storage unit 31. In such a case, data transfer path display unit 90 may display the data transfer paths that are indicated by data transfer path information that has been generated by access right integration unit 40 in a display state that allows recognition of security setting information that is contained in this data transfer path information (for example, by highlighted display).

As described hereinabove, the second embodiment is realized such that security setting information is collected from object system 111, data transfer paths are modeled, and the data transfer paths are displayed on a screen, and thus allows checking of the flow of data relating to a plurality of programs, this flow not being verifiable based on only the individual settings. As a result, a person involved in verifying the system can check the flow of data after performing actual settings and verify that the settings are correct. In addition, the present embodiment allows display of the flow of data and the security settings that are the cause for producing this flow in association with each other, and the present embodiment thus assists the user of security verification device 100*a* in discovering composite setting errors.

Third Embodiment

Figure 9:
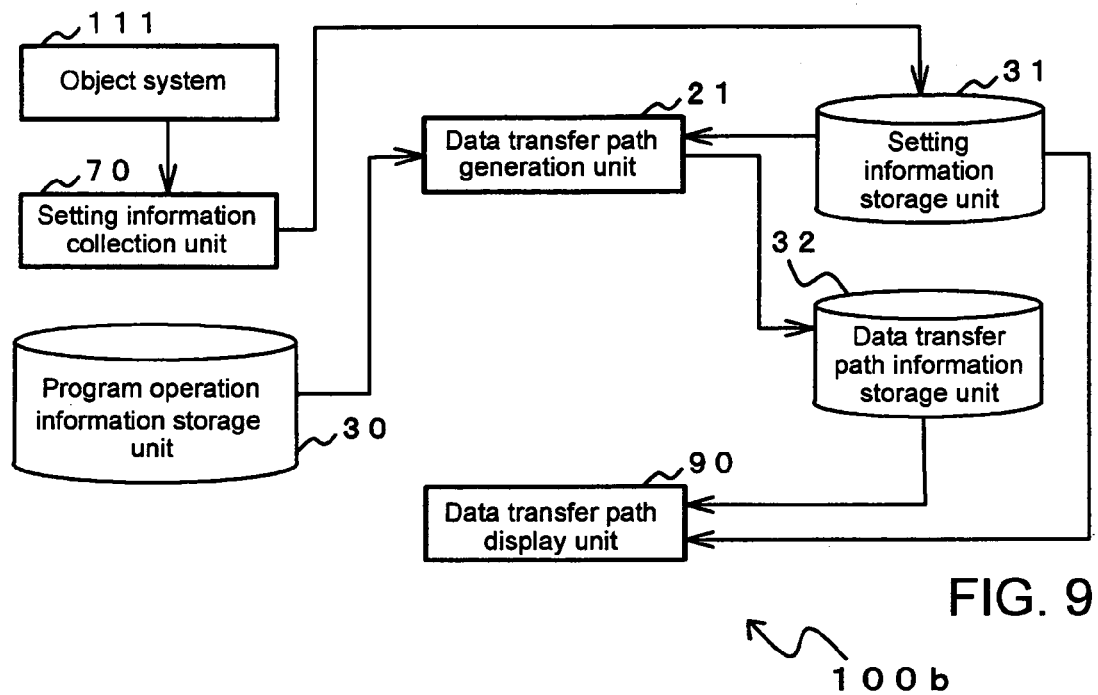
FIG. 9 is a block diagram showing the configuration of a security verification device according to the third embodiment of the present invention.

FIG. 9 shows an example of the configuration of security verification device 100*b* according to the third embodiment of the present invention. In the following explanation, parts that have the same composition and perform the same processes as in security verification device 100*a* in the previously described second embodiment are given the same reference numerals and detailed explanation of these parts is here abbreviated.

Security verification device 100*b* according to the third embodiment is similar to security verification device 100*a* according to the second embodiment but differs in that access right integration unit 40 is not provided.

In the present embodiment, data transfer path display unit 90 implements screen display of the data transfer paths that are indicated by the data transfer path information that has been generated by data transfer path generation unit 21.

The third embodiment is thus configured to collect the security setting information of the computer system of object system 111, generate data transfer paths in accordance with program operation information, and display data transfer paths that have been generated, whereby each item of the security setting information can be checked by checking the data transfer paths that are displayed. Accordingly, a user such as a system verifier can easily recognize erroneous composite settings of a specific program.

Fourth Embodiment

Figure 10:
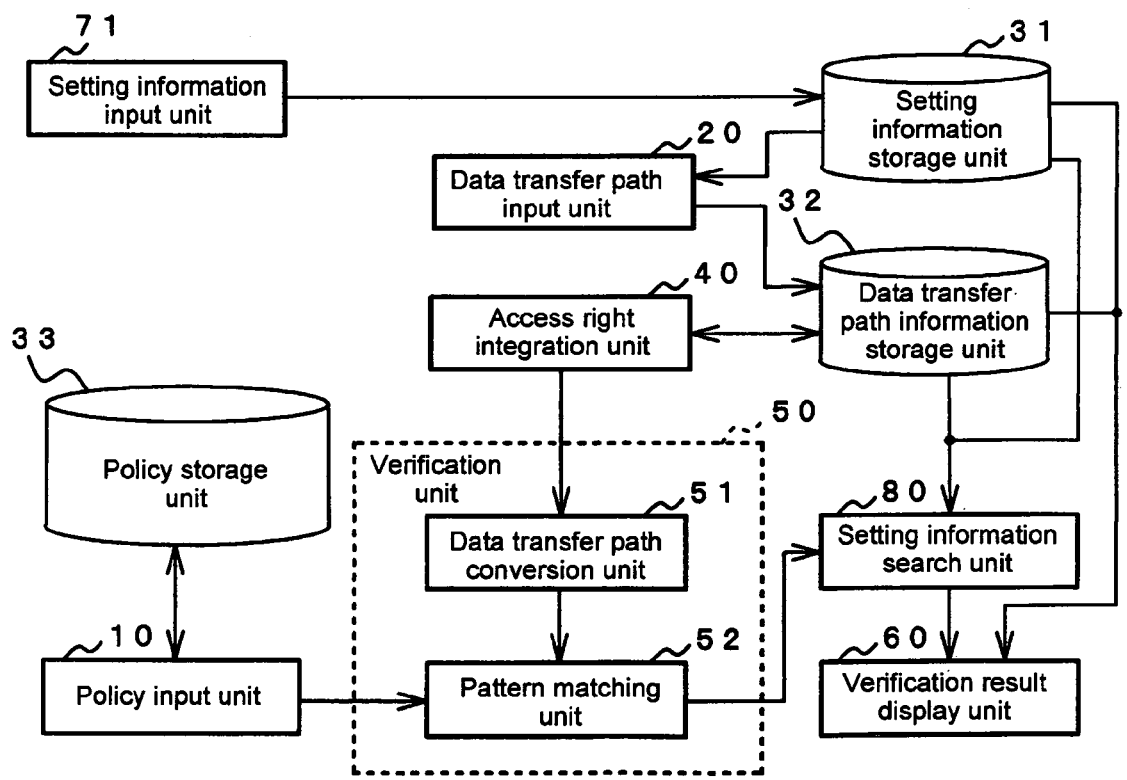
FIG. 10 is a block diagram showing the configuration of the security verification device according to the fourth embodiment of the present invention.

FIG. 10 shows an example of the configuration of security verification device 100c according to the fourth embodiment of the present invention. In the following explanation, parts that have the same composition and perform the same processes as parts in security verification device 100 of the previously described first embodiment are given the same reference numerals and detailed explanation of these parts is here omitted.

Security verification device 100c according to the fourth embodiment is similar to security verification device 100 of the above-described first embodiment, but differs in that data transfer path input unit 20 is provided in place of data transfer path generation unit 21, and setting information input unit 71 is provided in place of setting information collection unit 70. In other words, this security verification device 100c is configured to receive input of data transfer paths that are designated by a user by means of data transfer path input unit 20, and to receive security setting information that has been designated by the user by means of setting information input unit 71.

Data transfer path input unit 20 has the function of supplying data transfer path information storage unit 32 with data transfer path information that has been designated (selected and applied as input) by the operation of a user such as a system verifier and of storing this information in data transfer path information storage unit 32.

Setting information input unit 71 has the function of supplying setting information storage unit 31 with security setting information (refer to FIG. 3) that has been designated (selected and applied as input) by means of the operations of a user such as a system verifier and of storing the information in setting information storage unit 31. Setting information input unit 71 further has the function of, in accordance with the operations of the user, applying as input, for each of the arcs and nodes of data transfer paths that have been applied as input by data transfer path input unit 20, security setting information that indicates the security settings that are the cause for the input of these data transfer paths, this input being applied in correspondence with the arcs and nodes. In accordance with the user's designation of nodes or arcs together with the security setting information that is the cause for producing these nodes or arcs, setting information input unit 71 stores in setting information storage unit 31 the security setting information that has been placed in correspondence with arcs and nodes.

In addition to the above-described functions, setting information input unit 71 has a function of supplying setting information storage unit 31 with security setting information that has been designated by means of the operations of a user such as a system verifier and of storing the security setting information in setting information storage unit 31, and a function of applying, as input in correspondence with arcs and nodes for each arc and node of the data transfer paths that have been applied as input by data transfer path input unit 20 in accordance with operations by the user, security setting information that indicates the security settings that are the cause for receiving these data transfer paths.

Security verification device 100c is effective when the user has the ability to check the security setting information and operation information of the programs in object system 111 and the ability to generate data transfer path information that indicates the paths of movement of data in object system 111. In other words, security verification device 100c can verify whether an improper path that is based on improper settings is included in data transfer path information that is generated by the user.

In the present embodiment, setting information input unit 71 applies security setting information that has been set by the user as input to setting information storage unit 31 in accordance with the user's operations in the security verification process. Data transfer path input unit 20 next applies data transfer path information that has been set by the user to data transfer path information storage unit 32 in accordance with operation by the user. The processes of Step S204 to Step S211 that were explained in the first embodiment are then executed.

The fourth embodiment is thus structured such that the security verification process is executed using data transfer path information and security setting information that have been designated by a user such as a system verifier, and therefore can verify whether an improper path that is based on improper settings is included in the data transfer path information that has been generated by the user. Further, the embodiment may be configured such that one of security setting information or data transfer path information is designated by the user.

The foregoing explanation concerned a configuration that uses data transfer path information and security setting information that have been designated by a user such as a system verifier, but a configuration is also possible that employs data transfer path information that has been generated by another system other than security verification device 100c and security setting information that has been collected by another system. Such a configuration enables verification of whether an improper path that is based on improper settings is included in data transfer path information that has been generated by another system. More specifically, using the output of a system that makes, for example, security settings or equipment settings, i.e., a system that sets a network or equipment, as the input that is applied to security verification device 100c of the fourth embodiment enables the verification of whether settings that are to be made match security verification policies and allows improper settings to be singled out. This approach can facilitate application for safer security settings and system design. Further, coordination with, for example, resource management software for software and hardware and version management software for managing software versions and applying output that is based on this software to security verification device 100c enables defects in the settings of a currently operating system to be pointed out, Fifth Embodiment FIG. 11 shows the configuration of security verification device 100d according to the fifth embodiment of the present invention. In the following explanation, parts having the same composition and that perform the same processes as parts in security verification device 100 in the previously described first embodiment are given the same reference numerals, and detailed explanation regarding these parts is here omitted.

As shown in FIG. 11, security verification device 100d according to the fifth embodiment includes: setting model input unit 11, setting model storage unit 34, policy input unit 10, policy storage unit 33, verification unit 50a, verification results storage unit 35, and verification results display unit 60.

Policy input unit 10 is operated by a user such as a system verifier and has the function of describing security verification policies and storing these policies in policy storage unit 33.

Setting model input unit 11 is operated by a user such as a system verifier and has the function of applying setting models that accord with the system configuration. Detailed explanation regarding "setting models" will be given hereinbelow. Setting model input unit 11 takes as input setting models that reflect the security setting information, which is the setting information that relates to the security of devices that make up the object system.

Setting model storage unit 34 is made up by, for example, a database apparatus, and stores the setting models that have been applied as input by setting model input unit 11.

Verification unit 50a extracts policies that have been stored in policy storage unit 33, compares these with setting models that have been stored in setting model storage unit 34, and verifies whether setting models are present that match with security verification policies or whether setting models are present that do not match with the security verification policies.

In the fifth embodiment, the term "security verification policies" refers not only to policies that describe conditions that should not be met in the object system, but also to policies that describe conditions that should be met in the object system. In addition, to distinguish the two types of policies, the former is referred to as "prohibition policies" and the latter is referred to as "permission policies." "Security verification policies" are later described in detail, but are described using symbols such as: b( ), acc( ), cas( ), auth( ), and flow( ).

Verification results storage unit 35 is made up by, for example, a database apparatus, and stores the verification results produced by verification unit 50a. More specifically, when the results indicate matching with security verification policies, verification results storage unit 35 stores as verification results both the relevant security verification policy and the setting model that matched the policy. When the results indicate no matching with security verification policies, verification results storage unit 35 stores the relevant security verification policies. In this case, verification results storage unit 35 may store the policies together with a symbol that indicates that matching did not occur.

To present to the user the verification results that have been produced by verification unit 50a and stored in verification results storage unit 35, verification results display unit 60 has the function of executing a process for displaying security verification policies together with setting models that have matched with these security verification policies or symbols indicating that no matching occurred.

Explanation next regards the "setting models."

"Setting models" are models of the configuration of the object system to be verified that are based on the security setting information and program operation information of the object system. Setting models are descriptions produced by, for example, a verifier or designer and employ a model description language to describe the overall configuration and operation of the object system. "Model description language" is a descriptive language that can represent, for example, the system configuration and security settings.

This type of "setting model" is composed of a plurality of elements that are specified by program operation information (see FIG. 4). More specifically, the elements that make up a setting model correspond to, for example: a set of hosts that represents the hosts that make up the object system, a network connection expression that represents the network configuration of the object system, a set of users that represents users or groups, a set of files that represents data storage locations, a set of service names that represents operations by users upon files or the network service, an access control matrix expression that represents the authority of users with respect to files, a network access expression that expresses network filtering, an authority acquisition relation of the network service that represents the authority acquisition relation between users that use a network, and a cascade relation that represents services that, when a user uses a network service or an affiliation relation of users and groups to acquire the authority of another user, can be used under the authority of the user that has acquired authority.

Explanation next regards the details of the elements that make up setting models.

"Host" represents a network device such as a computer or router and has one or more IP addresses.

"Network connection expression" represents the network configuration on the level of the internet layer of the object system, and is represented as a non-directed graph that takes IP addresses as nodes. More specifically, a network connection expression that is composed of the five IP addresses, for example, "192.168.1.1", "192.168.1.2", "192.168.2.3", "192.168.2.4", and "192.168.2.5" takes these five IP addresses as nodes and represents the connection configuration of each node by a graph that shows a connection relationship that lacks directionality. An example of such a network connection expression is shown in FIG. 58, to be explained hereinbelow.

A "network access expression" expresses as a model the operations of network filtering devices that deny or permit the passage of a packet according to the IP address or port number of this packet when the packet is communicated through a network Such a "network access expression" is expressed by the set of the four items: IP addresses of hosts in which network filtering is implemented; IP address of the source of the packet that is the object of control; IP address of the destination; and port number of the destination. More specifically, a network access expression is expressed by means of symbols that signify the content of the above-described four classes, such as "n(ip1, s-ip, d-ip, d-port)." This expression "n(ip1, s-ip, d-ip, d-port)" means that a TCP (Transmission Control Protocol) connection is permitted at the host having the IP address "ip1" in which the transmission origin IP address is "s-ip," the transmission destination IP address is "d-ip," and the port number of the transmission destination is "d-port."

The "network access expression" may include the source port number. When this configuration is adopted, packet filtering by means of the source port number can also be expressed. The "network access expression" may also include the protocol type. The adoption of this form allows the expression of not only TCP packet filtering, but also of UDP (User Datagram Protocol) packet filtering.

In addition, a "network access expression" may also express a prohibition case as a model without expressing a permission case. The adoption of this form allows network access expressions to be described concisely and simply in a system in which permission is set as a fundamental rule. Such a case necessitates inversion of the determination of the permission or denial of the passage of packets, which will be described hereinbelow. More specifically, in the case of a permitted network access expression, the inclusion of a network access expression in the setting model allows determination that communication is permitted, while in the case of a prohibited network access expression, the lack of a network access expression in the setting model allows determination that communication is permitted.

"User" means the subject of access control in the file access control structure of an operating system (OS) and application software. More specifically, "user" is defined by means of file "/etc/passwd" and group is defined by means of file "/etc/group" in the Linux operating system, and a user and group that are thus defined are "users" in a setting model. In an Apache server, the subjects of the file access control structure belonging to a server can be defined by the file "htpasswd," and these subjects also correspond to "users."

A "user" belongs to a host. The affiliation relation of this user is expressed by, for example, "b(u1)=h1. The expression "b(u1)=h1" means that user "u1" belongs to host "h1."

"File" refers to the object of access control in the file access control structure of an OS or application software. "File" does not refer to the actual content of data, but rather, to the location of data that is identified by, for example, a path name. A "file" belongs to a host. The affiliation relation of this file is expressed by, for example, "b(f1)=h1." The expression "b(f1)=h1" means that file "f1" belongs to host "h1."

"Service name" refers to the name of an operation (such as "read" or "write") that a user can execute upon a file, or to the name of a service (such as "http" or "ssh") that is received by a user by way of a network. The service name "null" that represents a vacant service is also defined. As will later be explained, service "null" can also describe the relation of user and group in a typical OS.

"Access control matrix expression" represents whether a user is permitted to read from or write to a file and is expressed by user "u," file "f," and service "s" that represents "read" or "write." Access control matrix expression "acc(u, s, f)" indicates that user "u" is able to perform service "s" upon file "f." More specifically, if user "tutor" is able to read file "answer.txt," the access control matrix expression is "acc(tutor, read, answer.txt)."

"Authority acquisition relation" indicates that a user of a particular host can use a service to acquire the authority of another user. The authority acquisition relation "auth (u1, s, u2)" indicates that user "u1" can use service "s" to acquire the authority of user "u2. " More specifically, "auth(student, telnet, guest)" indicates that user "student" can use service "telnet" to log in as a user "guest." In this case, user "student" can access files on the host to which user "guest" belongs by the authority of user "guest." Alternatively, "auth(taro, null, student)" indicates that when user "taro" and group "student" belong to the same host, user "taro" belongs to group "student." In this case, user "taro" can unconditionally access files on the host to which the group "student" belongs by the authority of the user "student."

"Cascade relation" indicates a relation in which a user uses a service to acquire the authority of another user and thereby gain the ability to use the acquired authority to access services. This "cascade relation" is determined by the user following acquisition of authority and the type of service that was used to acquire authority, and is expressed by the symbol "cas(s1, u, s2)" when service "s1" is used to acquire the authority of user "u" and thus gain the ability to use service "s2." More specifically, when service "telnet" is used to acquire the authority of user "u" and thus enable use of service "ftp," the expression is "cas(telnet, u, ftp)."

Explanation next regards each of the symbols for composing a security verification policy.

The symbols b( ), acc( ), auth( ), and cas( ) for composing security verification policies are used for expressing an affiliation relation, an access control matrix expression, an authority acquisition relation, and a cascade relation, respectively. In addition, flow( ) for composing a security verification policy is used for expressing a data flow relation between two files. For example, the security verification policy "flow(file-a, file-b)" indicates that data flows from file "file-a" to file "file-b." In other words, this expression indicates that the content of file "file-a" is written via any user or service to file "file-b."

Linking each of these predicates (symbols) enables the expression of the flow of data within a system. This linking is an AND combination (represented by "∧") and indicates that the entirety is realized for those cases in which all predicates are realized. In addition, logic variables can be used in each predicate.

For example, the expression (b(U)=h)∧ (b(F1)=h1)∧ acc (U, read, f)∧ auth(u1, ftp, U)∧acc (u1, write, F1) indicates that a particular user "U" belongs to host "h," a particular file "F1" belongs to host "h1," user "U" reads file "f," user "u1" uses service "ftp" to acquire the authority of user "U," and user "u1" can write to file "F1." In other words, user "u1" uses service "ftp" to read file "f" on host "h" and then writes to a file on host "h1." The use of an upper-case alphabetical character in the predicate indicates a logical variable, i.e., indicates any user, file, host, or service.

Policy storage unit 33 stores and holds security verification policies that have been applied as input by policy input unit 10. More specifically, policy storage unit 33 stores security verification policies in a format such as shown in FIG. 12. A plurality of security verification policies can be stored in a file or database for storing security verification policies, and these files or databases can store not only security verification policies, but also information that accompanies security verification policies.

Information that accompanies security verification policies includes policy classifications and explanations that record the meanings of policies in a manner that the general public can understand. Policy storage unit 33 stores whether a security verification policy represents a permission policy or represents a prohibition policy. For example, as shown in FIG. 12, when the "type" attribute of the "policy" element is "allow," a permission policy is represented that indicates that the setting model that corresponds to the policy must exist, and when the "type" attribute is "deny," a prohibition policy is represented in which the model that corresponds to the policy must not exist.

Explanation next regards the details of operation of security verification device 100d.

Figure 13:
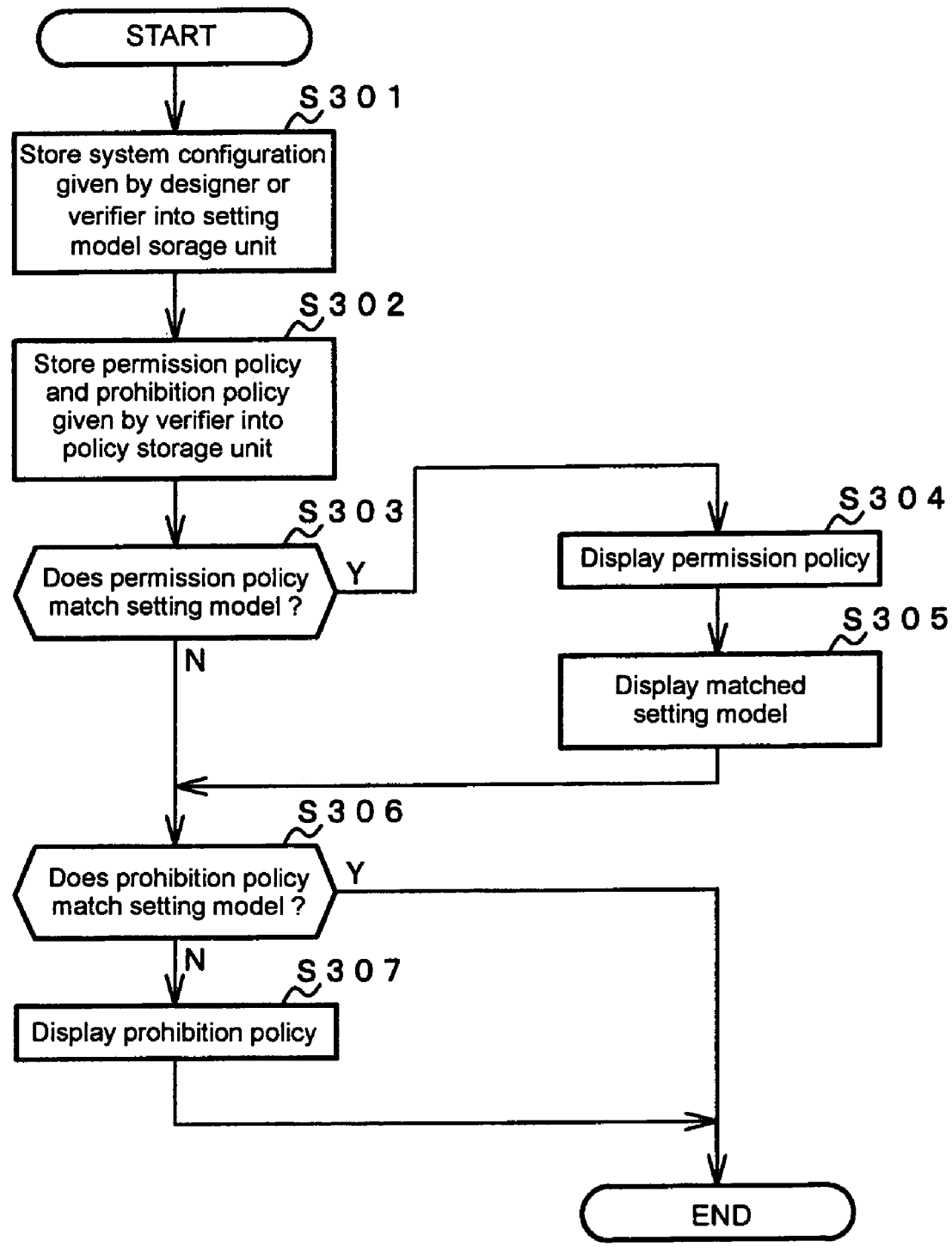
FIG. 13 is a flow chart showing the security verification process that is executed by the security verification device shown in FIG. 11.

FIG. 13 is a flow chart showing the security verification process that is executed by security verification device 100d.

First, when a user such as a security verifier or a system builder operates setting model input unit 11 and applies as input a setting model that accords with the system that is the object of examination or the system configuration of a system that is to be constructed, setting model input unit 11 stores the setting model input in setting model storage unit 34 in Step S301. When the user operates policy input unit 10 to apply as input security verification policies that indicate the conditions that the system must fulfill or must not fulfill, policy input unit 10 stores the security verification policies in policy storage unit 33 in Step S302. Next, in accordance with the verifier's instructions, verification unit 50*a* extracts one or more security verification policies from policy storage unit 33.

If the received policy is a permission policy, verification unit 50*a* searches to determine whether a setting model that matches this permission policy exists in Step S303. If the result of the search shows that a matching setting model exists, verification unit 50*a* displays the permission policy in Step S304, displays the setting model that matches this permission policy in Step S305, and then proceeds to Step S306. If in Step S303 a setting model that matches the permission policy does not exist, the process similarly proceeds to Step S306.

In Step S306, if the policy that has been received as input is a prohibition policy, verification unit 50*a* searches to determine whether a setting model that matches this prohibition policy exists. If the prohibition policy matches a setting model, the process simply ends at this point, but if the prohibition policy does not match a setting model, verification results display unit 60 displays this prohibition policy together with a symbol that indicates that matching did not occur in Step S307.

Figures 14, 15:
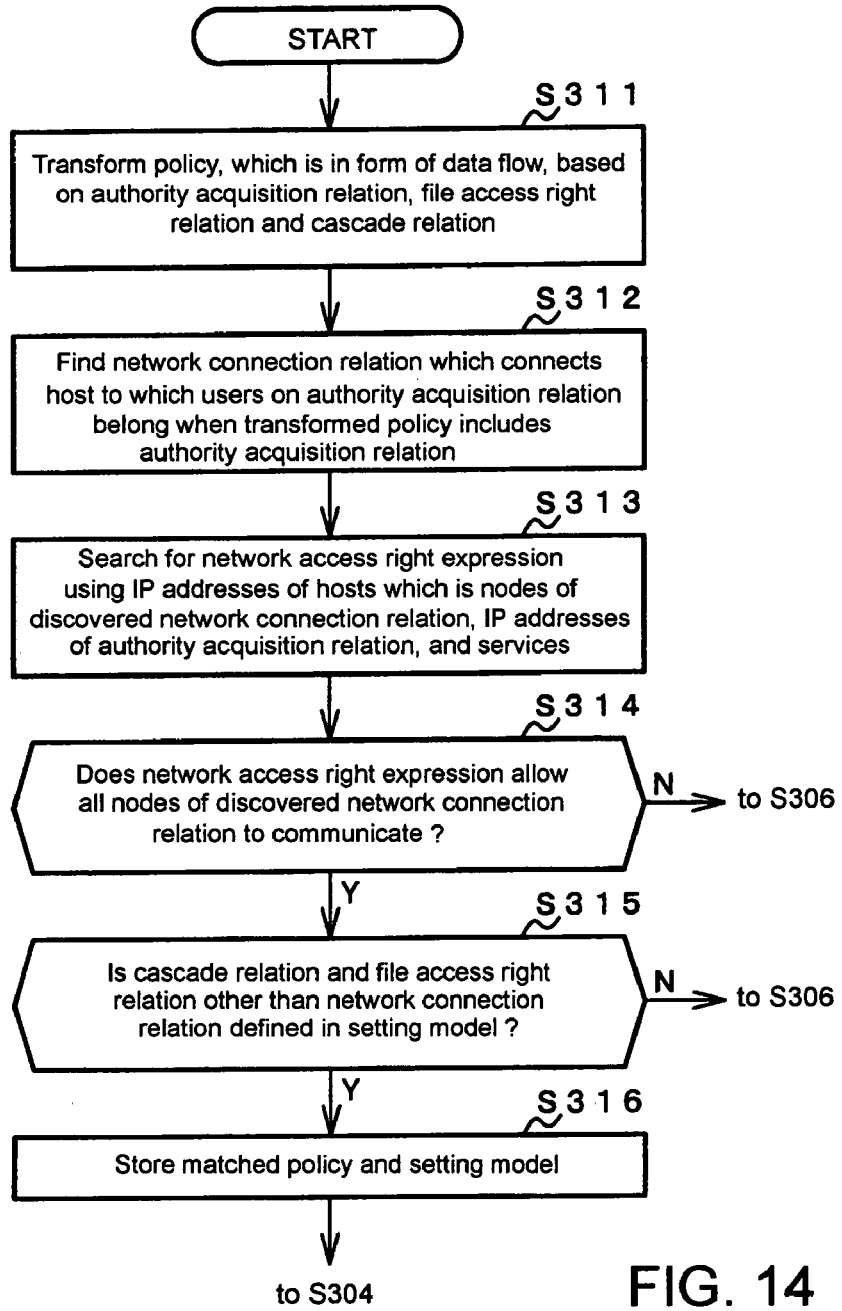
FIG. 14 is a flow chart showing the process that is executed by the verification unit in the security verification device shown in FIG. 11.
FIG. 15 shows an example of the rules for converting policies.

FIG. 14 is a flow chart showing an actual example of the process in Step S303 of the security verification process that is shown in FIG. 13. FIG. 15 shows an example of the rewrite rule that is used in this process.

When a data flow relation is included in the policy that is the object of verification, verification unit 50*a* in Step S311 transforms the data flow relation to an expression that accords with, for example, an authority acquisition relation by means of a predetermined rewrite rule that is shown in FIG. 15. In the example described here, verification unit 50*a* verifies whether each of the relations that indicate a permission policy after transformation satisfies a respective setting model. If the policy includes an authority acquisition relation, verification unit 50*a* uses the IP addresses of the hosts to which the two users that are included in the authority acquisition relation belong and finds from the network connection expression the configuration of the network that connects the two users in Step S312. In this way, the set of IP addresses that make up the network that connects the two users is found.

In Step S313, verification unit 50*a* next uses the IP addresses of the network structure that has been found, the IP addresses to which the two users belong, and the port numbers that are used by services included in the authority acquisition relation to search for a network access rights expression. Upon finding the network access rights expression, verification unit 50*a* checks whether the relevant network access is permitted based on the discovered network access rights expression in Step S314. More specifically, when the IP addresses of the users of the authority acquisition relation are transmission origin IP address "10.56.1.2" and transmission destination IP address "10.56.1.3," the port number that is used by the service is "80," and the set of IP addresses that connects the two users is IP address "10.56.3.1" and IP address "10.56.3.2," verification unit 50*a* searches to determine whether n(10.56.3.1, 10.56.1.2, 10.56.1.3, 80) and n(10.56.3.2, 10.56.1.2, 10.56.1.3, 80) are included in the network access rights expression that has been found. If either of the above-described symbols is not included in the network access rights expression, verification unit 50*a* determines that the authority acquisition relation that is included in the security verification policy does not match the setting model, and the process then proceeds to Step S306.

If communication is permitted in the network access rights expression in Step S314, verification unit 50*a* searches to determine whether each of the relations that are included in the security verification policy other than the network connection relation is defined by a setting model in Step S315. If a relation that is not defined by a setting model occurs in any of the relations other than the network connection relation, verification unit 50*a* determines that the policy does not match the setting model and proceeds to Step S306.

If all of the relations that are included in the security verification policy are defined by a setting model in Step S315, verification unit 50*a* determines that the policy matches the setting model and stores the policy together with the search results in the verification results storage unit in Step S316.

As described above, the fifth embodiment is configured such that policies that represent the movement of data within the object system are used to search a setting model that represents the settings of the overall system, and as a result, a designer or verifier can discover settings that differ from the intended operation or setting errors that relate to a plurality of computers.

Although not particularly mentioned in each of the embodiments described in the foregoing explanation, each of security verification devices 100, 100*a*, 100*b*, 100*c*, and 100*d* executes the various processes described above in accordance with a computer program, i.e., a security verification program, which is provided either inside or outside the system. In other words, security verification device 100 executes the processes shown in the above-described FIG. 6 in accordance with a security verification program.

More specifically, the security verification program is a security verification program for verifying the presence or absence of improper settings that indicate composite errors in the security settings in object system 111; and for example, is a program for causing security verification device 100 to execute steps of:

reading data transfer paths, which represent movement of data in the relevant object system and which are generated based on program operation information that describes the operations of programs that are used in the object system, from a data transfer path storage unit that has stored the data transfer paths;

integrating access rights of data transfer paths that have been read; and searching for improper paths from among data transfer paths for which access rights have been integrated based on security verification policies in which improper paths, which are paths of data movement that are improper from the standpoint of security, have been set in advance.

Further, the security verification program may be a program for causing security verification device 100 to execute, for example, a step of searching for composite security settings that permit data movement on improper paths that have been discovered based on program operation information.

The scope of the present invention therefore includes a program, software, or program product that cause a computer to function as the above-described security verification device.

EXAMPLES

The present invention is further explained using working examples.

Example 1

Figure 16:
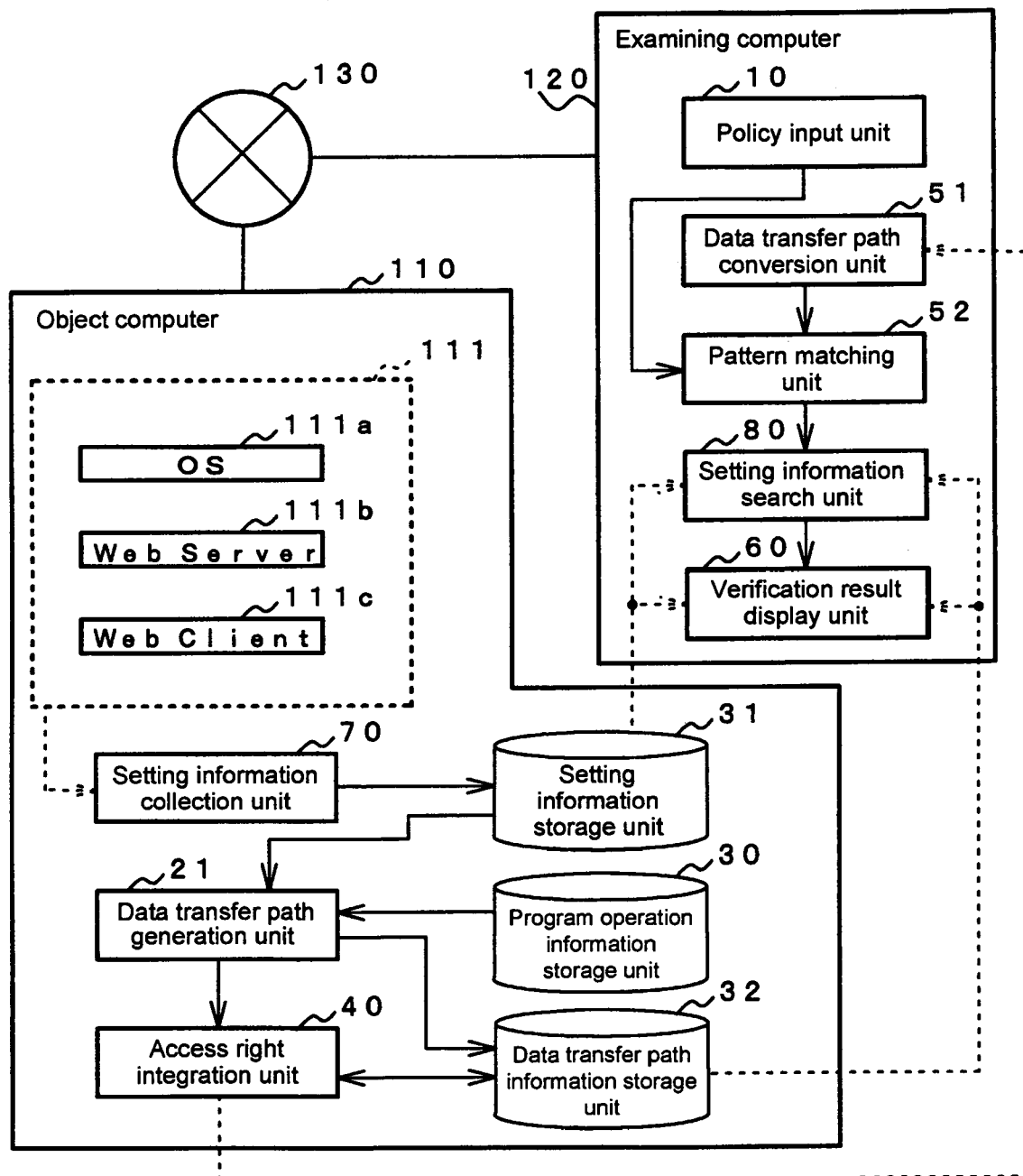
FIG. 16 is a block diagram showing the configuration of the security verification device in Example 1.

FIG. 16 shows the actual configuration of security verification device 100 of the first embodiment. FIG. 16 is drawn omitting policy storage unit 33 of the configuration that is shown in FIG. 2.

As shown in FIG. 16, security verification device 100 is provided with object computer 110 to be verified and examining computer 120. Object computer 110 and examining computer 120 are each connected to communication network 130 such as the Internet or private lines. A plurality of object computers 110 may also be provided.

Object computer 110 includes: object system 11, setting information collection unit 70, data transfer path generation unit 21, access right integration unit 40, setting information storage unit 31, program operation information storage unit 30, and data transfer path information storage unit 32. Examining computer 120 includes: policy input unit 10, data transfer path conversion unit 51, pattern matching unit 52, setting information search unit 80, and verification results display unit 60.

In this case, all or a part of: setting information collection unit 70, data transfer path generation unit 21, access right integration unit 40, setting information storage unit 31, program operation information storage unit 30, and data transfer path information storage unit 32 may be included in examining computer 120. Alternatively, examining computer 120 may be included in object computer 110.

Object system 111 is composed of: OS 111a, Web server application 111b, and Web client application 111c. In the current example, a Linux 2.4 system is used in OS 111a, Apache 1.3 is used for Web server application 111b, and Mozilla 1.5 is used for Web client application 111c.

Explanation next regards the security verification process in the present working example with reference to the above-described FIG. 6.

Figures 19A, 19B, 20:
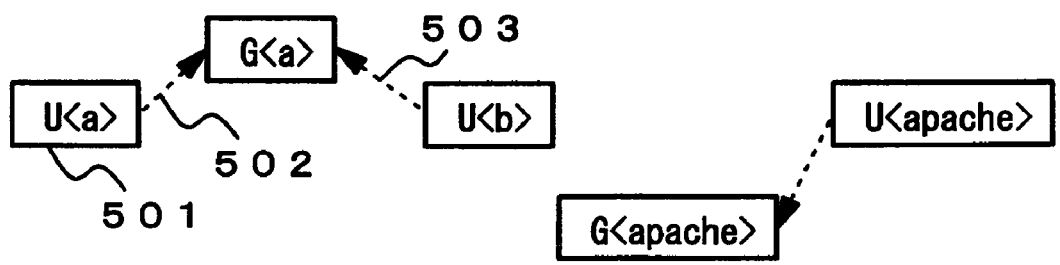
FIGS. 19A and 19B show examples of the settings of a web server application in the object system.
FIG. 20 shows a graph that represents data transfer paths that are generated based on security setting information of the OS in the object system.

FIGS. 17A and 17B show examples of the settings of a user account and group of OS 111a, FIG. 18 shows an example of the settings of file access rights, and FIGS. 19A and 19B show an example of the settings of Web server application 111b. These figures show examples of settings of each part that have been realized by means of widely used OS software known as Linux, as in the settings shown in the above-described FIG. 5. Settings may be realized by means of other software.

FIG. 17A shows an example of the content of user settings file "/etc/passwd" in OS 111a. In this case, an extract of the content of user settings file "/etc/passwd" is shown. As shown in FIG. 17A, user settings file "/etc/passwd" records information indicating users that are managed on OS 111a and information indicating the affiliated groups of these users.

FIG. 17B shows an example of the content of group settings file "/etc/group" in OS 111a. In this case, an extract of the content of group settings file "/etc/group" is shown. As shown in FIG. 17B, group settings file "/etc/group" records information indicating the groups that are managed on OS 111a, and information indicating the users that affiliated to these groups.

FIG. 18 shows an example of the configuration of a file or directory in OS 111a and the settings of the access rights of the group or directory. FIG. 18 shows an extract of information that is obtained by executing list command "ls-lar."

FIG. 19A shows an example of the content of settings file "httpd.conf" of web server application 111b. In this case, an extract of the content of an Apache settings file "httpd.conf" is shown. As shown in FIG. 19A, settings file "httpd.conf" records, for example, information indicating the designations of files or directories that are used by web server 111b, information indicating the access rights to the files or directories, information indicating network port settings, and information indicating user settings files that are used for authentication.

FIG. 19B shows an example of the content of a settings file of web server application 111b. In this case, the content of the file "/var/www/.htpasswd" that is recorded in the settings file shown in FIG. 19A is shown as a user settings file used for authentication. As shown in FIG. 19B, file "/var/www/.htpasswd" records information indicating the authenticated users used by web server application 111b.

In the security verification process, setting information collection unit 70 first collects the security settings shown in FIGS. 17A, 17B, 18, 19A, and 19B from object system 111 in Step S201. Setting information collection unit 70 next stores the collected security setting information in setting information storage unit 31.

Data transfer path generation unit 21 submits inquiries for program specifications for each program to program operation information storage unit 30 in accordance with the security setting information that has been collected and stored in setting information storage unit 31 by setting information collection unit 70. More specifically, data transfer path generation unit 21 refers to program operation information (see FIG. 4), requests the types of nodes or arcs that are produced on models for each program in the security setting information that is shown in FIGS. 17A, 17B, 18, 19A, and 19B, and reads program operation information that includes the program specifications and that corresponds to each program. In Step S203, data transfer path generation unit 21 next produces nodes and arcs based on security setting information that has been collected and stored in setting information storage unit 31 by setting information collection unit 70 and program operation information that has been read from program operation information storage unit 30 and thus generates data transfer path information.

In this example, it can be seen from the security setting information of OS 111a (see FIGS. 17A and 17B) that the users are "a," "b," and "apache." It can be further seen that the groups are "a" and "apache." Still further, it can be seen that user "a" and user "b" belong to group "a" and that "apache" belongs to group "apache." FIG. 20 shows data transfer paths that are generated based on the security setting information of OS 111a.

In Step S203, data transfer path generation unit 21 produces data transfer paths based on the above-described security setting information by the following procedure.

Data transfer path generation unit 21 first produces node U<a> 501 according to the existence of user "a," and then produces node G<a> 503 according to the existence of group "a." Data transfer path generation unit 21 further produces arc 502 representing an affiliation relation according to the affiliation of user "a" to group "a." When all users, all groups, and their affiliation relations are reflected by means of the above-described procedures, the data transfer paths shown in FIG. 20 are generated. In this case, U< > represents a user node, G< > represents a group node, F< > represents a file node, and N< > represents a network node. In each graph in this example, moreover, except when specifically stated, solid black arrows represent data movement relations, dotted black arrows represent affiliation relations, solid arrows represent alias definitions, and dotted arrows represent authority transfers.

Figure 21:
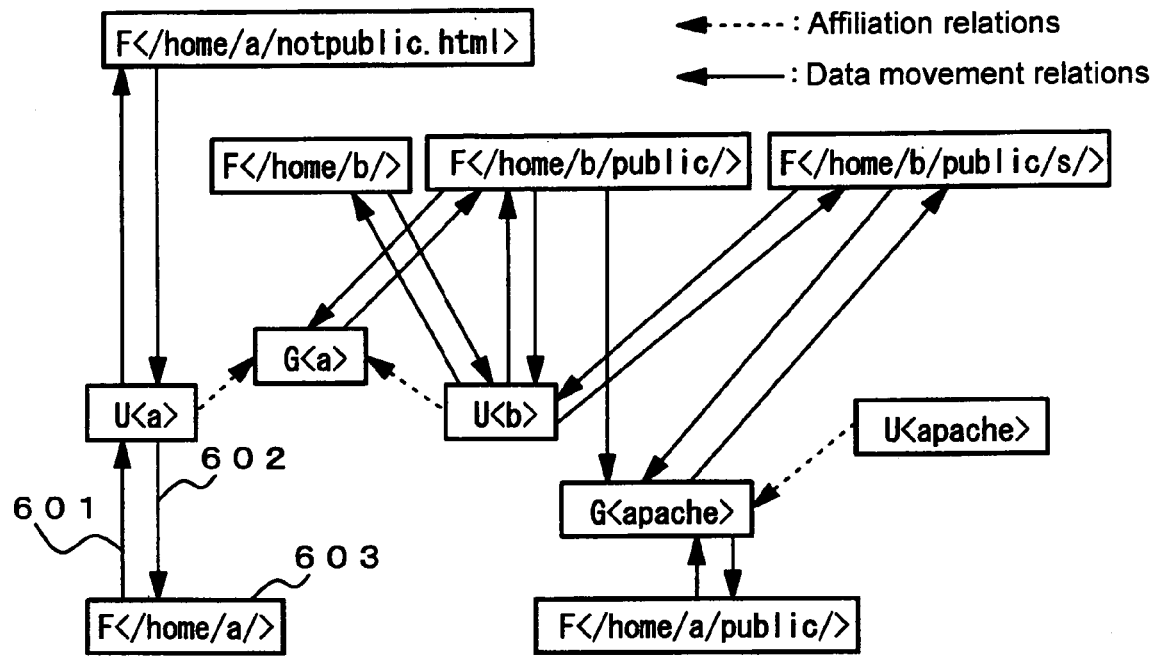
FIG. 21 is an explanatory view showing a graph that represents data transfer paths to which have been added arcs and objects, which are produced from a directory configuration that is managed by the OS in the object system.
Figure 22:
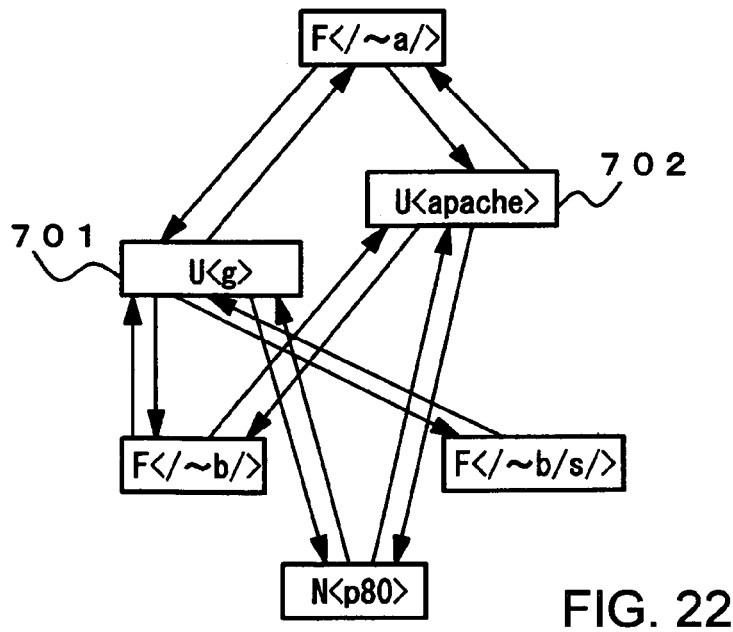
FIG. 22 shows a graph representing data transfer paths that have been generated based on security setting information of a web server application in the object system.

FIG. 21 shows data transfer paths to which are added objects and arcs that are produced from the directory configuration (see FIG. 18) that is managed by OS 111a. Data transfer path generation unit 21 produces node F</home/a/> 603 according to the existence of file "/home/a/" in the directory configuration. In addition, data transfer path generation unit 21 produces data movement relation arc 601 according to the authority of user "a" to write to the file due to the settings of the access rights of this file "/home/a/," and produces data movement relation arc 602 according to the authority of user "a" to read the file. The data transfer paths shown in FIG. 21 are generated as explained above. FIG. 22 shows data transfer paths that have been generated based on the security setting information (see FIG. 19) of Web server application 111b. According to the security setting information of Web server application 111b, the listing "User apache" indicates that the execution user of Web server application 111b is U<apache>. Accordingly, data transfer path generation unit 21 produces user node U<apache> 702.

In addition, data transfer path generation unit 21 produces user node U<g> 701 because Basic authentication is set in directory "/home/b/public/s/" and user "g" is set in ".htpasswd" file. Further, based on the operation information of Web server 111b, U<apache> can read from and write to file nodes other than file nodes that require Basic authentication. As a result, data transfer path generation unit 21 produces data movement relation arcs to directories other than the Basic authentication directory, and because U<g> is a Basic authentication user, data transfer path generation unit 21 produces Basic authentication file nodes, as well as other file nodes and data movement relation arcs.

Data transfer path generation unit 21 next requests program operation information storage unit 30 for operation information between web client application 111c and the next program. Web client application 111c uses http (hypertext transfer protocol) to move data, and data transfer path generation unit 21 therefore produces a network node that relates to http. As described above, data transfer path generation unit 21 generates nodes and arcs within each layer.

Figure 23:
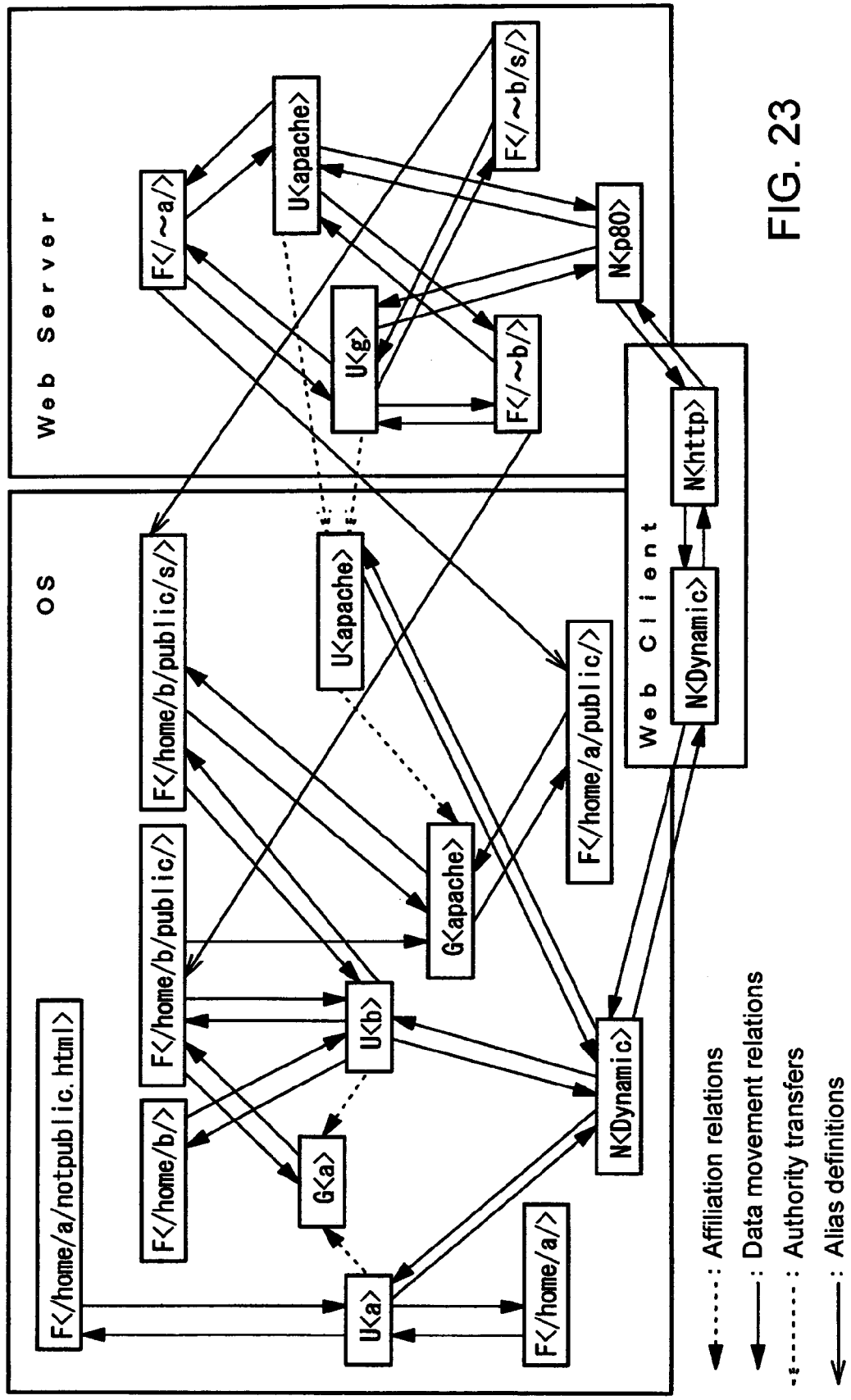
FIG. 23 shows a graph that represents data transfer paths that are generated by means of a data transfer path generation unit.

Explanation next regards the generation of an inter-program layer and the generation of arcs that are contained in this inter-program layer. First, the installation of web server application 111b and OS 111a results in the production of an inter-program layer that is caused to relate to the layer of web server application 111b and the layer of OS 111a. Next, from the operation information of web server application 111b, it can be understood that an alias definition of the OS 111a file node exists in the file node of web server application 111b. Data transfer path generation unit 21 therefore produces an inter-program layer, and produces an alias definition relation arc from the relevant file node of Web server application 111b to the relevant file node of OS 111a, as shown in FIG. 23. In FIG. 23, the inter-program layer is not clearly specified.

Similarly, it can be understood from the operation information of web server 111b that, among the users of web server application 111b, there are users by authority transfer from users on OS 111a. Data transfer path generation unit 21 therefore produces arcs representing authority transfer relations from the relevant users of web server application 111b to the relevant users of OS 111a, as shown in FIG. 23.

It can be seen that web client application 111c uses the number 80 port of web server application 111b to move data and also moves data to the "dynamic port" of OS 111a. Data transfer path generation unit 21 therefore produces an inter-program layer that establishes a relation between OS 111a and web client application 111c and an inter-program layer that establishes a relation between web server application 111b and web client application 111c, and as shown in FIG. 23, creates an arcs representing data movement relations to each of the above-described ports.

It can be seen that web client application 111c uses the number 80 port of web server application 111b to move data, and also moves data to the dynamic port of OS 111a. Data transfer path generation unit 21 therefore produces arcs representing data movement relations to each of the above-described ports as shown in FIG. 23.

As described in the foregoing explanation, data transfer path information is generated by data transfer path generation unit 21. FIG. 23 shows data transfer paths that are indicated by the data transfer path information that was generated in Step S203.

Figure 24:
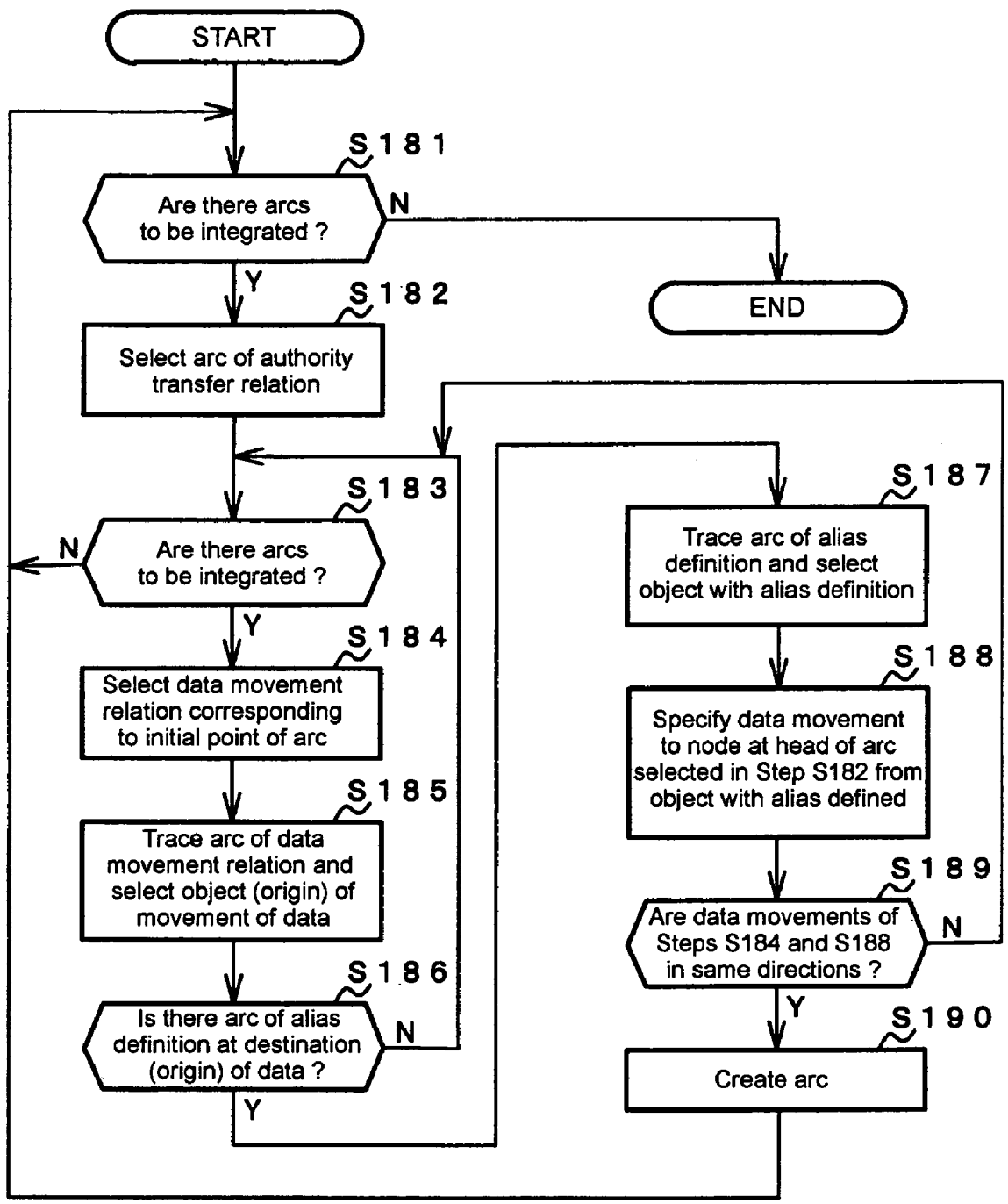
FIG. 24 is a flow chart showing the access right integration process.
Figure 25:
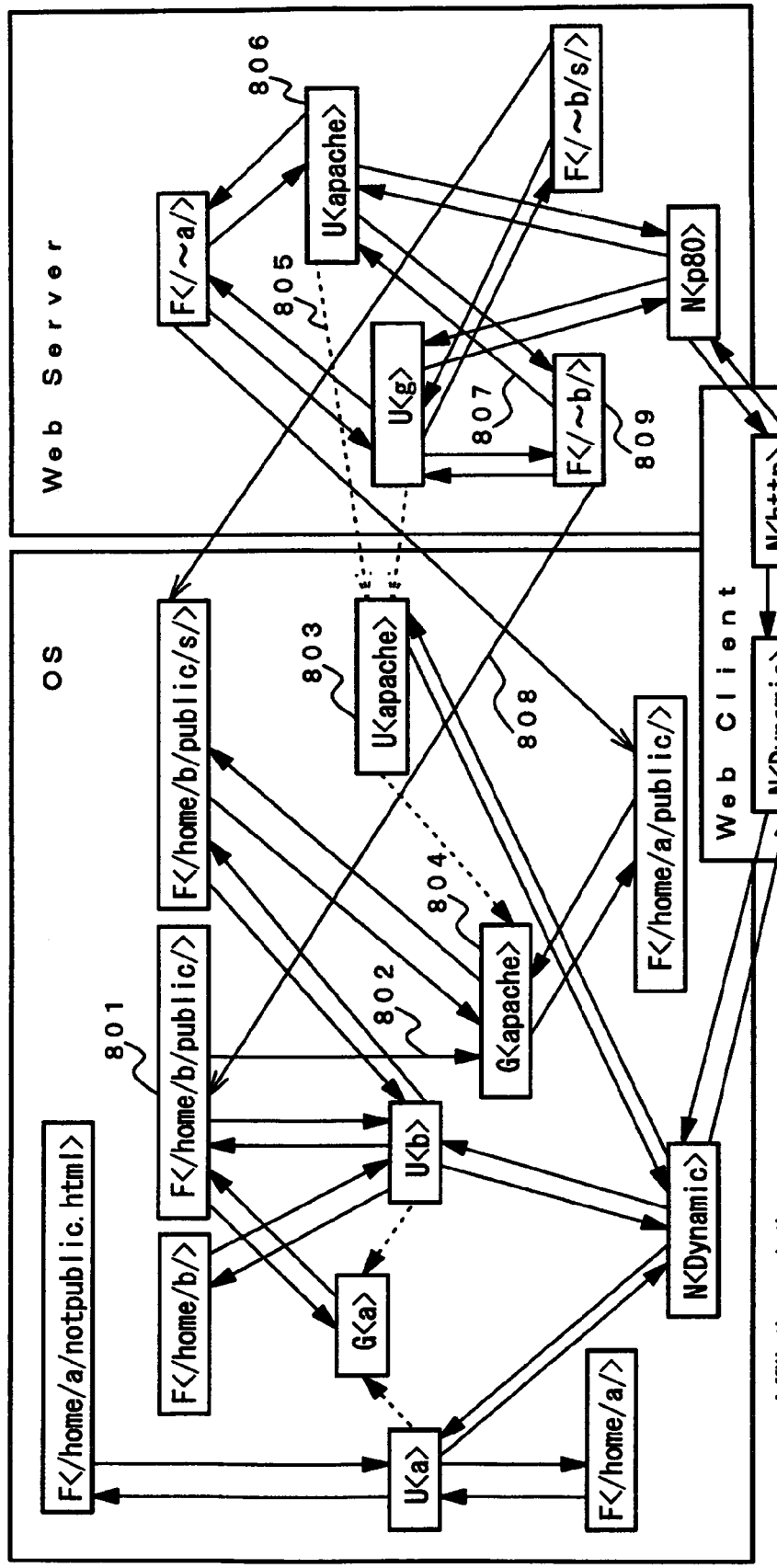
FIG. 25 shows a graph that represents data transfer paths that are generated by the data transfer path generation unit.

Explanation next regards an actual example of the access right integration process that is executed in Step S204 by access right integration unit 40. FIG. 24 is a flow chart showing the access right integration process. The access right integration process is a process for integrating the access rights relating to a plurality of programs. In FIG. 25, reference numerals for the following explanation are given to the data transfer paths that are indicated by the data transfer path information that was generated in Step S203.

As shown in FIG. 25, a mere glance does not reveal the type of access or which files on OS 111a that user U<apache> 806 on web server application 111b can access. Here, the access rights between web server application 111b and OS 111a must be integrated.

In the access right integration process, access right integration unit 40 investigates in Step S181 whether arcs that should be integrated are present, and if arcs exist that should integrated, selects in Step S182 an arc of an authority transfer relation or an alias definition relation and thus focuses upon, of the arcs between web server application 111b and OS 111a, any arc that represents an authority transfer relation or any arc that represents an alias definition relation in this case, it will be assumed that attention is placed on arc 805 that represents an authority transfer.

Access right integration unit 40 next checks in Step S183 whether an arc of a data movement relation exists at node 806 that is at the initial point of the authority transfer relation arc. If a data movement relation arc is not present, the process returns to Step S181; but if data movement relation arc 807 is present, this arc is selected in Step S184. Access right integration unit 40 traces selected arc 807 that represents a data movement relation, and selects node 809, the origin of movement, in Step S185.

Figure 26:
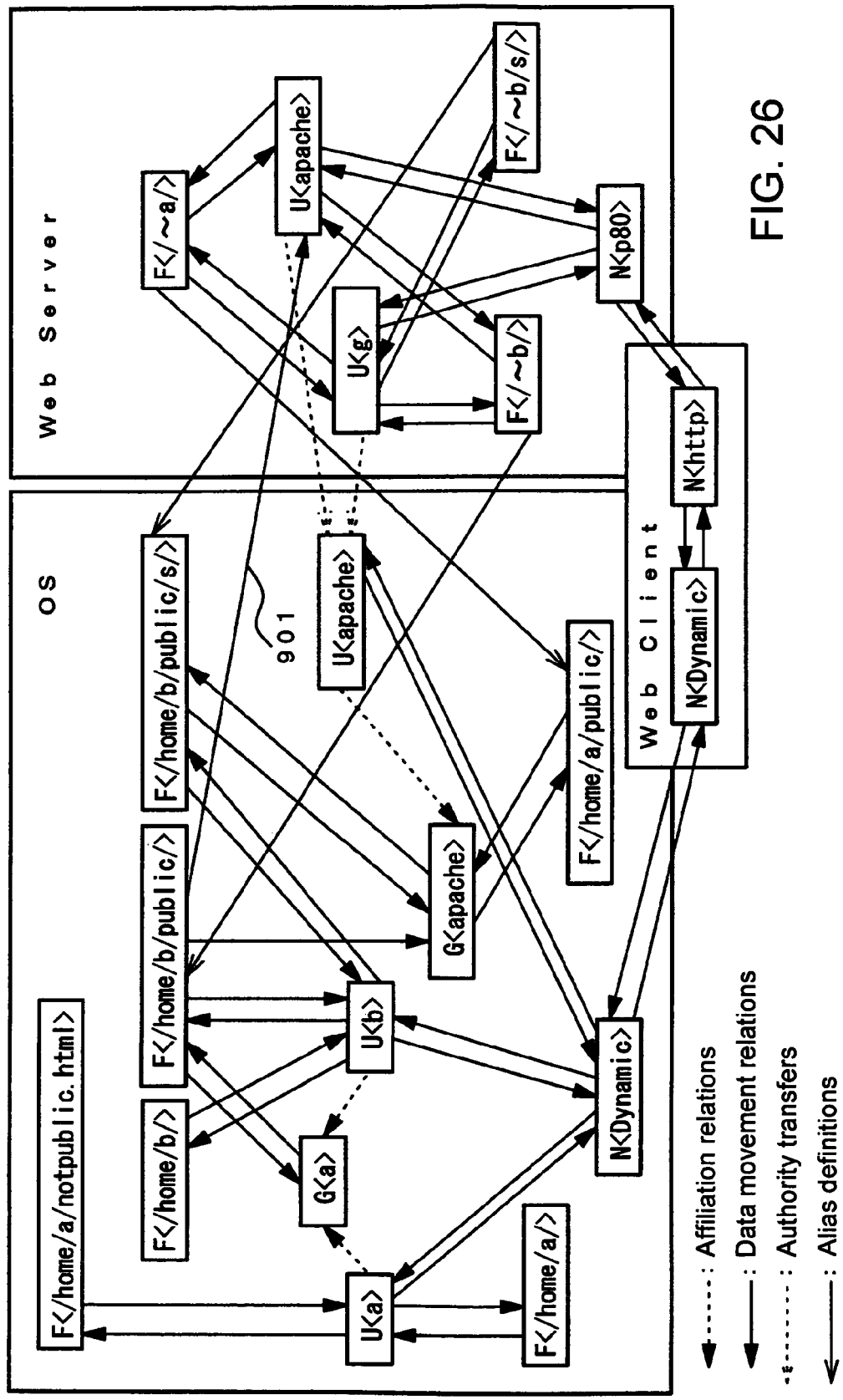
FIG. 26 shows a graph that represents the state of data transfer paths in which one access right has been integrated by the access right integration unit.

Access right integration unit 40 next checks in Step S186 whether an alias definition relation arc 808 is present at the selected node 809. If there is no alias definition relation arc, the process returns to Step S183, but if there is an alias definition relation arc 808, this arc 808 is traced back to select node 801 in Step S187, for which the alias is defined. Access right integration unit 40 then specifies in Step S188 that there is data movement from node 801, for which an alias is defined, toward node 803, to which authority is transferred. At this time, an arc is not described. Access right integration unit 40 then determines in Step S189 whether the direction of data movement that was specified in Step S188 is the same as the direction of the data movement of Step S184. If the directions are not the same, the process returns to Step S183. If the directions are the same, access right integration unit 40 creates in Step S190 a new data movement relation arc 901 from node 801, for which an alias is defined, toward node 806, which is at the initial point of the authority transfer relation arc, as shown in FIG. 26. After Step S190, the process returns to Step S181.

Figure 27:
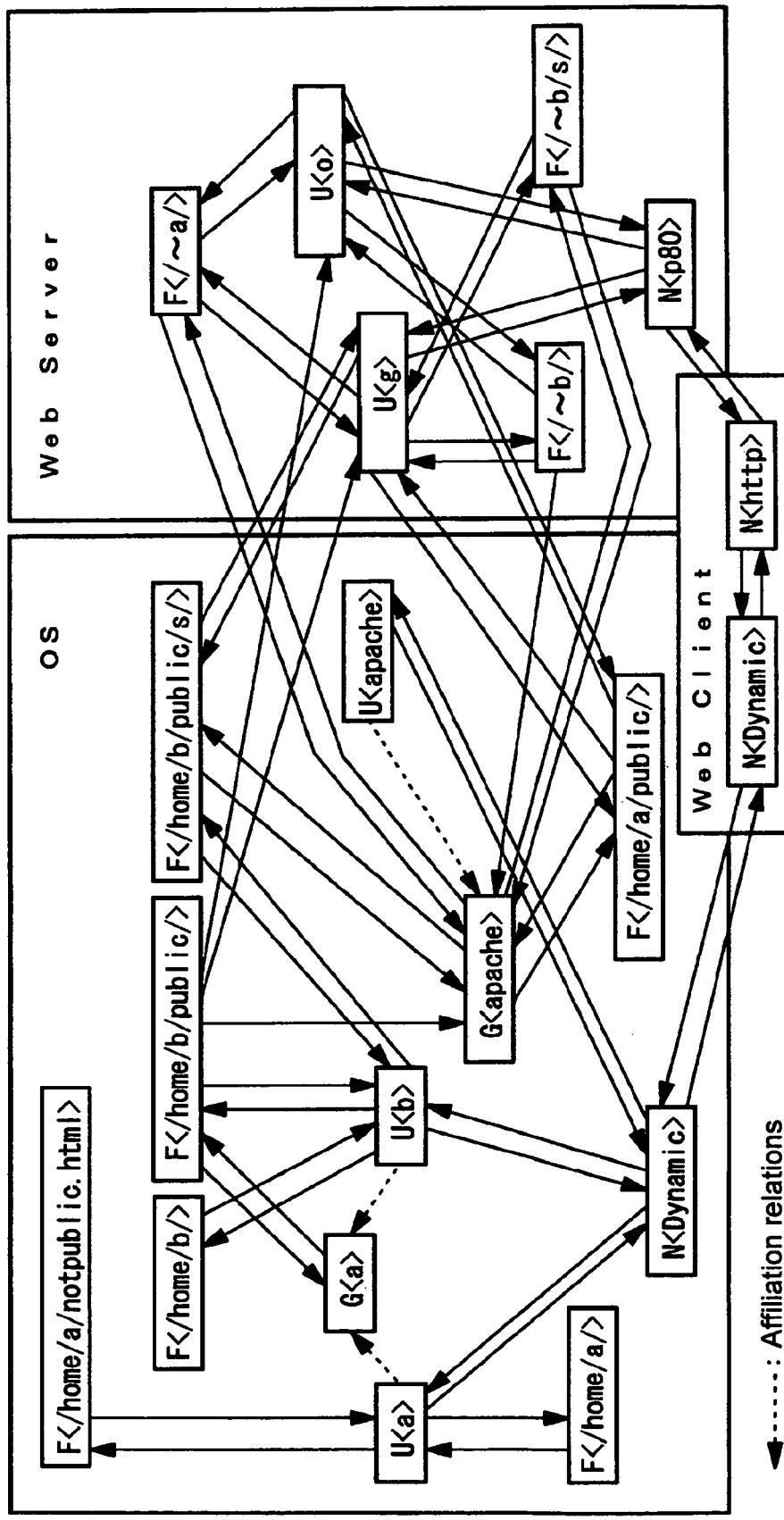
FIG. 27 shows a graph that represents the state of data transfer paths in which all access rights have been integrated by the access right integration unit.

Access right integration unit 40 repeatedly executes the above-described process until there are no arcs that should be integrated, i.e., arcs that represent authority transfer relations and alias definition relation arcs, not only creating new data movement relation arcs, but further, creating graphs in which arcs that represent authority transfer relations and alias definition relation arcs are eliminated and integrated to the two types of arcs shown in FIG. 27, i.e., arcs that represent affiliation relations and arcs that represent data movement relations.

Explanation next regards an actual example of the data transfer path conversion process that is realized by data transfer path conversion unit 51 in Step S205. The data transfer path conversion process is a process for converting graphs that are composed of two types of arcs, arcs that represent affiliation relations and arcs that represent data movement relations, to a tree structure that is composed only of data movement relation arcs in order to enable the search for data transfer paths that match security verification policies. In other words, data transfer path conversion unit 51 converts graphs that are composed of two types of arcs to a tree structure that is composed of one type of arc. In the following explanation, the tree structure is referred to as simply a tree.

Figure 28:
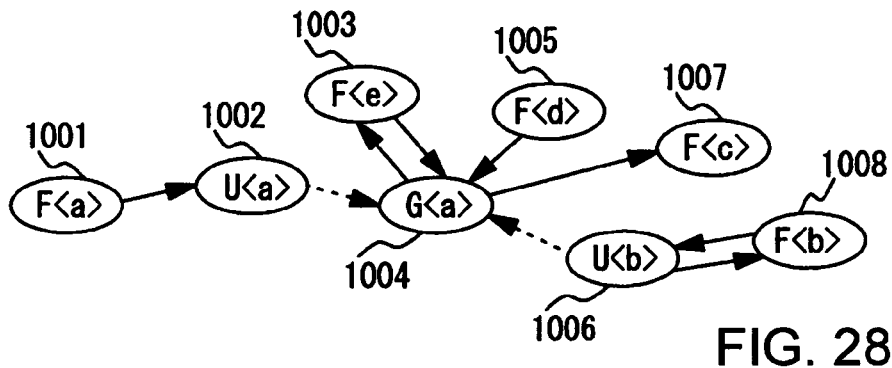
FIG. 28 shows a graph that represents data transfer paths that are supplied as input to the data transfer path conversion unit.
Figure 30:
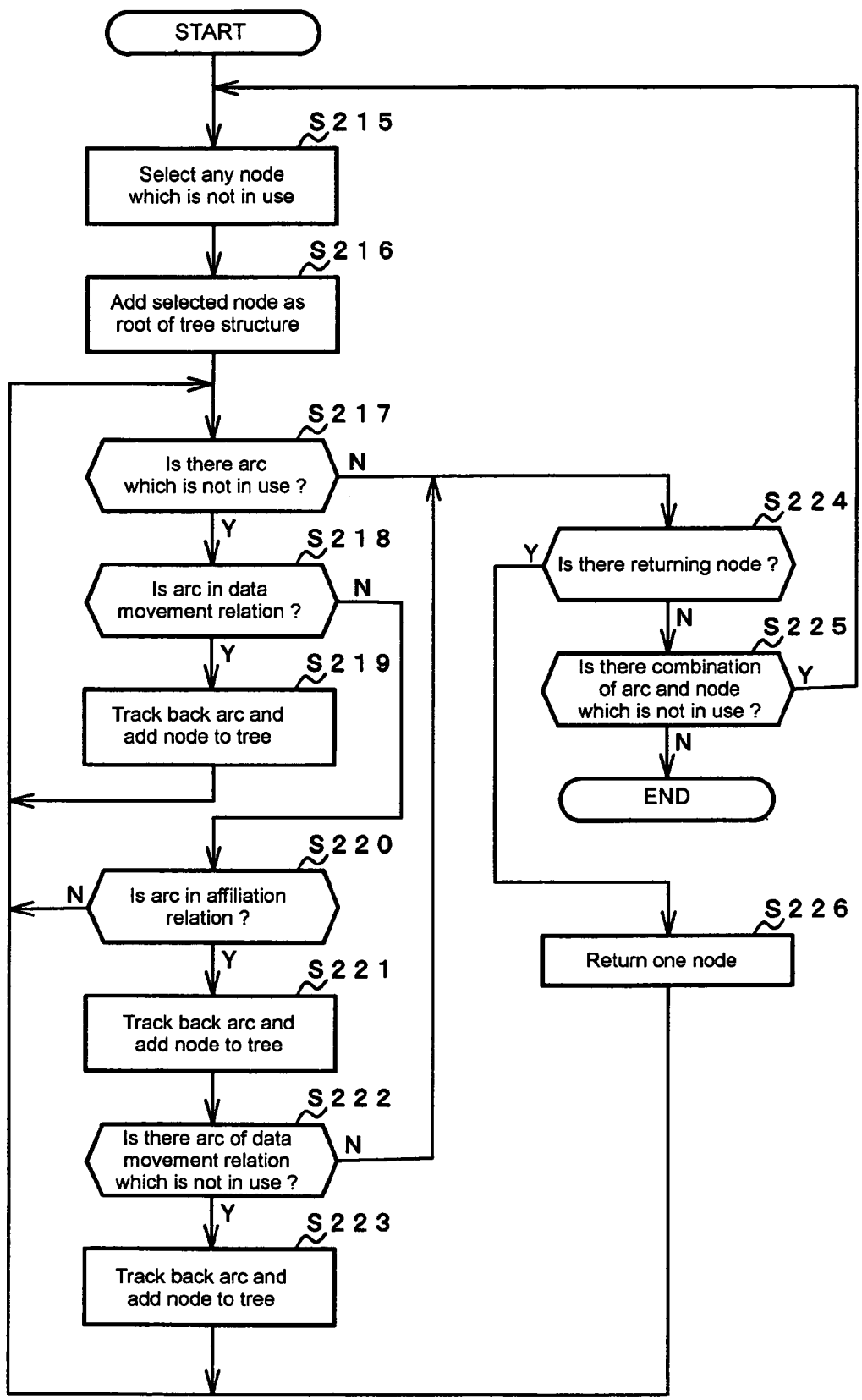
FIG. 30 is a flow chart showing the data transfer path conversion process.

Explanation here regards the data transfer path conversion process when, for example, the data transfer paths that are shown in FIG. 28 are given. FIG. 29 shows the data transfer paths following conversion of the data transfer paths that are shown in FIG. 28 by the data transfer path conversion process. FIG. 30 is a flow chart showing the data transfer path conversion process.

In the data transfer path conversion process, data transfer path conversion unit 51 first selects any node that is not in use in Step S215. A "node that is not in use" means a node that is still not being used in the current data transfer path conversion process. Of each of the nodes of the data transfer paths, any node to which an arrow indicating an arc is not directed is selected in Step S215. In this case, node 1001 or node 1005 shown in FIG. 28 is selected in Step S215.

When node 1001 is selected in Step 215, data transfer path conversion unit 51 makes the selected node 1001 node 1101 and adds it as a root of the tree structure in Step S216. When node 1001 is added to the tree, data transfer path conversion unit 51 checks for the existence of arcs that are not being used in node 1001 that has been added to the tree in Step S217. An "arc that is not being used" means an arc that is still not being used in the current data transfer path conversion process.

If there is an unused arc, data transfer path conversion unit 51 determines in Step S218 whether this arc is in a data movement relation. If the arc is in a data movement relation, node 1002 that is at the destination of this arc is added to the tree as node 1102 in Step S219, whereupon the process returns to Step S217.

Alternatively, if the unused arc is not in a data movement relation, data transfer path conversion unit 51 determines whether this arc is in an affiliation relation in Step S220. If the arc is not in an affiliation relation, the process returns to Step S217, but if the arc is in an affiliation relation, data transfer path conversion unit 51 adds the node that is at the destination of this arc to the tree in Step S221. More specifically, because an affiliation relation arc that is not being used exists at node 1002 that has been added to the tree as shown in FIG. 28, node 1004 that is at the destination of this arc is added to the tree as node 1103 as shown in FIG. 29.

When the node that is at the destination of an affiliation relation arc is added to the tree, data transfer path conversion unit 51 checks whether there is a data movement relation arc that is not being used in Step S222, and if such an arc exists, adds the node that is at the destination of this arc to the tree in Step S223, and then returns to Step S217. In other words, after using an affiliation relation arc to visit a node, data transfer path conversion unit 51 checks only whether there is a node that can be visited by using a data movement relation arc.

When it is determined in Step S217 that there are no unused arcs, or when it is determined in Step S222 that there are no unused data movement relation arcs, data transfer path conversion unit 51 checks for the existence of returning nodes in Step S224. If there is a returning node, data transfer path conversion unit 51 returns one node in Step S226 and proceeds to Step S217. On the other hand, if there are no returning nodes in Step S224, data transfer path conversion unit 51 checks for the existence of a combination of unused arc and node in Step S225. If such a combination exists, data transfer path conversion unit 51 proceeds to Step S215, and if not, the process ends.

When all arcs have been used to convert the graph structure that is shown in FIG. 28 by the above-described procedure, a tree structure is created such as shown in FIG. 29 having a root that takes node 1001 as node 1101 and a root that takes node 1005 as node 1109. In other words, conversion is realized to data transfer paths of the tree structure shown in FIG. 29.

Explanation next regards an actual example of the security verification policy input process that is realized by policy input unit 10 in Step S206. The security verification policy input process is a process of accepting the designation of security verification policies from a user and applying these as input to verification unit 50.

The security verification policies represent data transfer paths that cannot be allowed and are described by regular expressions of nodes. In addition to nodes, symbols for representing sets of nodes may also be defined and used. In this case, for example, "NET" represents any network node, and "USER" represents any user. In addition, "." represents any node, "*" represents an immediately preceding node or 0 or more repetitions of a symbol, "I" represents "OR", and "^" represents a node other than the immediately following node. In addition to these examples, other symbols of generally known regular expressions may be used.

FIG. 31 shows an example of the expression of security verification policies that policy input unit 10 accepts from a user. In FIG. 31, five examples of security verification policies are noted from "policy 1" to "policy 5."

"Policy 1" indicates that the information of user node U<a> must not move to file node F</d/> by way of any node. In other words, "policy 1" shows that user "a" must not write to file "/d/" by any route.

"Policy 2" indicates that the information of file node F</c/> must not move to user node U<a> by way of any node or by way of any network. In other words, "policy 2" shows that file "/c/" must not be read by user "a" by way of a network.

"Policy 3" indicates that the information of file node F</c/> must not pass by way of any node other than network node N<p443>, and moreover, must not move to user node U<b> by way of any node. In other words, "policy 3" shows that file "/c/" must not be read by user "b" using a network other than port 443.

"Policy 4" indicates that information other than user node U<b> must not move by way of any node to file node F</b/public/>. In other words, "policy 4" shows that a user other than user "b" must not write to file "/b/public/".

"Policy 5" indicates that information other than user node U<b> or user node U<g> must not move by way of any node to file node F</b/public/s/>. In other words, "policy 5" shows that users other than user "b" or user "g" must not write to file "/b/public/s/".

Explanation next regards an actual example of the pattern matching process that is executed by pattern matching unit 52 in Step S207.

In the pattern matching process, pattern matching unit 52 both receives data transfer paths from data transfer path conversion unit 51 and receives security verification policies from policy input unit 10. Pattern matching unit 52 then searches among the data transfer paths received from data transfer path conversion unit 51 for paths that match the security verification policies received from policy input unit 10. More specifically, pattern matching unit 52 searches for and extracts arcs and nodes that are included in paths that match security verification policies. The security verification policies that are shown in FIG. 31 conform to regular expressions. As a result, the pattern matching process by pattern matching unit 52 can be realized using a search algorithm of widely known regular expressions.

Explanation next regards the violation path search process that is executed by pattern matching unit 52 as a process that is executed before Step S210.

Figure 32:
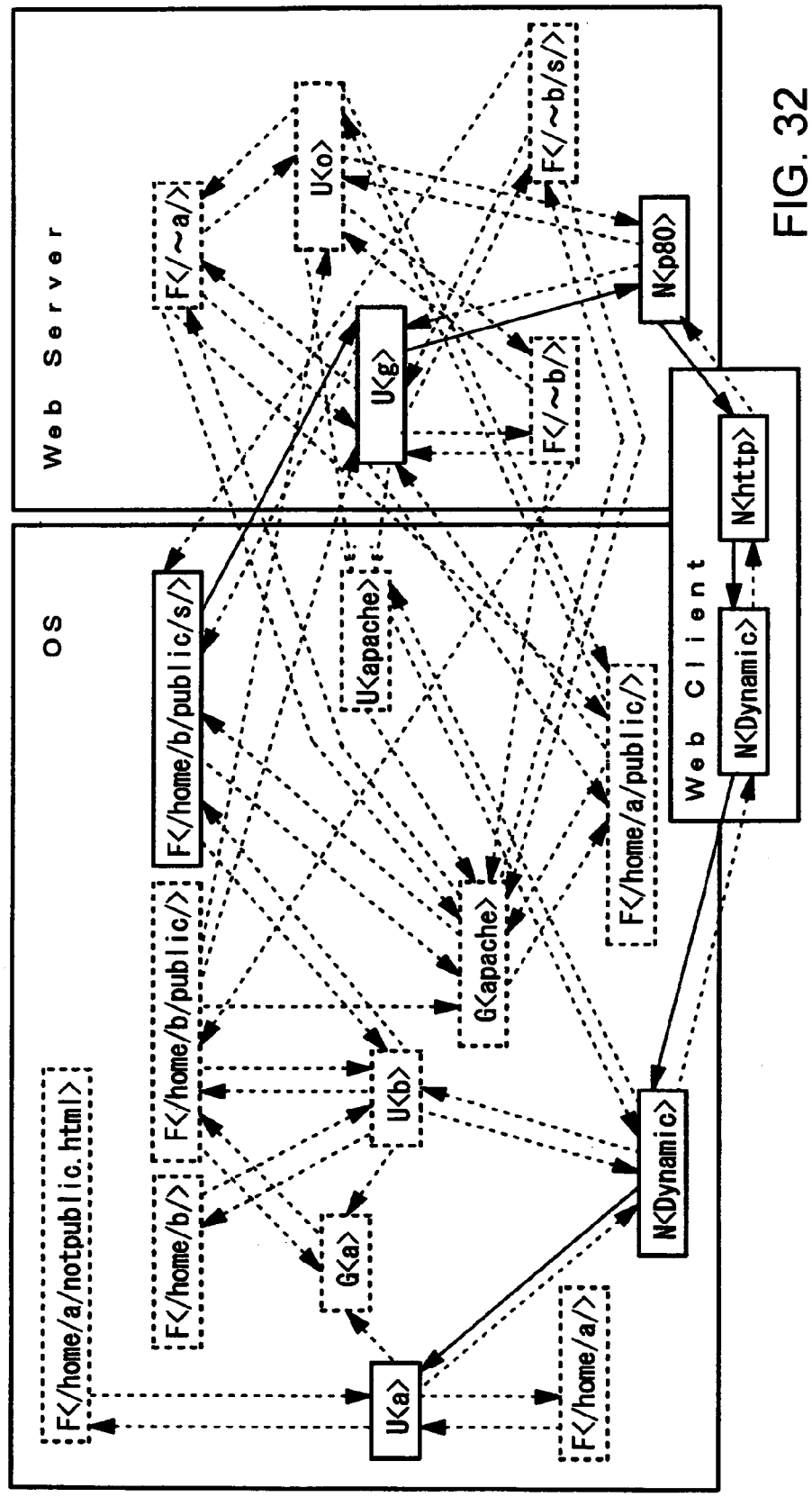
FIG. 32 shows a graph that represents improper paths that have been discovered by means of the pattern matching process.
Figure 33:
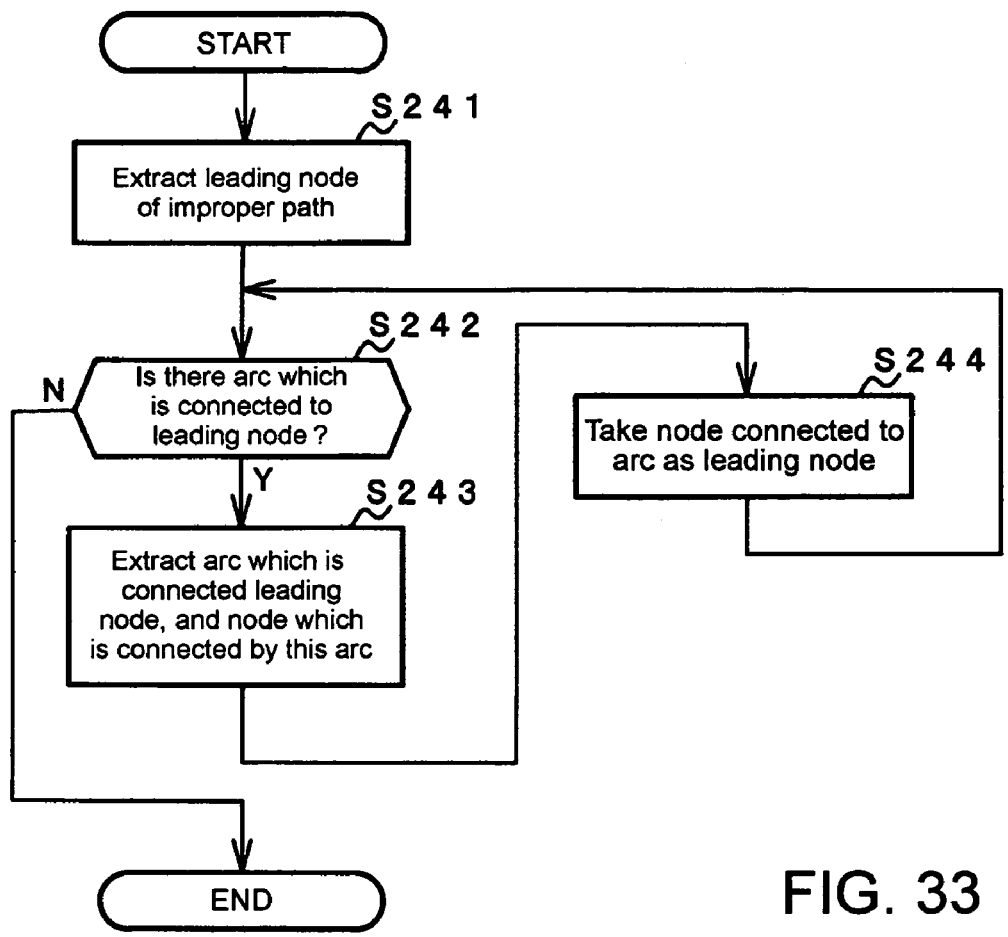
FIG. 33 is a flow chart showing the improper path search process.
Figure 34:
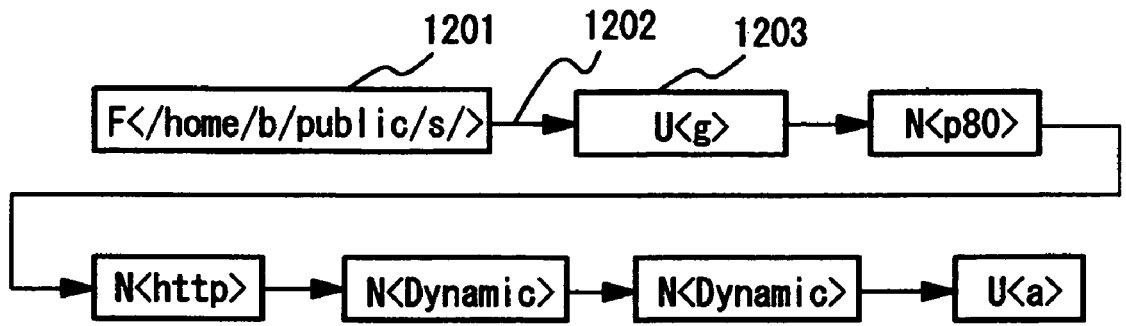
FIG. 34 shows the extraction of an improper path that has been discovered.

FIG. 32 shows a graph that represents improper paths that have been discovered by the pattern matching process executed by pattern matching unit 52. In this figure, solid line arrows show improper paths. Nodes that are enclosed by solid lines in FIG. 32 are nodes that are the initial points, final points, or passage points of improper paths. FIG. 33 is a flow chart showing the violation path search process. FIG. 34 shows the extraction of improper paths that are shown in FIG. 32. Explanation next regards the process for finding improper paths that are shown in FIG. 32 and for generating improper paths that are shown in FIG. 34.

In the violation path search process, pattern matching unit 52 first extracts the leading node 1201 of an improper path in Step S241. In Step S242, pattern matching unit 52 investigates whether an arc is connected to the leading node, and if such an arc exists, pattern matching unit 52 extracts arc 1202 and node 1203 in Step S243. Pattern matching unit 52 next takes node 1203 as the leading node in Step S244, and then proceeds to Step S242 and repeats the above-described process. This process enables the generation of improper paths that are shown in FIG. 34. Pattern matching unit 52 next directs data that indicate the generated improper paths as output to setting information search unit 80.

Figure 35:
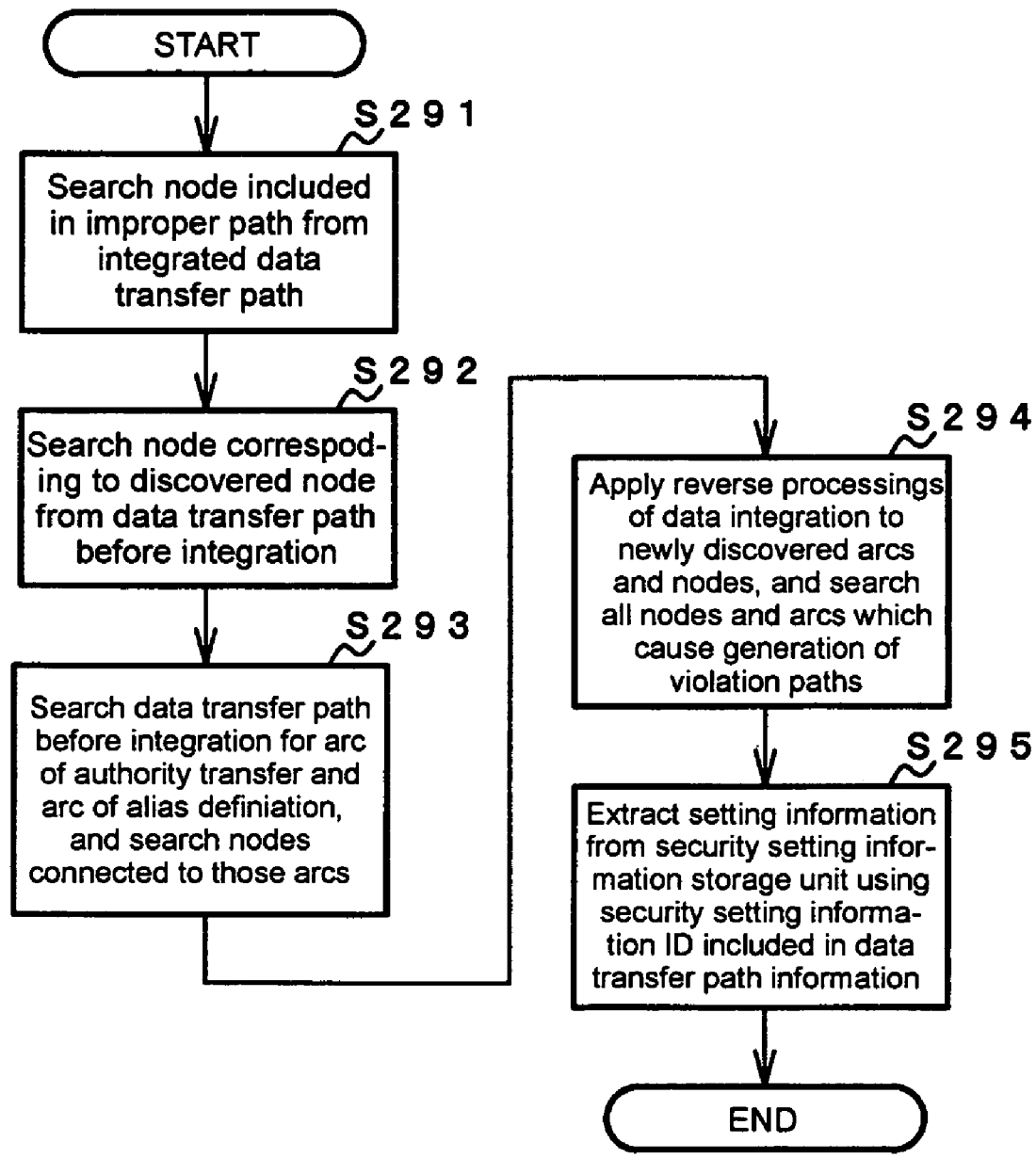
FIG. 35 is a flow chart showing the setting information search process.

Explanation next regards the setting information search process that is executed by setting information search unit 80 in Step S210. FIG. 35 is a flow chart showing the setting information search process. Here, explanation regards the process in which setting information search unit 80 searches for improper settings that are the cause for permitting the improper paths that are shown in FIG. 34.

Figure 36:
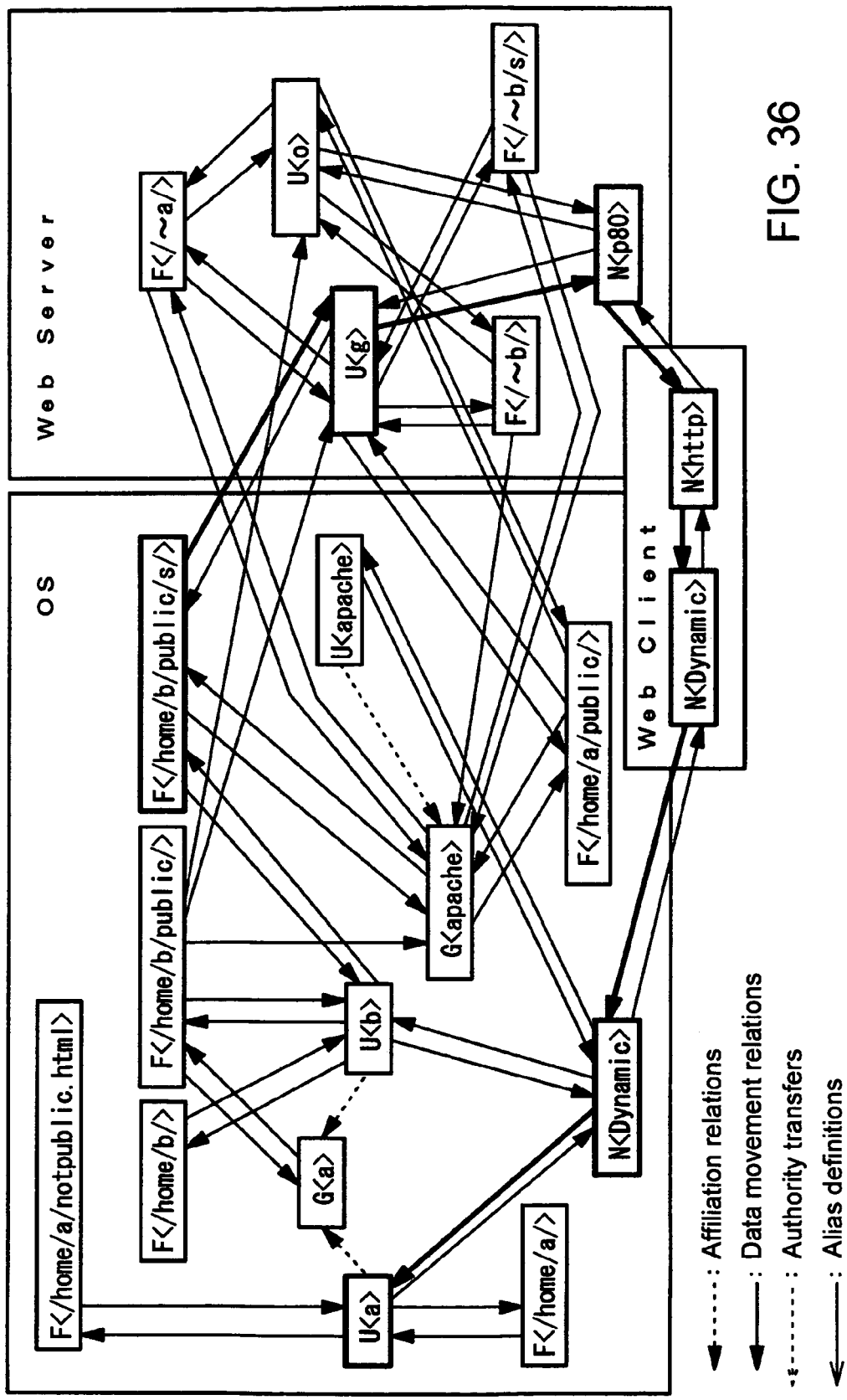
FIG. 36 shows the state in which nodes that are contained in improper paths are discovered from data transfer paths following integration of access rights.

In the setting information search process, setting information search unit 80 first searches in Step S291 for nodes that are included in the improper paths that have been received from pattern matching unit 52 among the data transfer paths that result from the integration of access rights that is realized by access right integration unit 40 and that are stored in data transfer path information storage unit 32. FIG. 36 shows an example of the state in which nodes have been found included in improper paths among the data transfer paths that result from the integration of access rights. As shown in FIG. 36, the nodes that are included in improper paths, i.e., the nodes that enclosed in bold-print boxes, have been found among the data transfer paths that result from the integration of access rights. In Step S291, moreover, if there are arcs that correspond to the data transfer paths following the integration of access rights based on the improper paths that are received from pattern matching unit 52 as shown in FIG. 36, arcs that represent data movement relations, i.e., arcs that are indicated by bold-print arrows, are searched for each node that is included in the improper paths.

Figure 37:
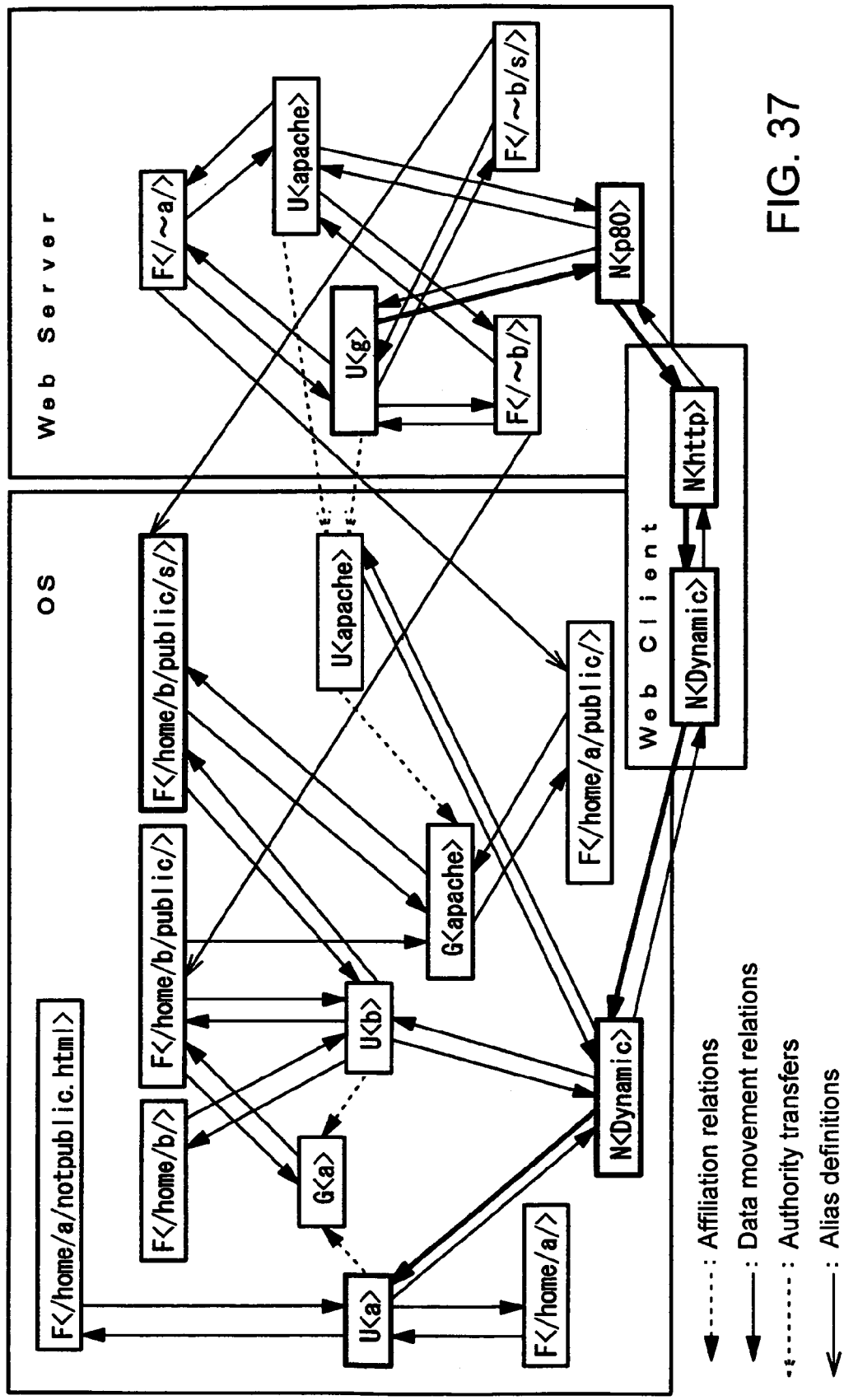
FIG. 37 shows the state in which improper paths are discovered in data transfer paths preceding integration of access rights.

Setting information search unit 80 next searches in Step S292 for nodes that correspond to nodes that have been discovered from among data transfer paths that precede integration of access rights. FIG. 37 shows an example of the state in which improper paths have been discovered in data transfer paths that precede integration of access rights. As shown in FIG. 37, nodes that correspond to the nodes that were found in Step S291 are found among data transfer paths that precede integration of access rights, and nodes that are included in improper paths, i.e., nodes that are enclosed by bold-print lines are found among data transfer paths that precede integration of access rights. In addition, if there are arcs in data transfer paths that precede integration of access rights that correspond to arcs that are found in Step S291, these arcs (arcs indicated by bold-print arrows) are searched in Step S292 based on improper paths that have been received from pattern matching unit 52, as shown in FIG. 37.

Figure 38:
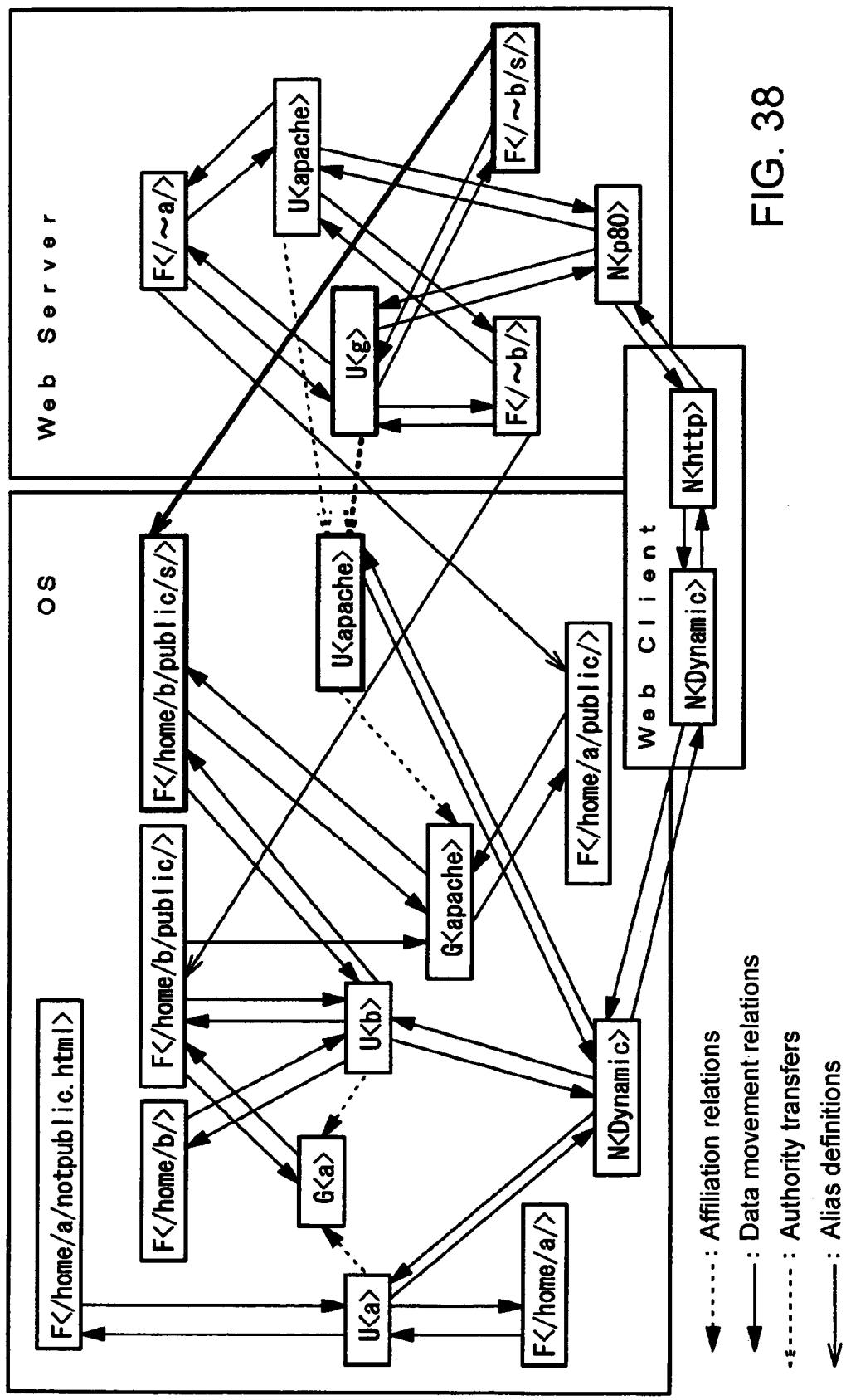
FIG. 38 shows the state in which authority transfer arcs, alias definition arcs, and nodes that are connected to these arcs are searched.

Setting information search unit 80 searches in Step S293 for authority transfer arcs and alias definition arcs that are included in nodes that have been discovered from data transfer paths that precede integration of access rights, and searches for nodes that are connected to these arcs. The authority transfer and alias definition arcs from which authority transfer and alias definition arcs are searched in Step S293 that relate to nodes that have been found from data transfer paths that precede integration of access rights are arcs that indicate authority transfer origin, authority transfer destination, alias definition origin, or alias definition destination. Further, all nodes that relate to arcs that have been found in this way, i.e., nodes that are any of the authority transfer origin, authority transfer destination, alias definition origin, and alias definition destination, are searched in Step S293. FIG. 38 shows an example of the state in which authority transfer arcs and alias definition arcs and nodes that are connected to these arcs have been searched. In this example, as shown in FIG. 38, one authority transfer arc and one alias definition arc are found in Step S293 based on each node that has been found in data transfer paths that precede integration of access rights shown in FIG. 37, and four nodes that relate to these arcs are found.

Figure 39:
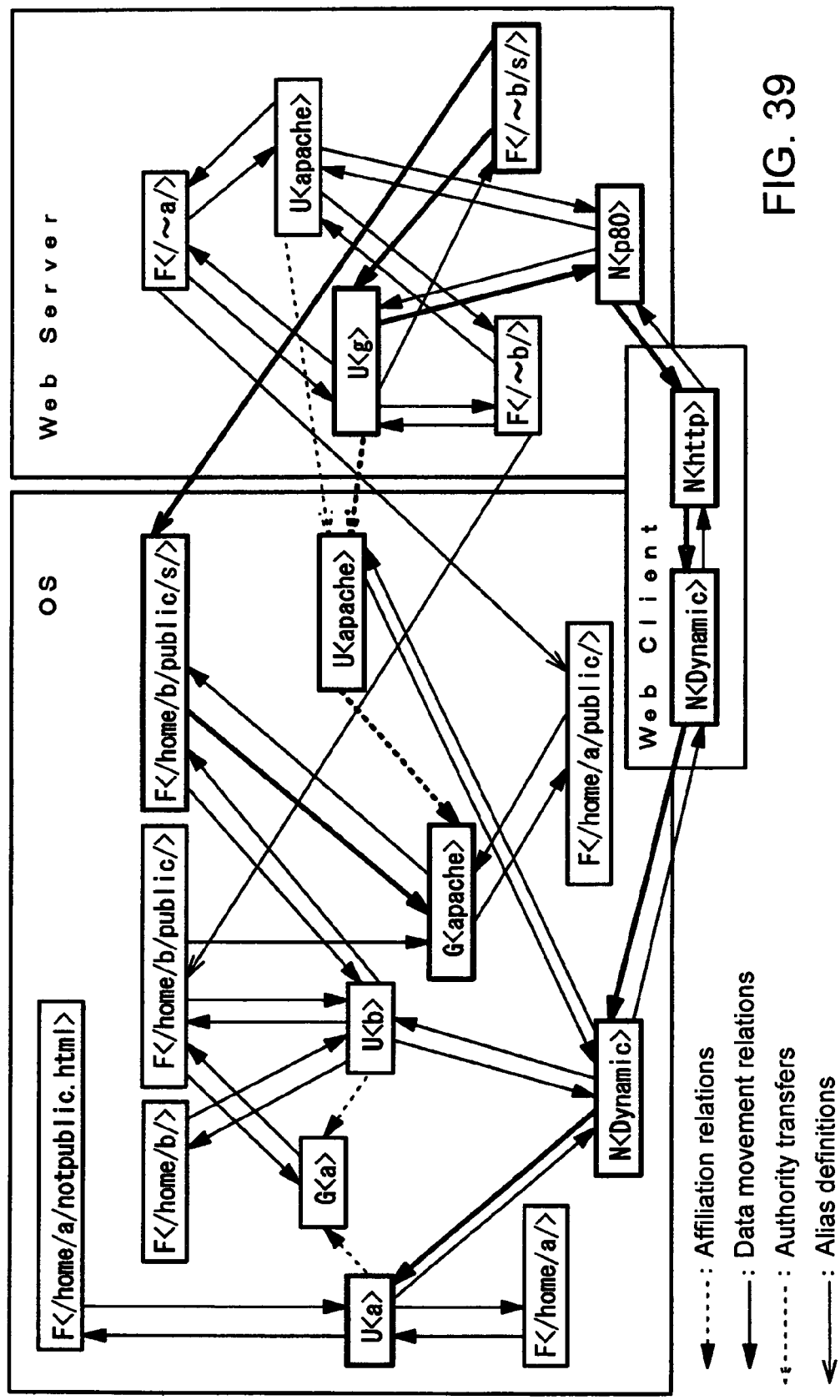
FIG. 39 shows the state in which all nodes and arcs are searched that are the cause for the creation of an improper path.

In Step S294, setting information search unit 80 next applies, in reverse order, the processes that were carried out in the data integration of arcs and nodes that are newly found in Step S293, and searches for all nodes and arcs that were the cause of producing improper paths. FIG. 39 shows an example of the state in which all nodes and arcs are found that were the cause for the creation of improper paths. As shown in FIG. 39, in this example, not only are two data movement relation arcs having the same direction of movement for two nodes that are in an alias definition relation and one of two authority transfer arcs that indicate that the data movement destinations are in an authority transfer relation are found based on the arcs and nodes that were newly found in Step S293, but nodes that relate to the newly found arcs are also found in Step S294, and further, improper paths for which searching is completed that are shown in FIG. 37 are added.

In Step S295, setting information search unit 80 next uses the IDs of security setting information that is contained in the data transfer path information to extract from setting information storage unit 31 the security setting information that is the cause for creating all nodes and arcs that have been found. FIG. 40 shows an example of the state in which the sites of improper settings are indicated in the data transfer path information, and FIG. 41 shows an example of the security setting information that has been extracted from setting information storage unit 31. As shown in FIG. 40, setting information search unit 80 reads data transfer path information (see FIG. 5) from data transfer path information storage unit 32, and based on the improper paths that are shown in FIG. 39, searches for the portions at which improper settings have been made in the data transfer path information, for example, the portions that are enclosed in squares. Then, as shown in FIG. 41, setting information search unit 80, based on the setting information IDs of the security settings at which improper settings have been made, reads from setting information storage unit 31 the security setting information that contains security unit information at which improper settings have been made.

The above-described process enables the extraction of security setting information that includes setting errors that have been the cause for generating improper paths.

Explanation next regards the improper settings display process by verification results display unit 60 in Step S211.

Verification results display unit 60 executes processes for displaying on a display screen and informing a user of information showing improper settings that have been found by setting information search unit 80, such as the information that indicates improper settings locations that is shown in FIG. 40 and the information that indicates the content of improper settings that is shown in FIG. 41. The execution of these specific processes enables the search for improper paths and the notification of the improper settings in object system 111.

Figure 42:
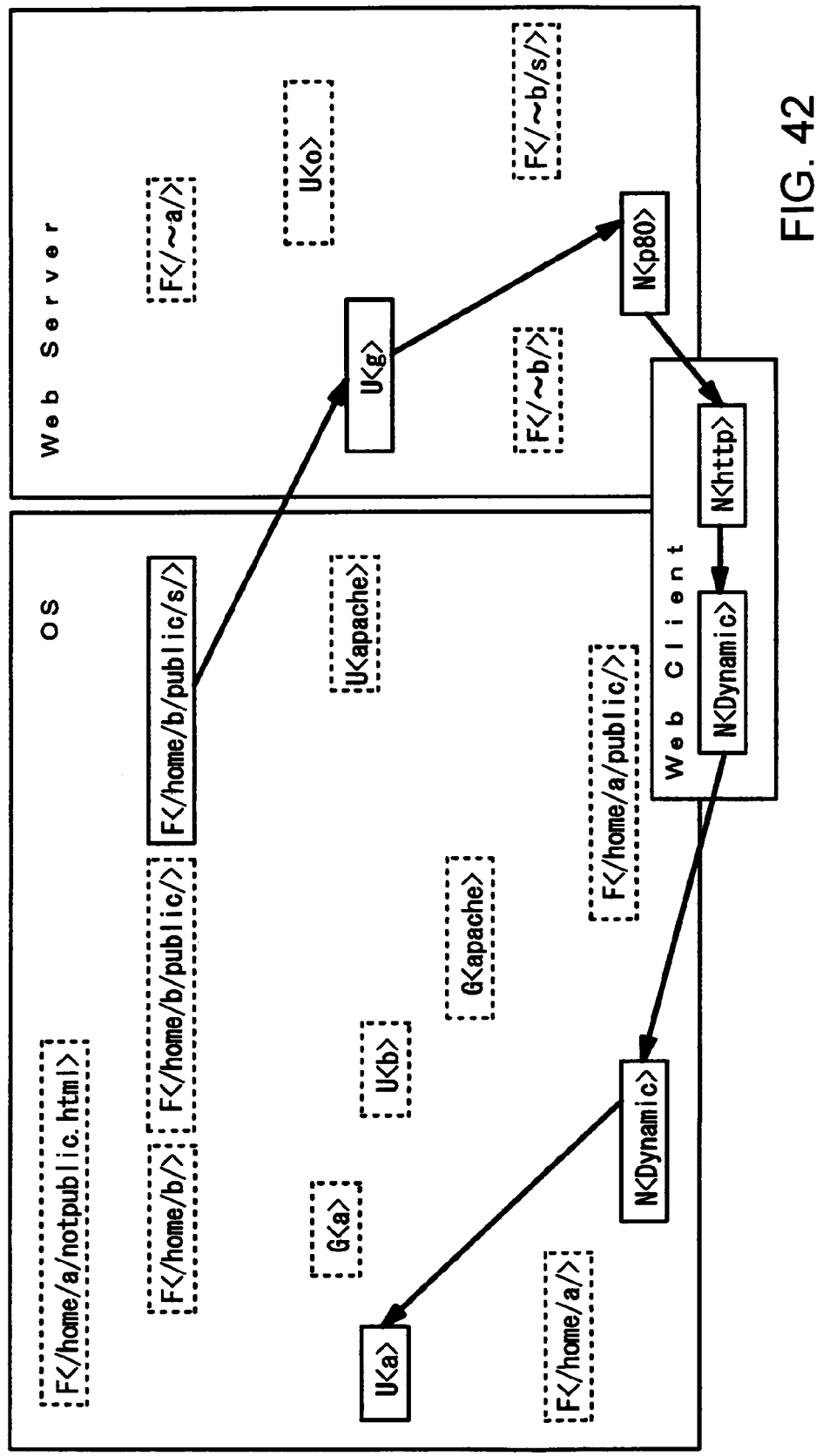
FIG. 42 shows the display screen of improper paths that have been discovered by means of the pattern matching process.

In Example 1 described above, paths that are based on improper settings may be displayed. In such a case, the improper paths of movement can be reported by highlighting by displaying graphs such as shown in FIG. 42 on a display screen. In FIG. 42, only the improper paths are displayed by solid black arrows. Any type of display format is possible as long as the improper paths are highlighted. It is also possible to display a graph of the state in which all nodes and arcs that are the cause for creating improper paths have been found such as shown in FIG. 39.

As previously described, when integrating access rights, access right integration unit 40 in this example performs a process for generating arc 901 that indicates a data movement relation that is shown in FIG. 26 from arc 805 that indicates an authority transfer that is shown in FIG. 25. Although not mentioned in the above-described example, when generating arc 901 that indicates a data movement relation, the setting information IDs that accompany all arcs and nodes that are used in generating arc 901, i.e., all arcs and nodes that were used for specifying the data movement relation, may be copied as the setting information ID of arc 901 that is newly created. In other words, the setting information IDs of all arcs and nodes that are used in the generation of an arc are made to correspond to the arc of the data movement relation that is generated when integrating access rights. Further, when security setting information is placed in correspondence with arcs and nodes rather than setting information IDs, this security setting information may be copied to a newly generated arc of a data movement relation.

Thus, in security verification device 100 that is provided with access right integration unit 40 having the function of placing security setting information IDs in correspondence with arcs of data movement relations that are newly generated when integrating access rights, setting information search unit 80 should perform the following processes. Specifically, setting information search unit 80, after searching for all nodes and arcs that make up the improper paths based on the node strings of improper paths that have been supplied by pattern matching unit 52, performs processes for searching for security setting information from setting information storage unit 31 based on the setting information IDs that have been placed in correspondence with these nodes and arcs, and for supplying the security setting information that has been extracted by means of the search to verification results display unit 60. If security setting information has been placed in correspondence with arcs and nodes instead of setting information IDs, setting information search unit 80 should supply the security setting information that has been placed in correspondence with all nodes and arcs that make up the improper paths to verification results display unit 60 without searching setting information storage unit 31.

Example 2

Explanation next regards an actual working example of the above-described security verification device 100 from the standpoint of the user interface. In this case, explanation focuses on the screens that are displayed on the display device that is provided in examining computer 120 of security verification device 100 that is shown in FIG. 16.

Figure 43:
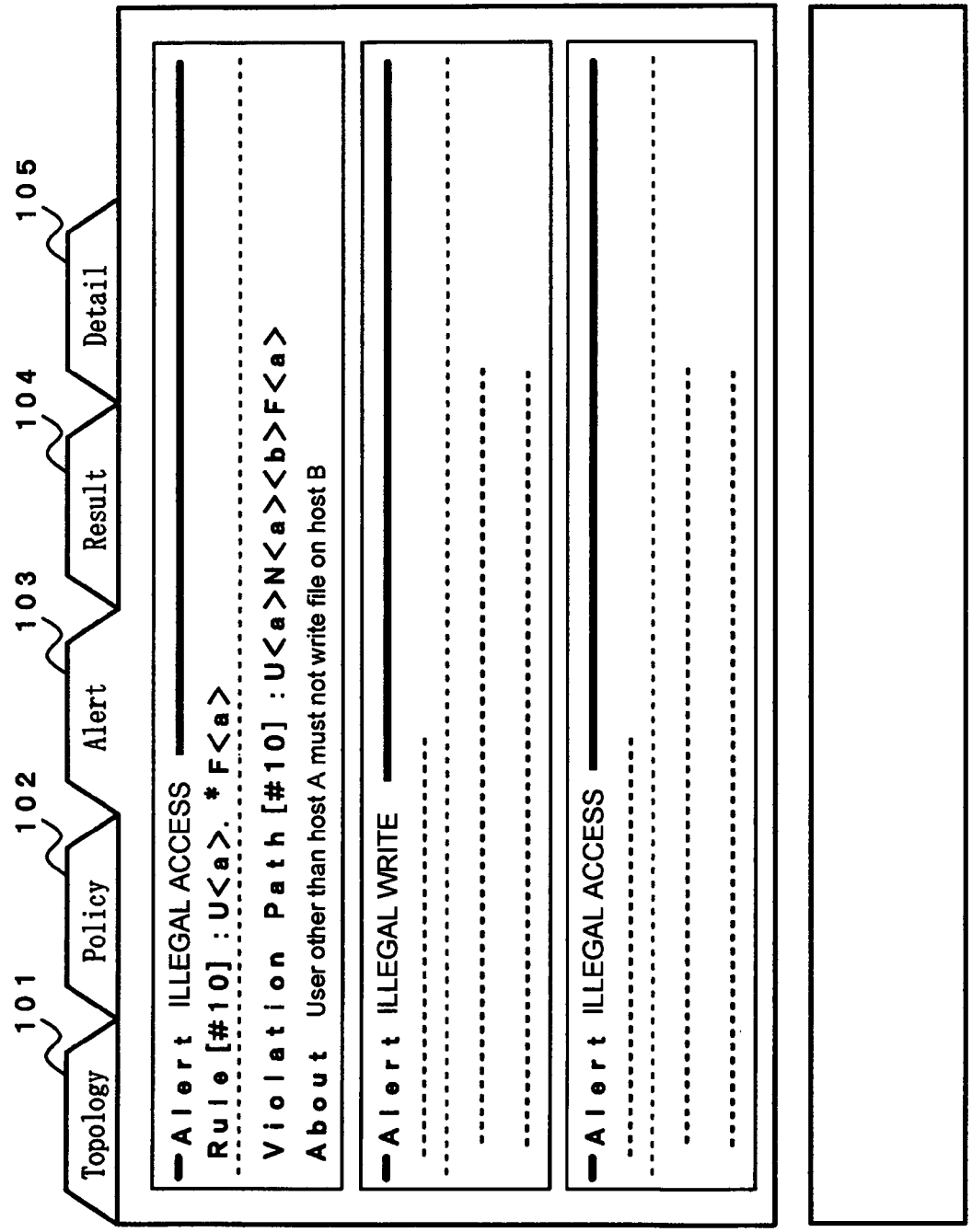
FIG. 43 shows the basic screen showing the entire image of user interfaces in the security verification device.

FIG. 43 shows an example of the basic screen that shows the entire image of user interface in security verification device 100. The basic screen is provided with display areas for displaying a plurality of tabs 101, 102, 103, 104, and 105. When any of tabs 101, 102, 103, 104, and 105 are selected by the operation of the user, a screen is displayed that corresponds to the selected tab. In other words, in the basic screen, the display content of the screen can be switched in accordance with a tab selection operation by the user to allow display of a plurality of items of information. Further, FIG. 43 shows an alert screen that is displayed when alert tab 103 has been selected.

Explanation next regards operations of the user interface by a user when security verification device 100 is caused to execute a security verification process.

When security verification device 100 is caused to execute a security verification process, the user first operates the console that is provided in examining computer 120 to bring about display of the basic screen (see FIG. 43) on the display device. An information input device such as a keyboard or mouse is used as the console.

Figure 44:
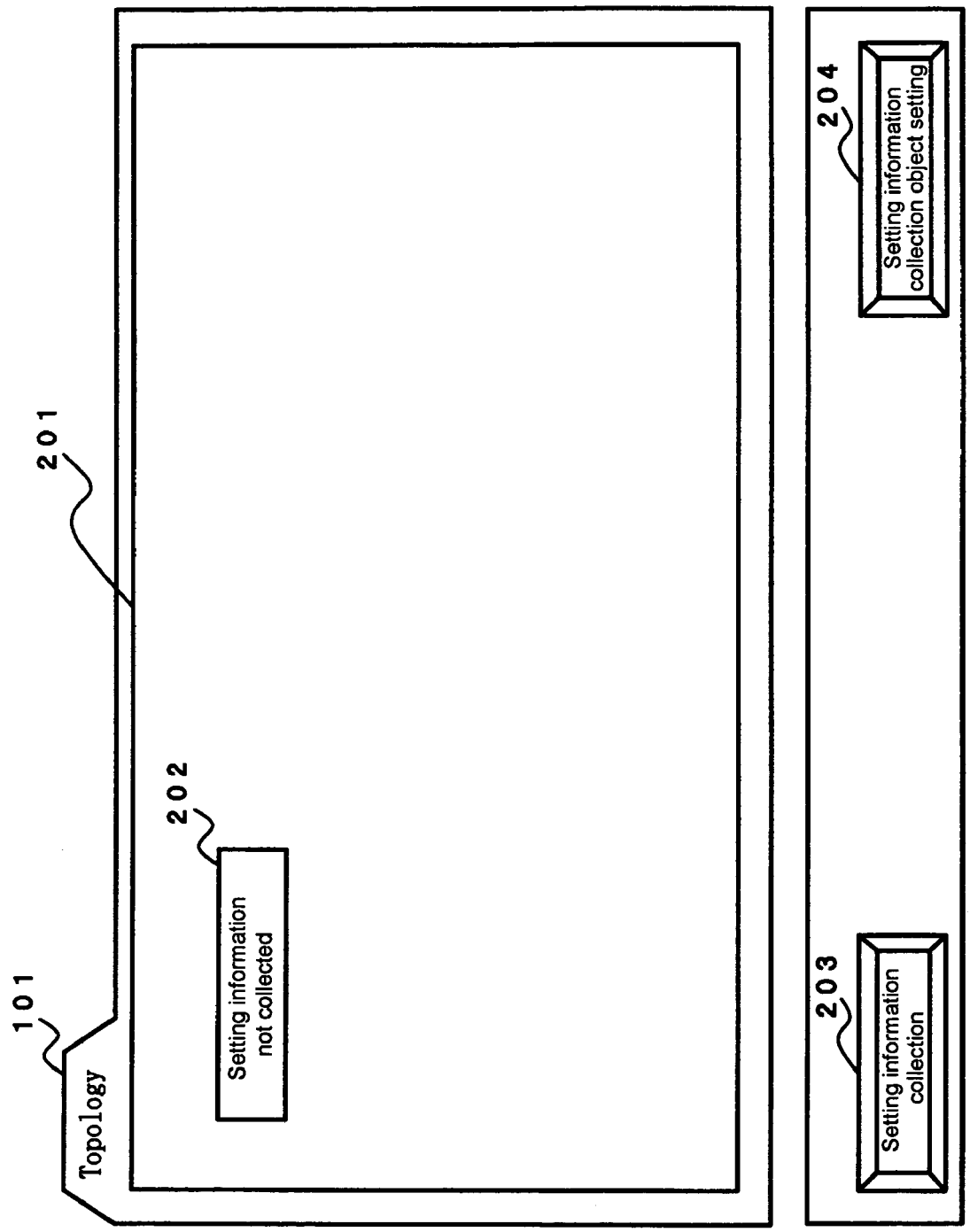
FIGS. 44 and 45 show examples of topology screens.
Figure 45:
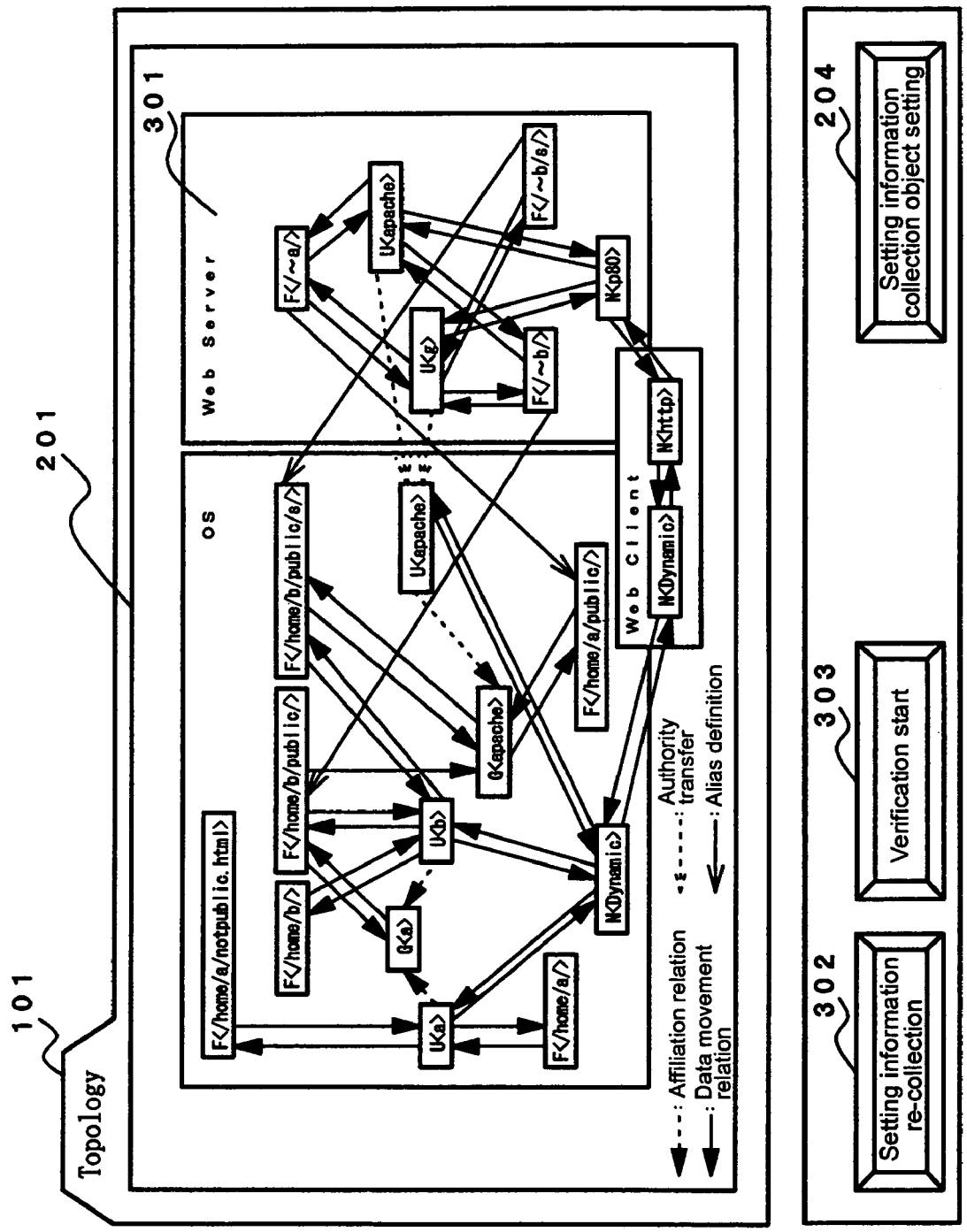

The user next selects topology tab 101 by operating the console and thus causes the display of the topology screen. FIGS. 44 and 45 show examples of topology screens that are displayed on the display device when topology tab 101 has been selected. When topology tab 101 is selected on the basic screen, examining computer 120 causes the display of the topology screen shown in FIG. 44 on the display device.

FIG. 44 shows an example of a topology screen when information is not being collected by setting information collection unit 70.

The topology screen that is shown in FIG. 44 is provided with: setting information display window 201, setting information collection button 203, and setting information collection object setting button 204. In this case, "setting information not collected indication" 202 indicating that the information has not yet been collected is formed in setting information display window 201. Setting information collection button 203 is a button for instructing setting information collection unit 70 to collect security setting information. Setting information collection object setting button 204 is a button for selecting the host that is to be object of security settings verification. Pressing setting information collection object setting button 204 causes the display of a list of computers or programs that are candidates as the object of security settings verification, and the object of verification of security settings can be selected from this list.

When the topology screen that is shown in FIG. 44 is displayed, the user operates the console to press setting information collection button 203 and then either instructs the collection of security setting information or instructs the generation of data transfer paths.

When security setting information is collected in accordance with the collection instructions that are activated by pressing setting information collection button 203, data transfer paths that have been produced based on the collected security setting information are displayed in setting information display window 201, for example, as shown in FIG. 45. In this case, data transfer paths (see FIG. 23) that have been generated by data transfer path generation unit 21 are displayed, as shown in FIG. 45.

The topology screen shown in FIG. 45 is provided with: display area 301 for displaying data transfer paths, setting information re-collection button 302, verification start button 303, and setting information collection object setting button 204. In other words, setting information collection button 203 changes to setting information re-collection button 302 after the execution of, for example, the collection of security setting information. In addition, the topology screen that is shown in FIG. 45 shows a state in which the data transfer paths that are generated based on security setting information that has been collected in accordance with pressing setting information collection button 203 are displayed in display area 301 in setting information display window 201.

Setting information re-collection button 302 is a button for instructing setting information collection unit 70 to again collect security setting information and for causing redrawing of the data transfer paths on setting information display window 201. Verification start button 303 is a button for causing access right integration unit 40 to integrate the access rights of data transfer paths that have been generated by data transfer path generation unit 21 and stored in data transfer path information storage unit 32, transmitting data transfer paths to verification unit 50 following integration of access rights, and instructing the start of security verification in verification unit 50.

When the topology screen shown in FIG. 45 is displayed, the user operates the console to press verification start button 303 and thus instruct the start of verification in verification unit 50. In this example, the instruction to start verification brings about integration of access rights by access right integration unit 40, and further, the generation of data transfer paths that have been converted by data transfer path conversion unit 51, and the transmission of these data transfer paths to pattern matching unit 52. Verification unit 50 then enters a standby state for input of security verification policies.

The user next operates the console to designate the security verification policies that are to be used in verification. In other words, the user, by manipulating the console, selects policy tab 102, causes display of the policy screen, and designates the security verification policies in the policy screen.

Figure 46:
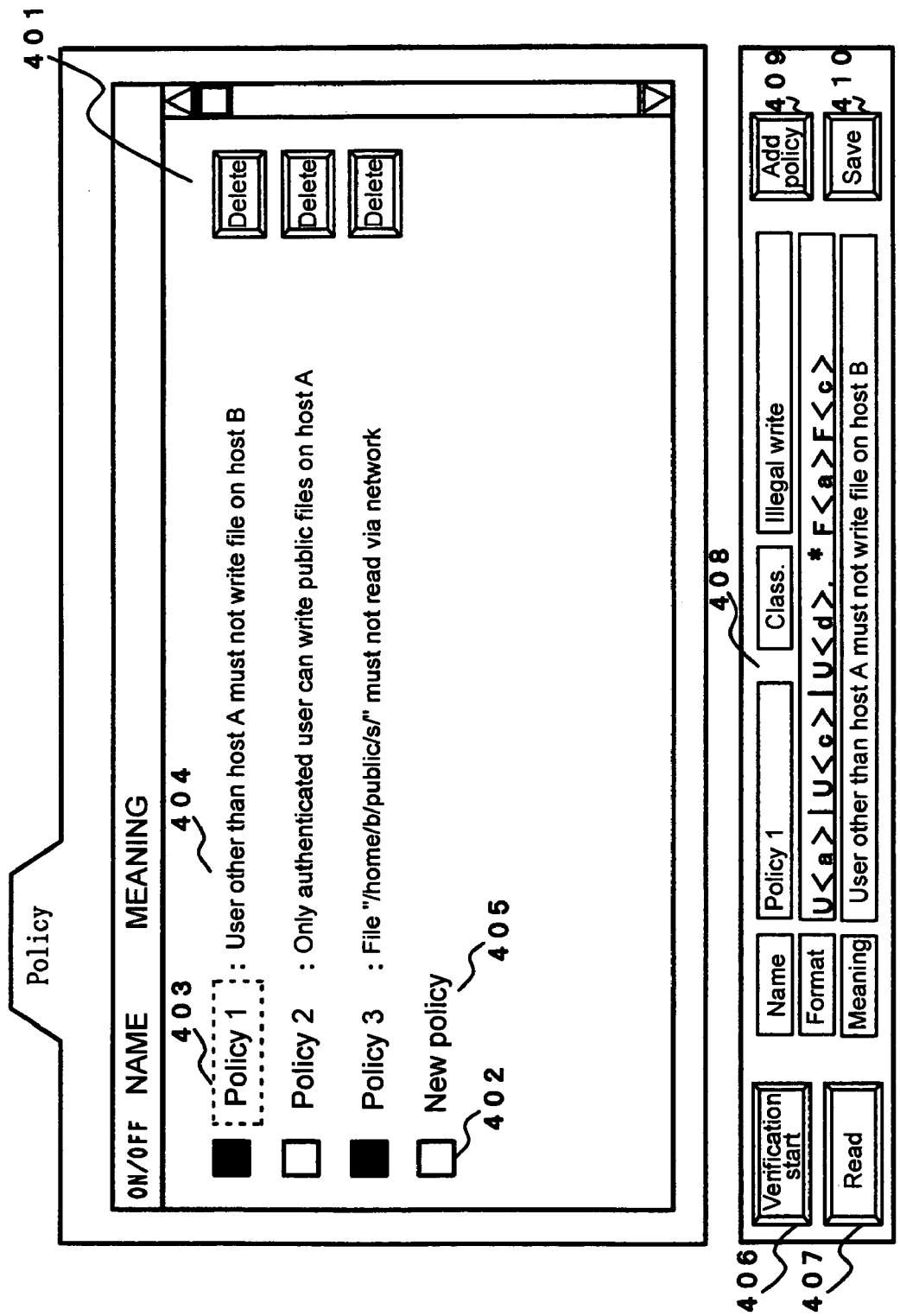
FIG. 46 shows an example of the policy screen.

FIG. 46 shows an example of the policy screen that is displayed on the display device when policy tab 102 has been selected. As shown in FIG. 46, policy screen is provided with policy list window 401 that displays a list of security verification policies. Check boxes 402 of policy list window 401 are for indicating whether the object policies are actually to be used for verification. In other words, only policies for which check boxes 402 are ON are transmitted by policy input unit 10 to pattern matching unit 52 and used as security verification policies of the object system. The state in which the interior of the check-box is shown filled in FIG. 46 indicates that this check box is ON.

The policy screen is provided with policy detailed information display window 408 in which is displayed at least one of such attribute information items as the name, format, meaning, and type of policies. The format notes the description format of the policy. In this case, when policy name 403 is selected in policy list window 401 by means of the user's operation of the console, detailed information relating to the selected policy is displayed in policy detailed information display window 408, and the policy name for which detailed information is displayed is highlighted by displaying as the portion within the dotted-line enclosure in FIG. 46.

The policy screen is further provided with: verification start button 406, read button 407, policy addition button 409, and save button 410. Read button 407 is a button for instructing reading of a policy that is saved in policy storage unit 33. Save button 410 is a button for instructing saving a policy to policy storage unit 33.

In this example, when new policy 405 is selected by the user's operation of the console in the policy screen, all of the information of policy detailed information display window 408 first becomes vacant. The new policy is then written to policy detailed information display window 408 by means of the user's operation of the console, following which the new policy is added to policy list window 401 when policy addition button 409 is pressed.

After operating the console to designate the policies that are to be used in verification in the policy screen, the user presses verification start button 406, whereupon the designated security verification policies are transmitted to pattern matching unit 52 and a pattern matching process is executed using the designated security verification policies and data transfer paths that have already been applied as input. After this process, a setting information search process is next executed by setting information search unit 80, and the search results are transmitted to verification results display unit 60.

Figure 47:
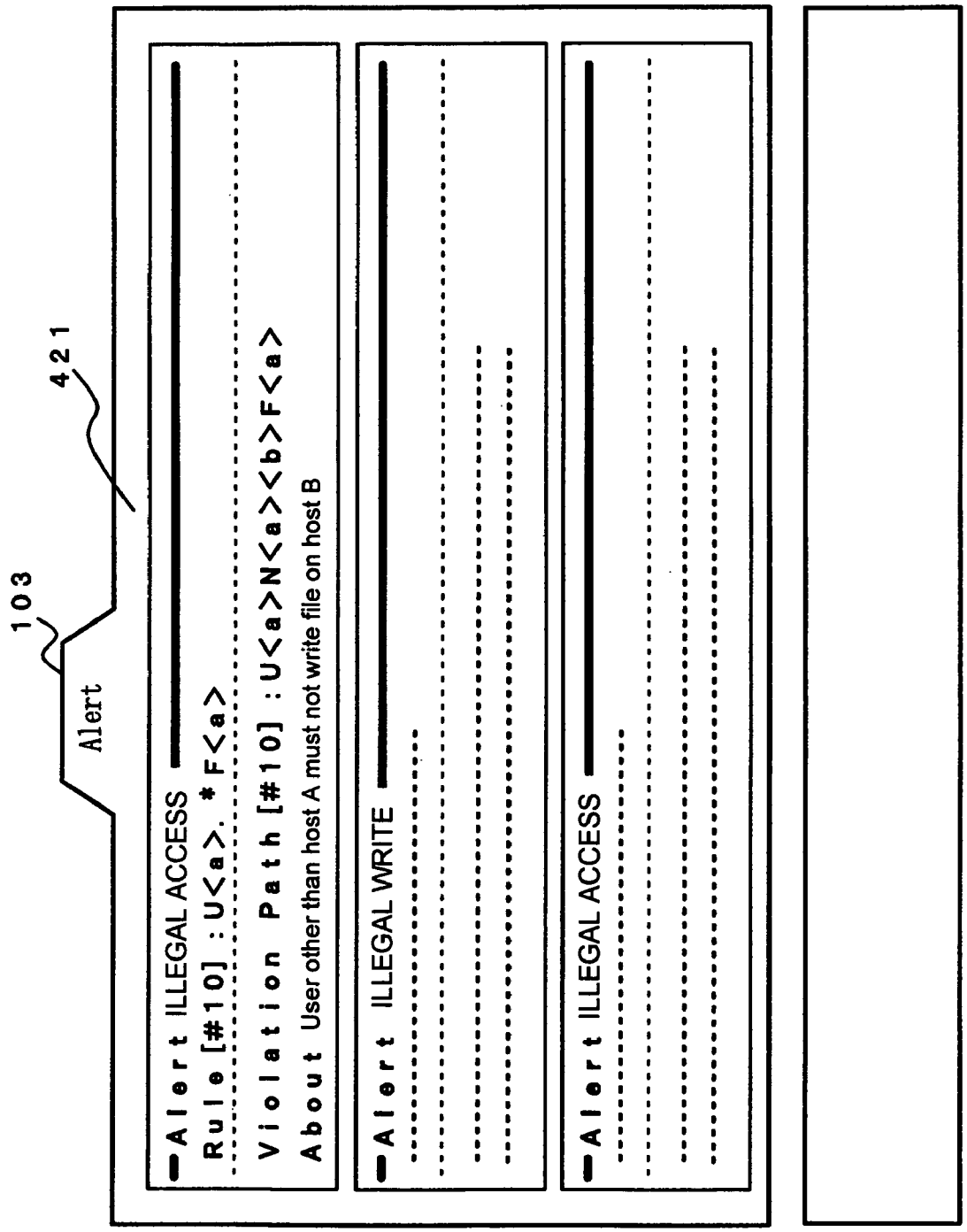
FIG. 47 shows an example of the alert screen.

The user presses alert tab 103 by operating the console. FIG. 47 shows an example of an alert screen that is displayed on display device when alert tab 103 has been selected. As shown in FIG. 46, the alert screen displays a list of the search results of setting information search unit 80. In alert list display window 421, verification results display unit 60 displays all of the improper settings of the search results that have been found by setting information search unit 80. The items that are displayed as improper settings include at least one of, for example, the type, name, and format of the security verification policies, and the data transfer paths that matched prohibition paths that are indicated by the security policy. Alert list display window 421 may further display the above-described detailed content of improper settings that are shown in FIG. 40 or FIG. 41.

Figure 48:
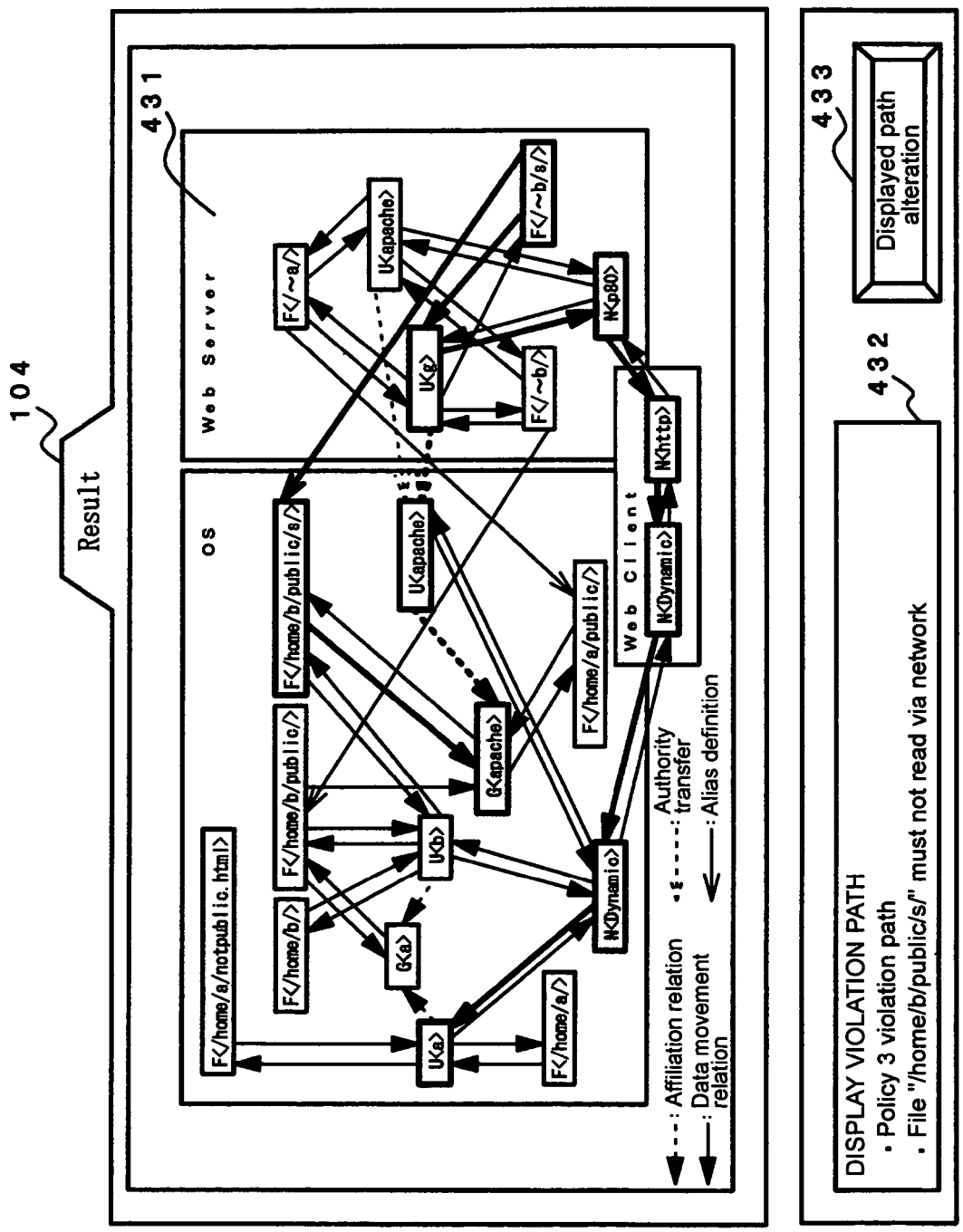
FIG. 48 shows an example of the result screen.

The user operates the console to press result tab 104. FIG. 48 shows an example of the result screen that is displayed on the display device when result tab 104 has been selected. As shown in FIG. 48, the result screen displays a graph (see FIG. 39) indicating all of the improper paths that have been found by setting information search unit 80. The result screen displays a graph in which the improper paths of the data transfer paths are highlighted in detected results display window 431. In addition, policy information display window 432 displays various types of information relating to the violation paths (improper paths) that are displayed in detection results display window 431.

In this example, when displayed path alteration button 433 is selected by the user's operation of the console, a list of violation paths is displayed. When one violation path is selected from the list of violation paths by the user's operation of the console, the violation path that is displayed in detection result display window 431 changes. The violation path list assumes a display format such as shown in FIG. 42.

Figure 49:
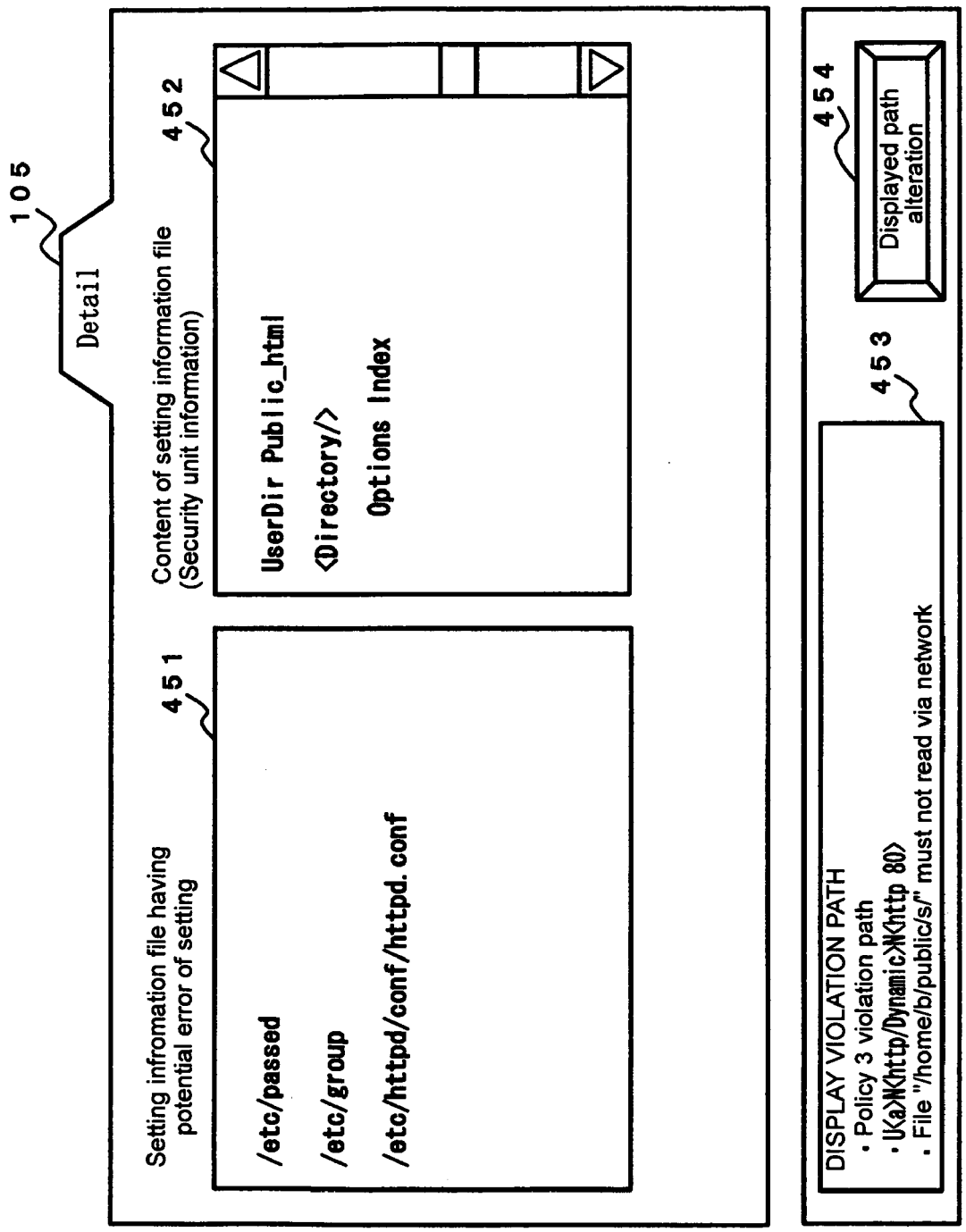
FIG. 49 shows an example of the detail screen.

The user next presses detail tab 105 by operating the console. FIG. 49 shows an example of the detail screen that is displayed on the display device when detail tab 105 has been selected. As shown in FIG. 49, detail screen displays details of the improper paths by means of verification results display unit 60. In this case, a list of setting information files that correspond to security unit information that has been searched as improper settings by setting information search unit 80 is displayed in improper settings display window 451 in which is displayed the content of setting information files that are possible setting errors, i.e., security unit information.

In addition, the detail screen shows, in settings file content display window 452, the content of the setting information file that has been selected by the user in improper settings display window 451. Further, information relating to the currently displayed improper path is displayed in displayed violation path display window 453.

As described in the foregoing explanation, various types of screen displays are realized for the user interface, and, based on the operations on the screen by the user, various types of processes are executed and execution results displayed.

Example 3

Figure 50:
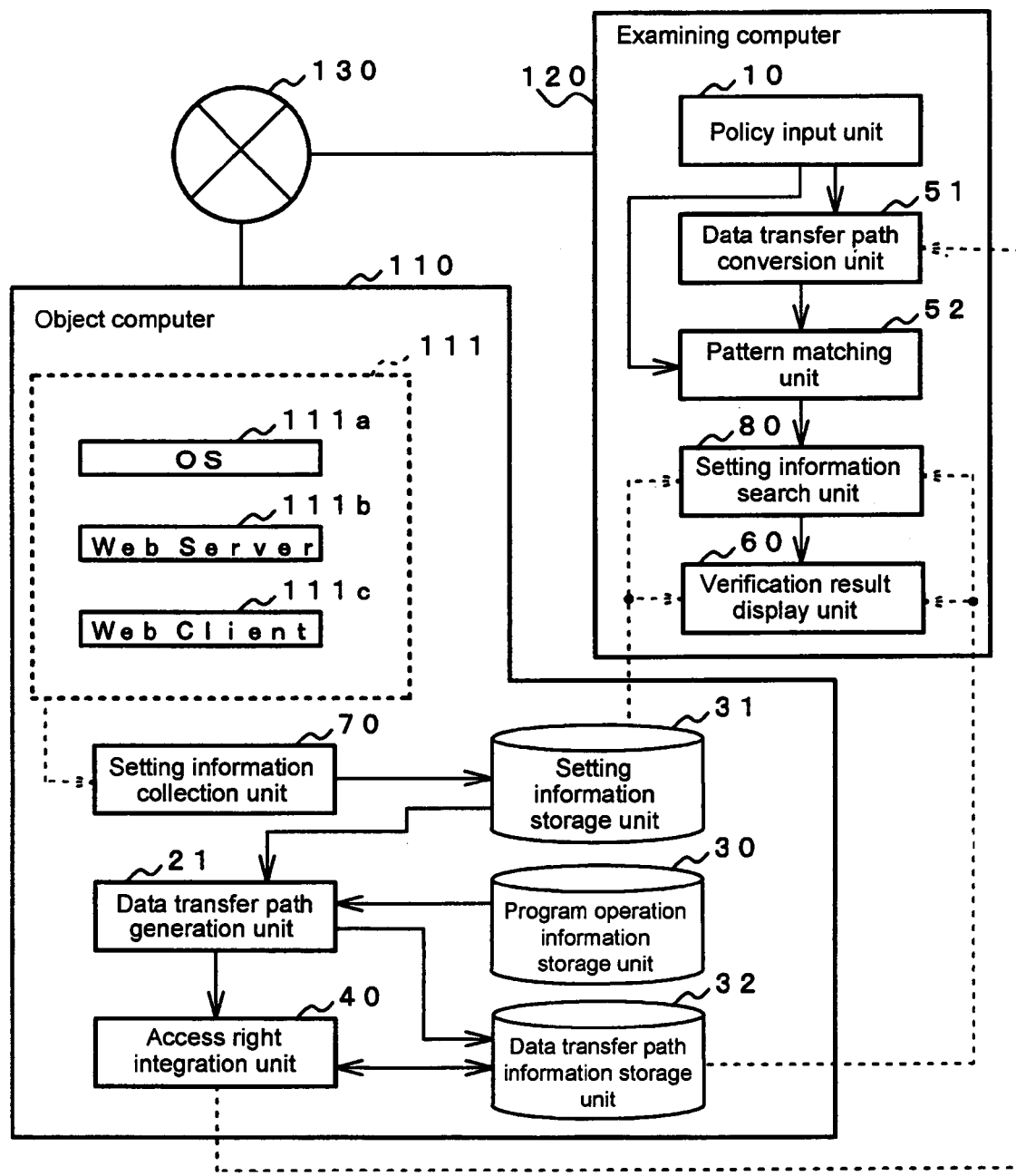
FIG. 50 is a block diagram showing another configuration of the security verification device.

FIG. 50 shows the actual configuration of security verification device 100 in the first embodiment of the present invention. Compared with FIG. 16, security verification device 100 that is shown in FIG. 50 differs in the configuration of the input of information from the policy input unit to data transfer path conversion unit 51, but in other respects has the same configuration.

In this example, policy input unit 10 supplies the leading node of security verification policies that have been received as input to data transfer path conversion unit 51. Data transfer path conversion unit 51 converts the data transfer path information that has been received from access right integration unit 40 to a tree structure that takes as the root the leading node of the security verification policies from policy input unit 10, and supplies the data of the converted tree structure to pattern matching unit 52. Pattern matching unit 52 searches for the security verification policies from policy input unit 10 based on the tree structure that has been converted by data transfer path conversion unit 51 and supplies the search results to setting information search unit 80.

Explanation next regards an actual example of the data transfer path conversion process executed in this example by data transfer path conversion unit 51 and shown in Step S205. In this case, explanation regards the data transfer path conversion process when the data transfer paths that are shown in FIG. 28 are given.

Figure 51A:
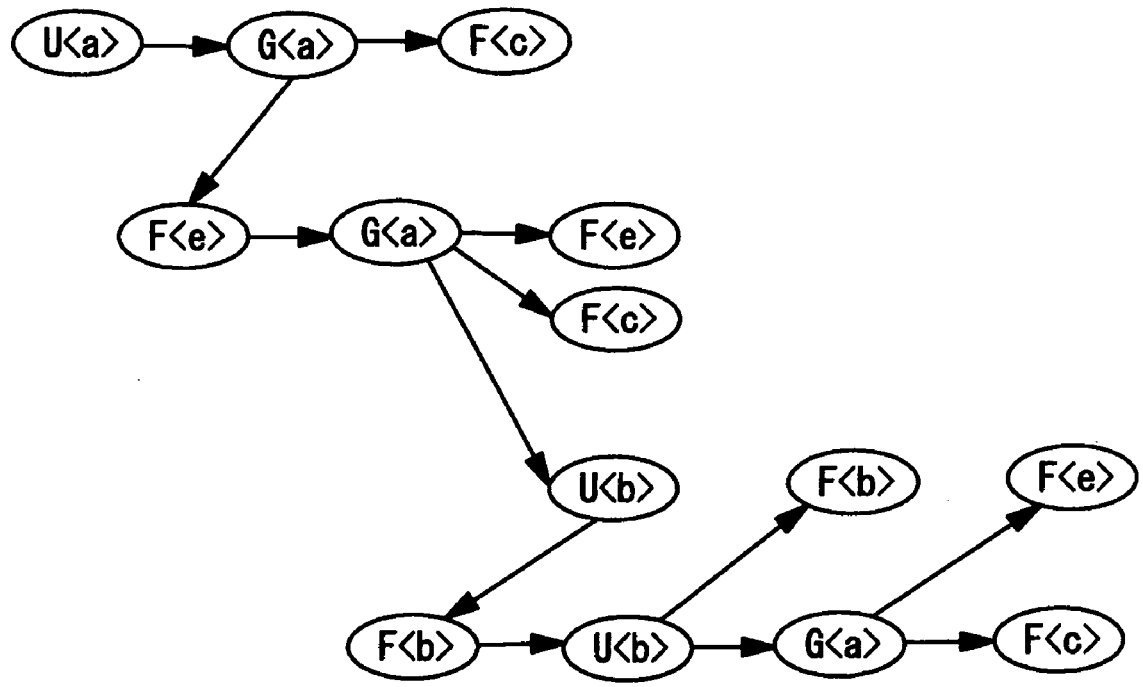
FIGS. 51A and 51B show tree structures that represent data transfer paths that are supplied as output from the data transfer path conversion unit following conversion.
Figure 51B:
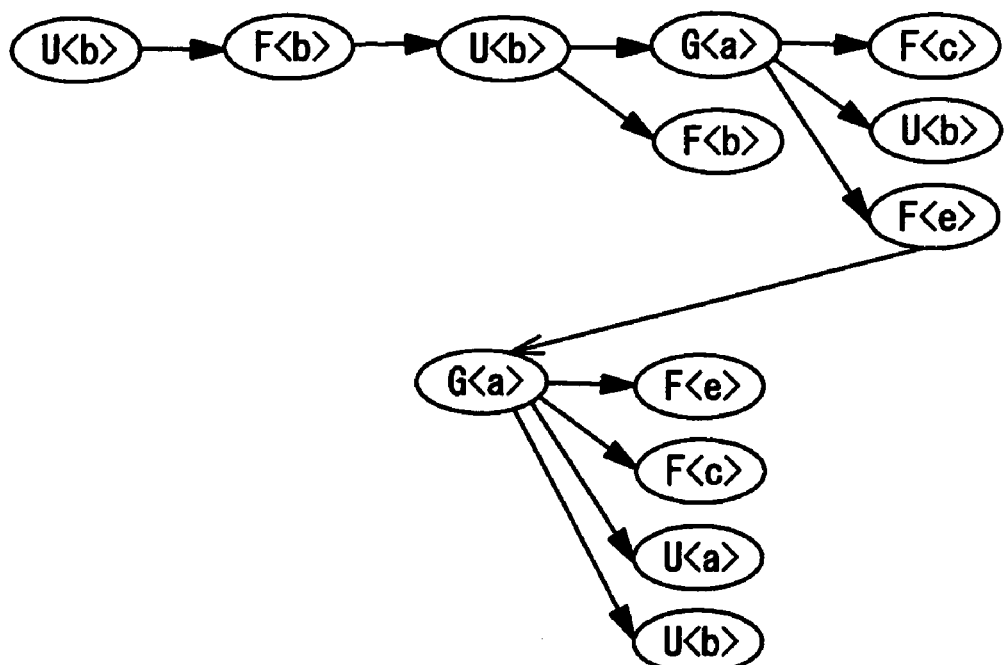
Figure 52:
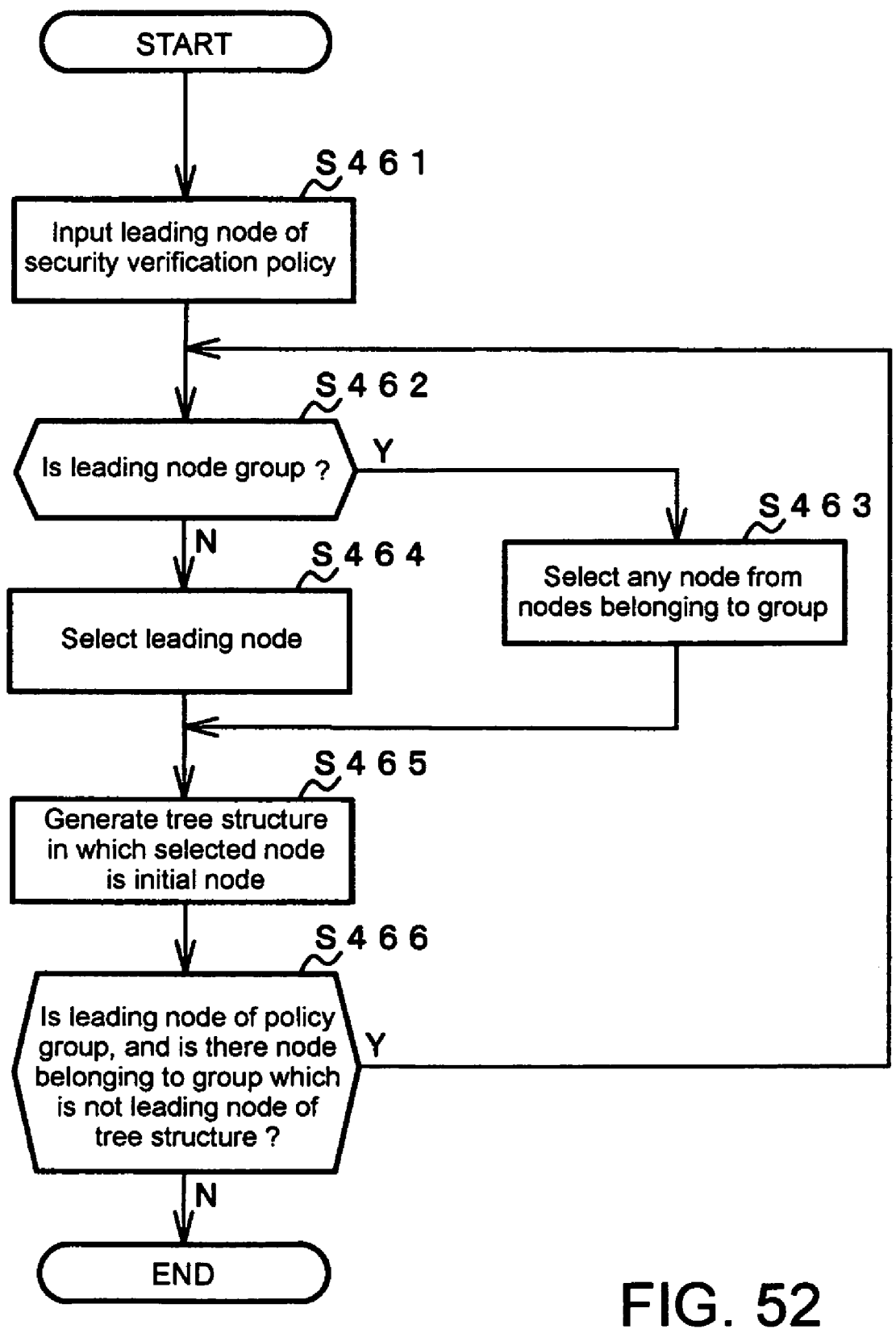
FIG. 52 is a flow chart showing another example of the data transfer path conversion process.

FIGS. 51A and 51B show data transfer paths following conversion of the data transfer paths that are shown in FIG. 28 by the data transfer path conversion process in this example when "(U<a>|U<b>)" is given as the leading node of the security verification policy "(U<a>|U<b>).*F<e>" from policy input unit 10. FIG. 52 is a flow chart showing the data transfer path conversion process in this working example.

In the data transfer path conversion process, data transfer path conversion unit 51 first receives "(U<a>|U<b>)" as the leading node of the security verification policy from policy input unit 10 in Step S461. Data transfer path conversion unit 51 determines in Step S462 whether the leading node of the received security verification policy is a group, i.e., a group node, or a plurality of nodes that is joined by "OR" and taken as a group. If the leading node is a group in Step S462, data transfer path conversion unit 51 selects one of the nodes that belong to this group as the leading node in Step S463. In this example, leading node "(U<a>|U<b>)" is a group, and any node that falls under this group (for example, (U<a>)) is selected in Step S463. If in Step S462 the leading node of the security verification policy is not a group, i.e., if the leading node is an independent node, data transfer path conversion unit 51 selects this node as the leading node in Step S464.

When the leading node has been selected, data transfer path conversion unit 51 creates a tree structure that takes the selected node as the root in Step S465. In Step S465, processes are executed that are similar to those of the above-described Steps S216 to S223. In this example, a tree structure that takes a node (for example, (U<a>)) as the root as shown in FIG. 51A is generated as a result of these processes.

It is next determined in Step S466 whether the leading node of the received security verification policy is a group and whether a node remains among the nodes that belong to this group that has not yet been selected as the leading node, and if such a node exists, data transfer path conversion unit 51 returns to Step S462 and then subsequently selects this node as the leading node in Step S463. In this example, leading node "(U<a>|U<b>)" is a group, and because a node (for example, (U<a>)) has already been selected as the leading node, a node that falls under this group (for example, (U<b>)) is selected in this Step S463. In Step S465, a tree structure is created that takes the selected node as the root. As a result, a tree structure that takes a node (for example, (U<b>)) as root such as shown in FIG. 51B is generated in this example.

The processes in the above-described Steps S463 to S466 are repeated until data transfer path information of tree structures that take as roots all nodes that fall under the group have been created.

In this working example, data transfer path conversion unit 51 uses the leading node of a security verification policy that has been received as input from policy input unit 10 to execute processing for the conversion to data transfer path information of tree structure.

Example 4

Explanation next regards an actual working example of the fifth embodiment of the present invention. In this case, explanation regards the actual operation of the security verification process in the fifth embodiment (see FIG. 13). In this example, explanation regards a case for verifying the settings of a computer system that is composed of four hosts such as shown in FIG. 53. The operating systems of all of the hosts are constituted by Linux, and in SERVER1 and SERVER2 that are shown in FIG. 53, the systems operate as servers that have been installed by an application of a service that will be explained hereinbelow. In FIREWALL that is shown in FIG. 53, software called "ipchains" has been installed that performs packet filtering. In CLIENT that is shown in FIG. 53, client software has been installed that is used for cases in which a user logs in and uses the functions of other servers.

Setting model input unit 11 first applies as input a setting model that represents the configuration of the computer system and security setting information (see Step S301). The setting model is received by the storage by setting model input unit 11 of various types of information into setting model storage unit 34, this information having been applied as input by the user by the following procedure.

Setting model input unit 11 first stores in setting model storage unit 34 the host that is the object of verification that has been applied as input by the operations of a user such as a verifier. This process is carried out based on the specification of the host that is the object of verification by the verifier.

In this case, there are four hosts: SERVER1, SERVER2, FIREWALL, and CLIENT shown in FIG. 53; and these four hosts are therefore applied as input by setting model input unit 11. When the four hosts have been applied as input, the host that is the object of verification is stored in setting model storage unit 34 as shown in, for example, FIG. 54.

By operating setting model input unit 11, the user next applies as input the IP addresses of the hosts. In this example, IP addresses are assigned to each of the hosts as shown in FIG. 55. In this case, the user uses function "b" that represents the hosts to which each IP addresses belongs, and applies as input:

b(192.168.2.5)=SERVER2
b(192.168.2.4)=SERVER1
b(192.168.2.3)=b(192.168.1.1)=FIREWALL
b(192.168.1.2)=CLIENT

In the case of Linux, the affiliation information of the IP addresses is written in a setting file such as "ifcfg-eth0," or "ifcfg-eth1" that is stored in the directory of each host "/etc/sysconfig/network-script/". More specifically, the file "ifcfg-eth1" shown in FIG. 56 is stored in host SERVER2, and the numerals that follow the character string "IPADDR=" in this file is the IP address that is associated with SERVER2. The other IP addresses are similar.

The IP addresses of the hosts are stored in setting model storage unit 34 together with the four previously described hosts, for example, as shown in FIG. 57.

Graph G that represents the network connections is next applied as input. Graph G is a graph that takes each IP address as an apex. In this example, the network system that is the object of verification is the configuration shown in FIG. 58.

The verifier checks the state of connections of the network devices in this graph G and the graph is then applied as input through the user's operations of setting model input unit 11. Each IP address is defined as shown in FIG. 57, and the network system that is the object of verification is in a relation as shown in FIG. 58. Graph G that shows the connections of the network that is the object of verification is therefore described as shown in, for example, range "a" of FIG. 59 and stored in setting model storage unit 34.

The user is next applied as input FIG. 60 shows the relation of the user and the hosts. In FIG. 60, nodes that are enclosed by squares with rounded corners represent users, nodes enclosed by ovals represent hosts, and the arrows between these nodes represent the affiliation relations of the users to the hosts.

Using function "b" that represents the hosts to which users belong, the relations shown in FIG. 60 can be described as:

b(ftp)=SERVER2
b(student)=SERVER1
b(hanako)=SERVER1
b(taro)=CLIENT

The user of each host is created by the user settings and group settings of the OS. More specifically, in the case of Linux, the user settings are stored in the directory "/etc/passwd" and the group settings are stored in the directory "/etc/group".

FIG. 61 shows the user settings of SERVER1. From these settings it can be understood that the user "hanako" is present in SERVER1. Thus, b(hanako)=SERVER1.

FIG. 62 shows the group settings of SERVER1. From these settings, it can be understood that the group "student" is present in SERVER1. Since users and groups are both treated as users in a setting model, the group "student" is also treated as a user, and it can be understood that b(student)=SERVER1. The same holds true for the settings of the other hosts.

Users that are applied as input as described above are stored in setting model storage unit 34 together with the previously described four hosts and IP addresses of the hosts as shown in, for example, FIG. 63.

Files are next applied as input. The files of each host are created by referring to the file system of the OS. More specifically, in the case of Linux, a list of files can be obtained by executing the command "ls ?alr". For example, a list of files that can be acquired on host SERVER2 is as shown in FIG. 64. From the list of files, it can be seen that the file "paper.txt" exists in SERVER2, and as a result, b(paper.txt)=SERVER2. The same holds true for other hosts. Files that have been applied as input as described above are stored together with the previously described four hosts, host IP addresses, and users in setting model storage unit 34 as shown in, for example, FIG. 65.

The network access expression is next applied as input. In the object system, packet filtering is implemented in host FIREWALL. For example, it will be assumed that communication is permitted from any port number of transmission origin IP address "192.168.1.2" to port number 80 of transmission destination IP address 192.198.2.4. The setting of the network access expression n(192.168.2.3, 192.168.1.2, 192.168.2.4, 80) can be created from this information and the IP address at which filtering is implemented. The network access expression that is thus applied as input is described as shown in, for example, range "b" of FIG. 59 and stored in setting model storage unit 34.

The access control matrix expression of files is next applied as input "Access control matrix expression" is an expression of the existence or lack of a user's access rights to a file. Access rights are of two types: "read," which indicates the right to read a file, and "write," which indicates the right to write a file. For example, as shown in FIG. 64, the owners and the rights with respect to each file can be understood from the output result of the command "ls ?alr". In the list shown in FIG. 64, user "ftp" is granted the "read" rights and "write" rights to the file "paper.text." Based on this information, the access control matrix expression "acc (ftp, read, paper.txt), acc(ftp, write, paper.txt)" can be described. The file access control matrix expression that has been applied as input in this way is described as shown in range "e" of FIG. 59 and stored in setting model storage unit 34.

The type of authority acquisition that can be realized through the use of a service (authority acquisition relation) is next applied as input. "Authority acquisition" represents the ability of one user to use a service and thus acquire the authority of another user. Authority acquisition is created when one user holds information that is necessary for authentication such as another user's ID or password, or unconditionally when authority can be acquired without undergoing special authentication. More specifically, authority acquisition can be created by investigating a network service that is executed on a host and the relevant settings.

In the present working example, it is assumed that the service "telnet" is provided on SERVER1, and that the user "taro" of CLIENT knows the password to use to access user "hanako" of SERVER1 by the service "telnet." It is further assumed in the present example that an anonymous FTP service is offered on SERVER2, and that users belonging to the group "student" on SERVER1 can use the service "ftp" unconditionally. In this case, user "taro" of CLIENT can acquire the authority of user "hanako" of SERVER1 by means of the service "telnet." As a result, the authority acquisition relation is auth(taro, telnet, hanako). In addition, user "student" of SERVER1 can acquire the authority of user "ftp" of SERVER2 unconditionally by means of service "ftp." As a result, the authority acquisition relation is auth (student, ftp, ftp).

Service "null" indicates that a user is affiliated with a group. In the case of Linux, an authority acquisition relation that uses service "null" can be created from the user settings file that is shown in FIG. 61 and the group settings file that is shown in FIG. 62. More specifically, based on the user settings file that is shown in FIG. 61, the group ID of user "hanako" is "501"; and the group for which the group ID is "501" in the group settings file that is shown in FIG. 62 is "student." From this information, it can be understood that user "hanako" is affiliated with the group "student." As a result, auth(hanako, null, student) can be created as an authority acquisition relation.

The authority acquisition relation that is thus applied as input is described as shown in range "c" of FIG. 59 and stored in setting model storage unit 34.

The cascade relation is next applied as input. A "cascade relation" represents the types of services that can be used one after another when a particular service is used to acquire authority. This relation is determined by the type of service. More specifically, this relation is determined in advance according to the type of service, such that, for example, the service "ftp" can be used once authority has been acquired through the service "telnet," but the service "telnet" cannot be used even though authority has been acquired through the service "ftp." In addition, the types of authority that can be used are determined according to whether the relevant service has been installed in the host or according to whether a user that has acquired authority has the authority to execute the service. In the present working example, when the authority of the user "hanako" of SERVER1 has been acquired through the service "telnet," the service "null" can be used. This cascade relation is therefore: cas(telnet, hanako, null). When the service "null" is used to acquire the authority of user "student" of SERVER1, the service "ftp" can be used. The cascade relation is therefore cas(null, student, ftp).

A cascade relation that has been thus applied as input is described as shown in range "d" of FIG. 59 and stored in setting model storage unit 34.

The port number of the network that is used by the service is applied as input as shown in range "f" of FIG. 59. In Linux, the correspondence between the names of services and port numbers can be investigated by referring to the file "/etc/services."

A setting model (see FIG. 59) that includes the system configuration of the object system (for example, see FIG. 65) is thus constructed in setting model storage unit 34 through the successive storage of the various types of information for composing a setting model that are applied as input as described in the foregoing explanation. In other words, a setting model is applied as input to setting model storage unit 34.

In Step S302, security verification policies are next applied as input by policy input unit 10. The security verification policy that is given in the present working example is assumed to be policy "flow(secret.txt, paper.txt) ." This policy "flow(secret.txt, paper.txt)" is a prohibition policy that indicates that there must be no movement of data from "secret.txt" to "paper.txt" and that the content of "secret.txt" must not be written to "paper.txt."

Using the policy and setting model that have been applied as input as described above, verification unit 50a performs processes for verifying whether the model matches the policy in Step S303.

Verification unit 50a can be realized by using a Prolog interpreter, which is a well-known language processor. In this case, of each of the predicates in the policy description, "acc", "auth", and "cas" are implemented as built-in predicates.

The contents of the implementation of each of the built-in predicates are as follows:

acc(U, S, F): "True when (U, S, F) is included in the access control matrix expression in the setting model storage unit,"

cas(S1, U, S2): "True when (S1, U, S2) is included in a cascade relation in the setting model storage unit,"

auth(U1, S, U2): "True when (U1, S, U2) is included in the authority acquisition relation in the setting model storage unit, and moreover, when a connection can be established to the port that realizes service S on U2 from the host to which U1 belongs to the host to which U2 belongs."

In this case, the determination of whether a connection can be established to the port for realizing service "S" on user "U2" from the host to which user "U1" belongs to the host to which user "U2" belongs can be realized by examining whether there is a path in a network connection expression that is stored as a setting model in setting model storage unit 34 that connects from the host to which user "U1" belongs to the host to which user "U2" belongs, and moreover, whether the relevant port in this path is permitted by the network access expression that is stored as a setting model in setting model storage unit 34.

In addition, the predicate "flow" that expresses the data flow relation can be described by a Prolog program such as:

flow (F, F):—true, flow (F1, F2):—flow 2(F1, F3), flow(F3, F2), flow2 (F1, F2):—acc(U1, read, F1), auth2 (U3, S1, U1), auth2 (U3, S2, U2), acc (U2, write, F2), auth2 (U, S, U):—true,
auth2 (U3, S1, U1):—auth (U3, S1, U2), cas (S1, U2, S2),
auth2 (U2, S2, U1), Accordingly, the above-described Prolog program on the Prolog processor that is provided with the above-described built-in predicates can determine whether the policy that is described by policy input unit 10 matches with a setting model.

The adoption of a configuration that uses verification unit 50*a* having the functions explained above enables determination of whether the policy "flow(secret.txt, paper.txt)" matches with the setting model that is stored in setting model storage unit 34.

According to the results obtained in the present example, the setting model matches with the policy "flow(secret.txt, paper.txt)."

In this example, the permission policy that matches is displayed by verification results display unit 60. More specifically, the verified policy is displayed and presented to the verifier as shown in FIG. 66. In addition, as shown in FIG. 66, the type of policy shows whether paths are shown to which the policy does not apply or whether paths are shown that are necessary. In other words, the type of policy communicates whether the policy is a prohibition policy or a permission policy. Further, when a prohibition policy that matches is displayed as shown in FIG. 66, the setting model that matches paths that do not conform that are indicated by this prohibition policy may be displayed together with the prohibition policy.

When accompanying information such as explanations of the policies is stored in policy storage unit 33, the accompanying information such as explanatory text may also be displayed together with the policy.

As described in the foregoing explanation, a configuration is adopted in which the system configuration and settings are applied as a setting model, policies that show flow that does not conform or flow that is necessary are used to search the model, and the policies and model then displayed, whereby a verifier, relying on the displayed policies and model, is able to review the settings and is thus able to discover and amend setting errors in which the settings of a plurality of hosts or programs have composite relations.

While preferred embodiments of the present invention have been described using specific terms, such description is for illustrative purposes only, and it is to be understood that changes and variations may be made without departing from the spirit or scope of the following claims.

What is claimed is:

1. A security verification method for verifying whether improper settings that indicate composite errors of security settings exist in an object system, said method comprising the steps of:
   reading data transfer paths that represent data movement in said object system and that have been generated based on program operation information that describes operations of a program that is used in said object system;
   integrating access rights of data transfer paths that have been read; and
   based on security verification policies in which improper paths, which are paths of data movement that are improper from a standpoint of security, have been set in advance, searching for improper paths among data transfer paths for which access rights have been integrated.

2. The method according to claim 1, comprising the step of, based on the program operation information, searching composite security settings that allow data movement on improper paths that have been discovered.

3. The method according to claim 2, comprising the step of displaying the composite security settings that have been discovered are displayed.

4. The method according to claim 1, further comprising the steps of:
   collecting setting information that indicates security settings in the object of system;
   generating data transfer paths based on the setting information that has been collected and the program operation information; and
   storing the data transfer paths that have been generated for use in the integration of the access rights.

5. The method according to claim 1, further comprising the steps of:
   converting data transfer paths for which the access rights have been integrated to data of tree structure; and
   searching whether paths that match the improper paths that are indicated by the security verification policies exist among the data transfer paths that have been converted to data of tree structure.

6. A security verification method for verifying whether improper settings that indicate composite errors of security settings exist in an object system, said security verification method comprising the steps of:
   storing in a storage device an operation model that represents operation contents of said object system and that is generated based on program operation information that describes operations of a program that is used said object system; and
   verifying whether data movement that is represented by security verification policies in which data movement that is proper or improper from a standpoint of security has been set in advance conform with the operation contents of said object system that is represented by the operation model that has been stored in said storage device.

7. A security verification device for verifying whether improper settings that indicate composite errors of security settings exist in an object system; said security verification device comprising:
   data transfer path storage means for storing data transfer paths that indicate data movement in said object system and that have been generated based on program operation information that describes operations of a program that is used in said object system;
   access right integration means for integrating access rights of data transfer paths that represent data movement in said object system that have been stored in said data transfer path storage means; and
   search means for, based on security verification policies in which improper paths, which are paths of data movement that is improper from a standpoint of security, have been set in advance, searching for improper paths among data transfer paths for which access rights have been integrated.

8. The device according to claim 7, further comprising:
   security settings search means for, based on said program operation information, searching for composite security settings that allow data movement on improper paths that have been discovered by said search means.

9. The device according to claim 8, further comprising:
   search results display means for displaying composite security settings that have been discovered by said security settings search means.

10. The device according to claim 7, further comprising:
search result output means for displaying improper paths that have been discovered by said search means.

11. The device according to claim 7, comprising:
setting information storage means for storing setting information;
setting information collection means for collecting setting information that indicates the security settings in said object system and that is stored in said setting information storage means;
program operation information storage means for storing program operation information that describes the operations of a program that is used in said object system; and
data transfer path generation means for generating data transfer paths based on setting information that has been collected by said setting information collection means and program operation information that is stored in said program operation information storage means;
wherein said data transfer path generation means stores data transfer paths that have been generated in said data transfer path storage means.

12. The device according to claim 7, wherein:
said search means is provided with data conversion means for converting data transfer paths for which access rights have been integrated to data of tree structure; and
said search means searches to determine whether paths exist among data transfer paths that have been converted by said data conversion means that match with improper paths that are indicated by security verification policies.

13. A security verification device for verifying whether improper settings that indicate composite errors of security settings exist in an object system; said security verification device comprising:
setting information storage means for storing setting information;
setting information collection means for collecting setting information that indicates security settings in said object system and that is stored in said setting information storage means;
program operation information storage means for storing program operation information that describes operations of a program that is used in said object system; and
data transfer path generation means for generating data transfer paths based on setting information that has been collected by said setting information collection means and program operation information that is stored in said program operation information storage means.

14. A security verification device for verifying whether improper settings that indicate composite errors of security settings exist in an object system; said security verification device comprising:
operation model storage means for storing operation model that represents operation contents of said object system and that is generated based on program operation information that describes operations of a program that is used in said object system; and
verification means for verifying whether the operation contents of said object system that are represented by operation model that have been stored in said operation model storage means conform with relevant data movement that is represented by security verification policies in which data movement that is proper or improper from a standpoint of security has been set in advance.

15. The device according to claim 14, wherein said operation model that represents operation contents of said object system and that is stored in said operation model storage means are generated based on:
host information relating to a host that makes up said object system;
network connection expression information that represents the network configuration of said object system;
user information that represents a user that is affiliated with said hosts;
file information that represents a storage site of data;
service information that represents a service that is offered to said user by means of said object system;
access control information that represents access authority of said user;
network access information that represents filtering in a communication network;
authority acquisition relation information of a network service that represents authority acquisition relations between users that use the communication network; and
cascade relation information that represents a service that, when said user have used said service to acquire access right of another user, can be used by said user through said access right of said another user.

16. The device according to claim 15, wherein security verification policies are described by logical expressions that include: data flow relation information that represents data movement, or authority acquisition relation information, cascade relation information, and access control information.

17. A security verification device for verifying whether improper settings that indicate composite errors of security settings exist in an object system that is connected to a communication network; said security verification device comprising:
search means for searching for improper paths among data transfer paths that represent data movement in said object system based on security verification policies in which improper paths, which are paths of data movement that are improper from a standpoint of security, have been set in advance; and
security setting search means for, based on program operation information that describes operations of a program that is used in said object system, searching for composite security settings that allow data movement on improper paths that have been discovered by said search means.

18. The device according to claim 17, further comprising search result display means for displaying composite security settings that have been discovered by said security settings search means.

19. The device according to claim 17, further comprising:
access integration means for integrating access rights of data transfer paths based on said program operation information;
wherein said search means includes data conversion means for converting data transfer paths for which access rights have been integrated to data of tree structure; and
wherein said search means searches to determine existence of paths for which improper paths that are indicated by security verification policies match with data transfer paths that have been converted by said data conversion means.

20. A program product for verifying whether improper settings that indicate composite errors in security settings exist in an object system; said program product causing a computer to execute steps of:

reading data transfer paths that represent data movement in an object system and that are generated based on program operation information that describes operations of a program that is used in said object system;

integrating access rights of data transfer paths that have been read; and searching for improper paths among data transfer paths for which access rights have been integrated based on security verification policies in which improper paths, which are paths of data movement that is improper from a standpoint of security, have been set in advance.

21. The program product according to claim 20 for causing said computer to further execute a step of, based on said program operation information, searching for composite security settings that allow data movement on improper paths that have been discovered.

22. The program product according to claim 21 for causing said computer to further execute a step of displaying composite security settings that have been discovered.

23. The program product according to claim 20 for causing said computer to further execute steps of:

collecting setting information that indicates security settings in said object system; and generating data transfer paths based on setting information that has been collected and program operation information that describes operations of a program that is used by said object system;

wherein data transfer paths that have been generated are used in the integration of access rights.

24. The program product according to claim 20 for causing said computer to further execute steps of:

converting data transfer paths for which access rights have been integrated to data of tree structure; and searching to determine whether paths exist for which improper path that are indicated by security verification policies match with data transfer paths that have been converted to data of tree structure.

25. A program product for verifying whether improper settings that indicate composite errors of security settings exist in an object system, said program product causing a computer to execute steps of:

storing in a storage device operation models that represent operation contents of said object system and that are generated based on program operation information that describes operations of a program that is used by said object system; and verifying whether data movement that is represented by security verification policies in which data movement that is proper or improper from a standpoint of security has been set in advance conforms with operation contents of said object system that are represented by operation models that are stored in said storage device.

* * * * *